(12) United States Patent
Nakamura et al.

(10) Patent No.: US 7,869,110 B2
(45) Date of Patent: Jan. 11, 2011

(54) OPTICAL SCAN APPARATUS AND IMAGE FORMATION APPARATUS

(75) Inventors: Tadashi Nakamura, Ebina (JP); Tomohiro Nakajima, Machida (JP)

(73) Assignee: Ricoh Company, Ltd., Tokyo (JP)

(*) Notice: Subject to any disclaimer, the term of this patent is extended or adjusted under 35 U.S.C. 154(b) by 181 days.

(21) Appl. No.: 12/170,063

(22) Filed: Jul. 9, 2008

(65) Prior Publication Data

US 2009/0015897 A1    Jan. 15, 2009

(30) Foreign Application Priority Data

Jul. 11, 2007 (JP) .............................. 2007-182522
Jul. 24, 2007 (JP) .............................. 2007-192542

(51) Int. Cl.
    *G02B 26/08* (2006.01)
(52) U.S. Cl. ................................. 359/205.1; 359/215.1
(58) Field of Classification Search ... 359/205.1–207.6, 359/212.1–214.1, 215.1
    See application file for complete search history.

(56) References Cited

U.S. PATENT DOCUMENTS

| | | | |
|---|---|---|---|
| 5,959,760 | A | 9/1999 | Yamada et al. |
| 6,621,512 | B2 | 9/2003 | Nakajima et al. |
| 6,657,765 | B2 | 12/2003 | Hayashi et al. |
| 6,775,041 | B1 | 8/2004 | Nakajima |
| 6,839,157 | B2 | 1/2005 | Ono et al. |
| 6,932,271 | B2 | 8/2005 | Nakajima et al. |
| 6,972,883 | B2 | 12/2005 | Fujii et al. |
| 6,995,885 | B2 | 2/2006 | Nakajima |
| 7,068,296 | B2 | 6/2006 | Hayashi et al. |
| 7,170,660 | B2 | 1/2007 | Nakajima |
| 7,333,254 | B2 | 2/2008 | Amada et al. |
| 2002/0122217 | A1 | 9/2002 | Nakajima |
| 2003/0053156 | A1 | 3/2003 | Satoh et al. |
| 2003/0227538 | A1* | 12/2003 | Fujii et al. .................. 359/213 |
| 2004/0036936 | A1 | 2/2004 | Nakajima et al. |
| 2004/0184127 | A1 | 9/2004 | Nakajima et al. |
| 2005/0062836 | A1 | 3/2005 | Nakajima |
| 2005/0185237 | A1 | 8/2005 | Nakajima |
| 2005/0190420 | A1 | 9/2005 | Imai et al. |
| 2005/0243396 | A1 | 11/2005 | Fujii et al. |

(Continued)

FOREIGN PATENT DOCUMENTS

JP            2924200            5/1999

(Continued)

OTHER PUBLICATIONS

U.S. Appl. No. 11/710,907, filed Feb. 27, 2007.

(Continued)

*Primary Examiner*—Euncha P Cherry
(74) *Attorney, Agent, or Firm*—Oblon, Spivak, McClelland, Maier & Neustadt, L.L.P.

(57) ABSTRACT

An optical scan apparatus is configured to include a light source emitting a light beam; a vibration mirror deflecting the light beam emitted from the light source to scan a scan area; a drive unit driving the vibration mirror; and an optical imaging system focusing the light beam deflected by the vibration mirror on a predetermined focus position, and having optical power to correct a displacement of the focus position which occurs due to a deformation of the vibration mirror caused by its own vibration.

17 Claims, 35 Drawing Sheets

U.S. PATENT DOCUMENTS

| | | |
|---|---|---|
| 2006/0028533 A1 | 2/2006 | Nakajima |
| 2006/0132880 A1 | 6/2006 | Amada et al. |
| 2006/0158711 A1 | 7/2006 | Imai et al. |
| 2006/0232844 A1 | 10/2006 | Nakajima |
| 2006/0245009 A1 | 11/2006 | Akiyama et al. |
| 2007/0035796 A1 | 2/2007 | Nakajima |
| 2007/0058232 A1 | 3/2007 | Nakajima |
| 2007/0058255 A1 | 3/2007 | Imai et al. |
| 2007/0146738 A1 | 6/2007 | Nakajima |
| 2007/0146851 A1 | 6/2007 | Nakajima |
| 2007/0146856 A1 | 6/2007 | Nakajima |
| 2007/0206259 A1 | 9/2007 | Nakajima |
| 2007/0297036 A1 | 12/2007 | Nakamura et al. |
| 2008/0024590 A1 | 1/2008 | Nakajima |
| 2008/0055690 A1 | 3/2008 | Nakamura et al. |
| 2008/0062491 A1 | 3/2008 | Nakamura et al. |
| 2008/0204852 A1 | 8/2008 | Amada et al. |

FOREIGN PATENT DOCUMENTS

| | | |
|---|---|---|
| JP | 3011144 | 12/1999 |
| JP | 3445691 | 6/2003 |
| JP | 3543473 | 4/2004 |
| JP | 2004-191416 | 7/2004 |
| JP | 2004-279947 | 10/2004 |
| JP | 2005-308863 | 11/2005 |

OTHER PUBLICATIONS

U.S. Appl. No. 12/204,483, filed Sep. 4, 2008, Nakamura.

* cited by examiner

OPTICAL SCAN APPARATUS AND IMAGE FORMATION APPARATUS

CROSS-REFERENCE TO RELATED APPLICATIONS

The present application is based on and claims priorities from Japanese Patent Application Nos. 2007-182522, filed on Jul. 11, 2007, and 2007-192542, filed on Jul. 24, 2007, the disclosure of which are hereby incorporated by reference in their entirety.

BACKGROUND OF THE INVENTION

1. Field of the Invention

The present invention relates to an optical scan apparatus used for an image formation apparatus such as a digital copying machine or a laser printer as well as to an image formation apparatus incorporating the optical scan apparatus.

2. Description of Related Art

A prior art optical scan apparatus uses a polygon mirror or a galvano mirror for a deflector deflecting a light beam. In order to print images with high resolution at high speed, it is necessary for such an optical scan apparatus to heighten scan speed, that is, rotation speed of the deflector. However, there is a limitation to increasing the rotation speed of the deflector due to durability of bearings thereof, heat emission or noise caused by windage loss, or the like.

In view of the above problem, in recent years deflectors made by silicon micro-machining have been widely studied. For example, a deflector formed of a vibration mirror and a torsion shaft supporting the mirror integrally on a silicon substrate is disclosed in Japanese Patent Nos. 2924200, 3011144, 3445691, and 3543473 and Japanese Laid-open Patent Application Publication Nos. 2004-191416, 2005-308863, and 2004-279947.

Japanese Patent Nos. 2924200 and 3011144 disclose a deflector with a small-sized mirror surface which is reciprocatively vibrated by resonance, so that it generates less noise and consumes less power even in high-speed operation. Further, when used in an optical scan apparatus, such a deflector can contribute to a reduction in thickness of a housing of the apparatus due to its low vibration and almost no heat generation. Also, the housing can be made of low-cost resin materials containing less glass fibers without affecting quality of images.

Japanese Patent Nos. 3445691 and 3543473 disclose an optical scan apparatus with such a vibration mirror as a deflector instead of a polygon mirror. One problem of this vibration mirror is that a surface thereof may deform due to its own vibration. Japanese Laid-open Patent Application Publication No. 2004-191416 discloses a vibration mirror whose focus position is changeable in main scan direction in accordance with deflection angle thereof. Japanese Laid-open Patent Application Publication No. 2005-308863 discloses a vibration mirror whose shape is devised in such a manner as to suppress the deformation.

There is another problem in the vibration mirror that the deflection angle thereof varies depending on a change in spring constant of the torsion shaft due to temperature or a change in viscosity resistance of air owing to atmospheric pressure or the like. Japanese Laid-open Patent Application Publication No. 2004-279947 has dealt with this problem by configuring a vibration mirror that the deflection angle thereof is stably controlled by adjusting an applied current to the vibration mirror in accordance with deflection angle detected from a deflected light beam.

As described above, use of the vibration mirror not a polygon mirror as a deflector in an optical scan apparatus makes it possible to provide an image formation apparatus with less noise and less power consumption and adoptable for various ambient conditions and environments. Further, it is able to thin thickness of the housing of the optical scan apparatus owing to the low vibration of the vibration mirror, enabling weight saving and manufacturing cost saving therefor.

However, there still remains a problem that since the vibration mirror is extremely thin in thickness as several hundred μm, it is very difficult to form a flat mirror surface with high precision. When a light beam deflected by the mirror with insufficient precision illuminates an image plane, a spot size thereof differs according to a position (image height) of the imaging plane where it illuminates. A variation in the beam spot size causes deterioration in image quality, therefore, an image formation apparatus incorporating such an optical scan apparatus cannot form high-quality images.

It is possible to improve precision of the mirror surface by increasing thickness of a silicon substrate on which the vibration mirror is formed. However, the thickness increase leads to an increase in mass of the vibration mirror, resulting in reducing, at a same frequency, the deflection angle of the vibration mirror from that before the thickness increase.

Another problem is that due to its very thin thickness, undulating deformation occurs on the mirror surface. This is because force acts on the vicinity of a rotation axis and the ends of the vibration mirror in opposite directions because of a change in angular velocity of the mirror due to the vibration and inertia force on the mirror.

FIG. 22 schematically shows a prior art vibration mirror 23a with undulating deformation. Such deformation of the mirror surface leads to deterioration in wave aberration of a light beam reflected thereby, causing problems such as displacement of focus positions, deformation of beam profiles, or generation of sidelobes.

In view of solving the above problems, Japanese Laid-open Patent Application Publication No. 2004-191416 discloses an optical scan device which changes focus positions to correct displacement thereof which increases in accordance with the deflection angle of the light beam. However, the apparatus cannot still prevent displacement caused by the following factors when the light beam is incident on the mirror from directions outside a predetermined direction.

FIG. 23A shows a light beam incident on the vibration mirror 23a. In the drawing, incidence angle (between optical axis of the light beam and mirror surface) of the light beam decreases as the vibration mirror 23a rotates in a direction of arrows. Therefore, even with a same size of the light beam, the spot size of the light beam on the vibration mirror 23a increases in a direction perpendicular to the rotation axis (main scan direction) as it rotates in the direction of arrows.

Here, deformation of the mirror surface does not always occur symmetrically relative to the rotation axis. FIG. 23B shows a relation between deflection angle of the light beam and shape of the mirror surface of the vibration mirror 23a. As shown in the drawing, deformation of the mirror surface is small in the vicinity of the rotation axis (indicated by broken lines) so that the vibration mirror 23a has average optical power while the ends of the vibration mirror 23a is greatly deformed, being affected by inertia force so that it has greater optical power at the ends than in the vicinity of the rotation axis.

In other words, curvature of the mirror surface changes in the main scan direction depending on rotation angle of the vibration mirror 23a or a position thereon where the light beam illuminates. This causes the displacement of focus positions of the light beam, which further results in unevenness of spot size of the light beam on the surface of a photoconductive drum in the main scan direction and significant deterioration in image quality with nonuniform density or low resolution.

It is necessary to improve bending rigidity of the silicon substrate, that is, increase the thickness thereof on which the vibration mirror 23a is formed, in order to decrease the deformation of the mirror surface. However, again, the thickness increase causes the problem of mass increase of the vibration mirror 23a, resulting in reducing, at a same frequency, the deflection angle thereof from that before the thickness increase.

SUMMARY OF THE INVENTION

An object of the present invention is to provide an optical scan apparatus which can reduce a variation in beam spot size on a photoconductive drum due to a deformation of a mirror surface of a vibration mirror caused by its own vibration and due to a precision of the mirror surface as well as to provide an image formation apparatus incorporating such an optical scan apparatus and being able to form high quality images.

According to one aspect of the present invention, a first optical scan apparatus comprises a light source emitting a light beam; a vibration mirror deflecting the light beam emitted from the light source to scan a scan area; a drive unit driving the vibration mirror; and an optical imaging system focusing the light beam deflected by the vibration mirror on a predetermined focus position, and configured to have optical power to correct a displacement of the focus position which occurs due to a deformation of the vibration mirror caused by its own vibration.

Preferably, the first optical scan apparatus further comprises an adjuster which adjusts, at least in a main scan direction, a position of incidence of the light beam on the vibration mirror.

Preferably, in the first optical scan apparatus the adjuster is configured to adjust a direction in which the light beam is emitted from the light source.

Preferably, in the first optical scan apparatus the drive unit is configured to drive the vibration mirror so that a deflection angle of the vibration mirror is to be constant.

Preferably, in the first optical scan apparatus the vibration mirror includes a torsion shaft as a support shaft, and reciprocatively vibrates in a horizontal direction around the torsion shaft in a predetermined range of rotation angles.

According to another aspect of the present invention, a first image formation apparatus comprise the above-described optical scan apparatus; a photoconductor on which an electrostatic latent image is formed in accordance with image information by the optical scan apparatus; a develop unit visualizing the electrostatic latent image formed on the photoconductor as a toner image; and a transfer unit fusing the toner image visualized by the develop unit on a recording medium.

Preferably, in the first image formation apparatus, the first optical scan apparatus comprises a correction unit which divides the scan area of the deflected light beam into a plurality of areas and corrects a position of a pixel formed by the light beam according to the image information in each divided area, to thereby correct displacement of the focus position.

According to another aspect of the present invention, a second optical scan apparatus comprises a light source emitting a light beam; a vibration mirror deflecting the light beam emitted from light source to scan a scan area; a drive unit driving the vibration mirror; and an optical imaging system focusing the light beam deflected by the vibration mirror on a predetermined focus position, in which the light beam is set to be incident on the vibration mirror at such a position as to correct a displacement of the focus position by canceling out a displacement due to precision of a surface of the vibration mirror and that due to a deformation of the vibration mirror caused by its own vibration.

Preferably, in the second optical scan apparatus the light beam is set to be incident on the vibration mirror at such a position that spot sizes of the light beam at both ends of the scan area are to be substantially the same.

Preferably, in the second optical scan apparatus the light beam is set to be incident on the vibration mirror at such a position that waist positions of the light beam at both ends of the scan area are to be substantially the same.

Preferably, the second optical scan apparatus further comprises an adjuster which adjusts, at least in a main scan direction, a position of incidence of the light beam on the vibration mirror.

Preferably, in the second optical scan apparatus the adjuster is configured to adjust a direction in which the light beam is emitted from the light source.

Preferably, in the second optical scan apparatus the adjuster is configured to adjust the position of incidence of the light beam on the vibration mirror at a plurality of defocus positions of the light beam.

Preferably, in the second optical scan apparatus the drive unit is configured to drive the vibration mirror so that deflection angle thereof is to be constant.

Preferably, in the second optical scan apparatus, the vibration mirror includes a torsion shaft as a support shaft, and reciprocatively vibrates in a horizontal direction around the torsion shaft in a predetermined range of rotation angles.

According to another aspect of the invention, a second image formation apparatus comprises the second optical scan apparatus; a photoconductor on which an electrostatic latent image is formed in accordance with image information by the optical scan apparatus; a develop unit visualizing the electrostatic latent image formed on the photoconductor as a toner image; and a transfer unit fusing the toner image visualized by the develop unit on a recording medium.

Preferably, in the second image formation apparatus, the second optical scan apparatus comprises a correction unit which divides the scan area of the deflected light beam into a plurality of areas and corrects a position of a pixel formed by the light beam according to the image information in each divided area, to thereby correct displacement of the focus position.

BRIEF DESCRIPTION OF THE DRAWINGS

FIG. 22 is a pattern diagram of deformation of a prior art vibration mirror 23a;

FIG. 23A shows incidence angle of a light beam on the vibration mirror 23a, and FIG. 23B shows a relation between deflection angle and shape of the vibration mirror 23a;

DETAILED DESCRIPTION OF THE PREFERRED EMBODIMENTS

Hereinafter, embodiments of the present invention will be described in detail with reference to the accompanying drawings.

First Embodiment

Figure 1:
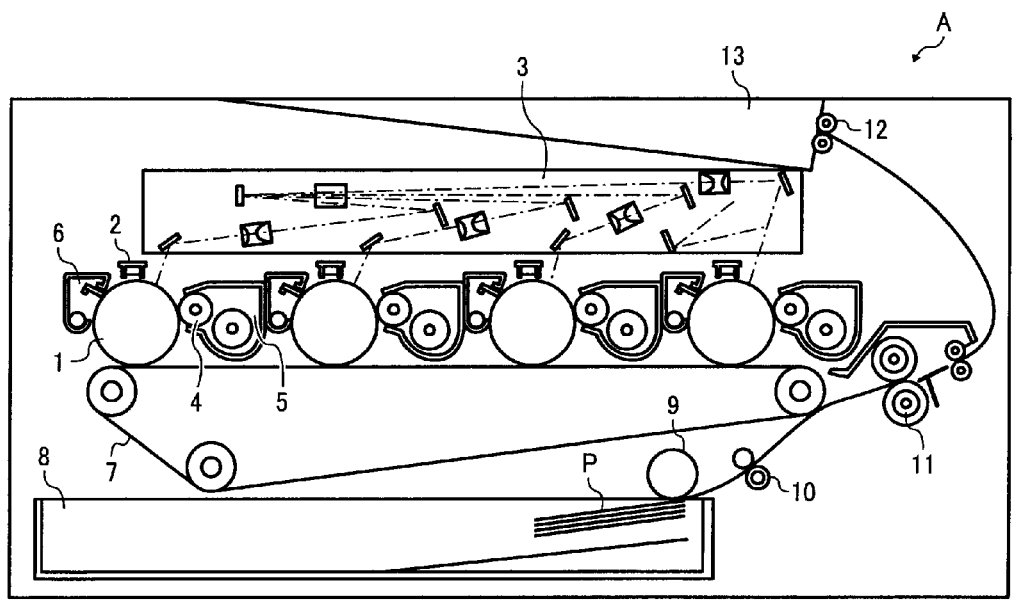
FIG. 1 shows an example of an image formation apparatus incorporating an optical scan apparatus.

FIG. 1 schematically shows an image formation apparatus A incorporating an optical scan apparatus 3. The image formation apparatus A comprises the optical scan apparatus 3, four image formation stations each including a photoconductive drum 1, an electric charger 2, a develop roller 4, a toner cartridge 5, a toner case 6, and a transfer belt 7, a paper feed tray 8, a paper feed roller 9, a resist roller pair 10, a fuse roller 11, a paper discharge roller 12, and a paper discharge tray 13.

Around each photoconductive drum 1 disposed are the electric charger 2 charging the photoconductive drum 1 at high voltage, the develop roller 4 attaching charged toner to an electrostatic latent image formed on the photoconductive drum 1 by the optical scan apparatus 3 for visualization, the toner cartridge 5 supplying toner to the develop roller 4, and the toner case 6 in which remnant toner on the photoconductive drum 1 is peeled off and accumulated. Two-line images are formed on the photoconductive drum 1 at one cycle by a vibration mirror 23's reciprocative movement.

The four image formation stations for yellow, magenta, cyan, and black colors, respectively are arranged above the transfer belt 7 in a moving direction of the transfer belt 7. Toner images in yellow, magenta, cyan, black colors are transferred sequentially onto the transfer belt 7 at a timing, to superimpose the four color toner images and form a color image. Each image formation station basically has the same structure except for the color of toner.

Paper P is supplied from the paper feed tray 8 via the paper feed roller 9 and carried to the transfer belt 7 via the resist roller pair 10 in accordance with recording start timing in sub scan direction, whereby the toner image on the transfer belt 7 is transferred onto the paper P. Then, the toner image is fused by the fuse roller 11 on the paper P and discharged to the paper discharge tray 13 via the paper discharge roller 12.

Figure 2:
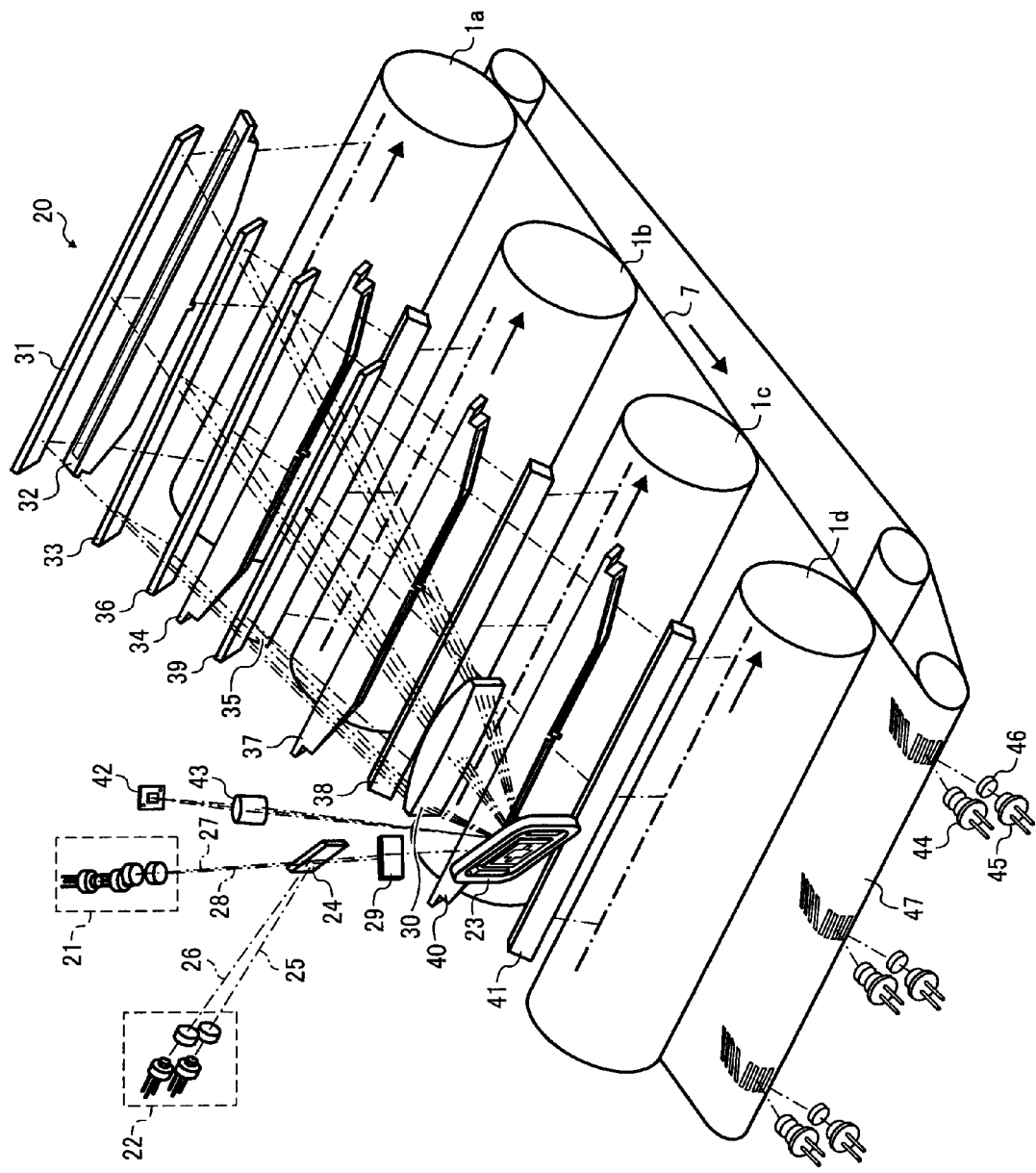
FIG. 2 is a schematic perspective view of the image formation apparatus incorporating an optical scan apparatus according to a first embodiment of the present invention.

FIG. 2 shows a four station type image formation apparatus including an optical scan apparatus 20 with a vibration mirror 23 according to the present embodiment. The optical scan apparatus 20 comprises light sources 21, 22 emitting a light beam, a vibration mirror 23 deflecting the light beam emitted from light source to scan a scan area, a drive unit driving the vibration mirror, and an optical imaging system comprising an fθ lens and toroidal lenses and focusing the light beam deflected by the vibration mirror on a predetermined focus position. Other components thereof will be described later.

Four photoconductive drums 1a, 1b, 1c, 1d are arranged with equal interval in a moving direction of a transfer belt 7 and integrally structured with the optical scan apparatus scanning the drums. The light beams from the light sources 21, 22 are deflected by the vibration mirror 23 and divided to scan the photoconductive drums 1a to 1d.

The light beams from the light sources 21, 22 are incident diagonally on the vibration mirror 23 at different incidence angles in the sub scan direction and collectively deflected for scanning. Thus, a light beam deflected by the single vibration mirror 23 can scan plural scan areas at the same time, thereby reducing manufacture cost of the optical scan apparatus. Also, this eliminates necessity for adjusting resonant vibration frequency, scan frequency, deflection angles of plural vibration mirrors, enabling improvement of optical performance and shortening of a manufacture process for the apparatus.

The light source 21 includes two light emitters for the photoconductive drums 1a, 1b arranged in the sub scan direction. Likewise, the light source 22 includes two light emitters for the photoconductive drums 1c, 1d arranged in the sub scan direction. In each light source, the two light emitters are integrally supported so that the light beams from the two light emitters are set to make an angle of 2.5 degrees, and intersect with each other in the sub scan direction on the vibration mirror 23.

In the present embodiment, the two light emitters in the light source 21 are set so that relative to a normal line of the vibration mirror 23, a light beam from a lower one of the light emitters is inclined downward at 1.25 degrees and the light beams from both of them interest with each other at 2.5 degrees. Similarly, the two light emitters in the light source 22 are set so that relative to a normal line of the vibration mirror 23, a light beam from an upper one of the light emitters is inclined upward at 1.25 degrees and the light beams from both of them intersect with each other at 2.5 degrees.

The light sources 21, 22 are disposed at different positions (heights) in the sub scan direction. The light beam from the lower light emitter in the light source 21 intersects with the light beam from the upper light emitter in the light source 22 on the vibration mirror 23 at 2.5 degrees in the sub scan direction.

The light beams 25, 26, 27, 28 from the light sources 21, 22 are incident on an incidence mirror 24 to be aligned vertically in the sub scan direction and then incident on a cylindrical lens 29. Also, they are each incident on the vibration mirror 23 at incidence angle of 22.5° (=α/2+θd) in the main scan direction.

Figure 3:
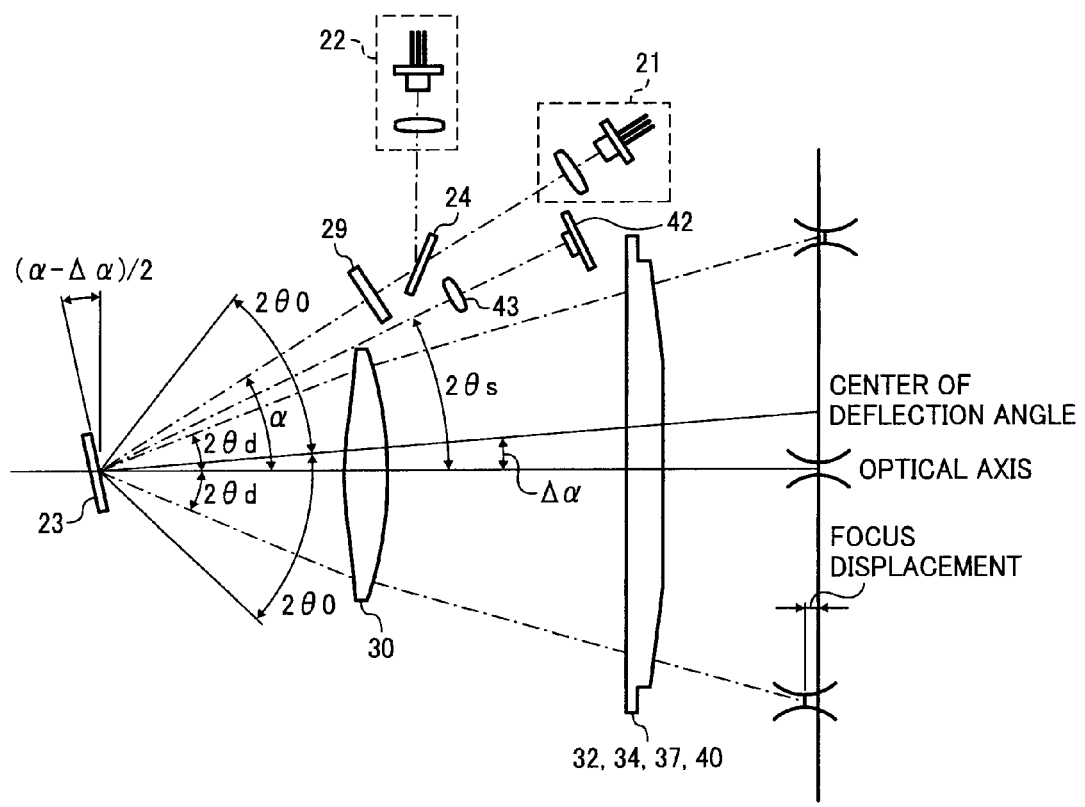
FIG. 3 is a schematic flat view of the optical scan apparatus according to the first embodiment of the present invention.

The light beams 25 to 28 deflected by the vibration mirror 23 scan around the optical axis of an fθ lens 30 or an axis inclined at Δα from the optical axis to a light source side as shown in FIG. 3.

The light beams 25 to 28 are converged in the sub scan direction by the cylindrical lens 29 in the vicinity of the vibration mirror 23. Being deflected by the vibration mirror 23, the light beams are diverged from each other and incident on the fθ lens 30, which is shared by all the four stations and has no convergence in the sub scan direction.

Having passed through the fθ lens 30, the light beam 25 from the light source 22 is reflected by a return mirror 31 and focuses a spot on the photoconductive drum 1a via a toroidal lens 32. Thereby, an electrostatic latent image is formed with the light beam 25 on the photoconductive drum 1a according to yellow-color image information (first image formation station).

Likewise, the light beam 26 from the light source 22 is reflected by a return mirror 33 and focuses a spot on the photoconductive drum 1b via a toroidal lens 34 and a return mirror 35. Thereby, an electrostatic latent image is formed with the light beam 26 on the photoconductive drum 1b according to magenta-color image information (second image formation station).

The light beam 27 from the light source 21 is reflected by a return mirror 36 and focuses a spot on the photoconductive drum 1c via a toroidal lens 37 and a return mirror 38. Thereby, an electrostatic latent image is formed with the light beam 27 on the photoconductive drum 1c according to cyan-color image information (third image formation station).

The light beam 28 from the light source 21 is reflected by a return mirror 39 and focuses a spot on the photoconductive drum 1d via a toroidal lens 40 and a return mirror 41. Thereby, an electrostatic latent image is formed with the light beam 28 on the photoconductive drum 1d according to black-color image information (fourth image formation station).

The light beams 25 to 28 deflected by the vibration mirror 23 pass by the fθ lens 30, are gathered by an imaging lens 43 and incident on a synchronous detector 42. The optical scan apparatus according to the present embodiment is configured such that synchronous detection signals are generated for each image formation station according to output signals for the light beams 25 to 28 from the synchronous detector 42.

In the prior art, a relation between incidence angle α of each of the light beams 25 to 28 from the light sources 21, 22 on the vibration mirror 23 and deflection angle θ0 of the vibration mirror 23 is expressed by the following expressions (1) and (2):

$$\alpha > 2\theta 0 \tag{1}$$

$$2\theta \max(\text{maximum deflection angle}) = \alpha + 2\theta 0 \tag{2}$$

According to the present embodiment, in order to suppress effective scan rate (θd/θ0) to a predetermined value (0.6 for example) or less, mean incidence angle α of the light beams from the light sources is set to satisfy the following relations (3) and (4):

$$\theta 0 \geq \alpha/2 > \theta d \tag{3}$$

$$\theta 0 \geq \theta s > \theta d \tag{4}$$

where θd is deflection angle of the light beams scanning the photoconductive drums 1a to 1d, θs is deflection angle of the light beams at synchronous detection, and θ0 is maximum deflection angle of the light beams. The reason for setting the effective scan rate to 0.6 or less is to set the light beams to scan a scan area within a range of deflection angles at constant velocity as possible.

FIG. 3 shows optical paths of the light beams from the light sources 21, 22 to the photoconductive drums 1a to 1d, the synchronous detector 42, and imaging lens 43. In the drawing θ0=25°, θd=15°, α=45°, and θs=18° are set, for example. The synchronous detector can be disposed so as to satisfy θs>α/2.

In FIG. 3, the center of deflection angle of the vibration mirror 23 is shifted by Δα relative to the optical axis of the fθ lens 30, that is, shifted towards a light source side. Accordingly, the deflection angle of the vibration mirror 23 varies at scan starting point and scan ending point relative to the center of the deflection angle. This can reduce the spot size of the light beam on the vibration mirror 23 on a non-light source side where incidence angle of the light beam is to be larger, compared with a case where the center of the deflection angle of the vibration mirror 23 coincides with the optical axis of the fθ lens 30.

In the present embodiment, however, the vibration mirror 23 is disposed so that the center of deflection angle thereof coincides with the optical axis of the fθ lens 30, that is Δα=0. The fθ lens 30 and toroidal lens 32, 34, 37, 40 are configured to have symmetric curved planes in the main scan direction.

Moreover, as described above, the vibration mirror 23 is undulatingly deformed due to its own vibration. The deformation δ proportionally increases as the deflection angle θd of the vibration mirror 23 varies from zero to the maximum θ0, and it is largest when the deflection angle is θ0. Accordingly, the vibration mirror 23 is less affected by the vibration when the effective scan rate (deflection angle θd of vibration mirror 23/maximum deflection angle θ0) is set to a smaller value.

Here, the deflection angle θd of the vibration mirror 23 scanning a scan area is defined by angle of view of the fθ lens 30. Therefore, the effective scan rate (θd/θ0) can be decreased by increasing the deflection angle θ0. In order to achieve this, mass of a later described vibration mirror body need be decreased. However, for the purpose of reducing the mass, thickness of a substrate constituting the mirror body need be decreased, which causes a conflicting problem that deformation of the vibration mirror increases as thickness of the substrate decreases.

In view of preventing the above problem, in the present embodiment the deflection angle θd of the light beam scanning the photoconductive drums is set to be equal to or less than 60% of the maximum deflection angle θ0. Thereby, the effective scan rate (θd/θ0) is set within a range of deflection angles to move the vibration mirror 23 at relatively constant velocity. This makes it possible to prevent unevenness of beam profiles in the scan area due to the deformation of the vibration mirror 23.

Figure 4:
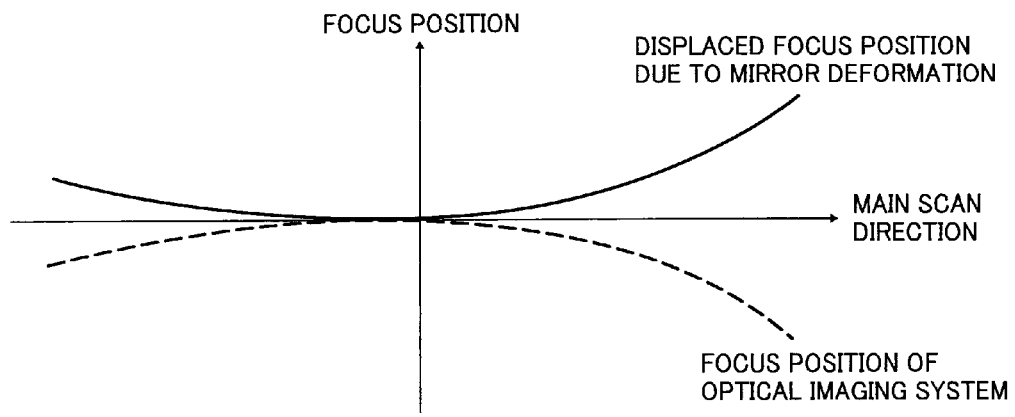
FIG. 4 shows a displacement of a focus position of a light beam when a vibration mirror 23 is in operation.

FIG. 4 shows a displacement of focus position (beam waist position) of the light beam on the photoconductive drums 1a to 1d in the main scan direction, which occurs due to deformation of the vibration mirror 23 in vibration.

The vibration of the vibration mirror 23 causes the deformation and its optical power changes accordingly. The change of the optical power of the vibration mirror 23 causes the displacement of the focus position of the light beam on the photoconductive drums 1a to 1d. The displacement can be measured by measuring the profile of the light beam while the vibration mirror 23 is in vibration. In the present embodiment, the displacement of the focus position is about 2 mm at maximum at ends of the scan area in the main scan direction. The displacement has to be suppressed to around 0.5 mm in the entire scan area; otherwise, the spot size of the light beam will be uneven.

Generally, the planes of the fθ lens 30 and toroidal lens 32, 34, 37, 40 are designed to be free of curvature in order to align the focus positions of the light beams on the photoconductive drums 1a to 1d. In the present embodiment, however, with the displacement due to the deformation of the vibration mirror 23 taken into consideration, the planes thereof are designed to have the curvature in the main scan direction to correct the displacement of the focus position of the light beam which is measured in advance. Thereby, it is made possible to align the focus positions of the light beams on the photoconductive drums 1a to 1d even with occurrence of the deformation of the vibration mirror 23.

Near the end of downstream of the transfer belt 7 a detector is disposed for detecting positional offsets of toner images in the four colors superimposed on the transfer belt 7, as shown in FIG. 2. The detector detects offsets of write start positions (main and sub scan resists) of the toner images in main and sub scan directions relative to those of a reference toner image (black image, for example) by reading a detection pattern of the toner images. According to the offsets of the write start positions, the positional offsets of the toner images are periodically corrected.

Such a detector is composed of a LED device 44 for illumination, a photosensor 45 receiving a reflected light, and a condenser lens 46 and disposed at three positions, both ends and center of the transfer belt 7.

Figure 5:
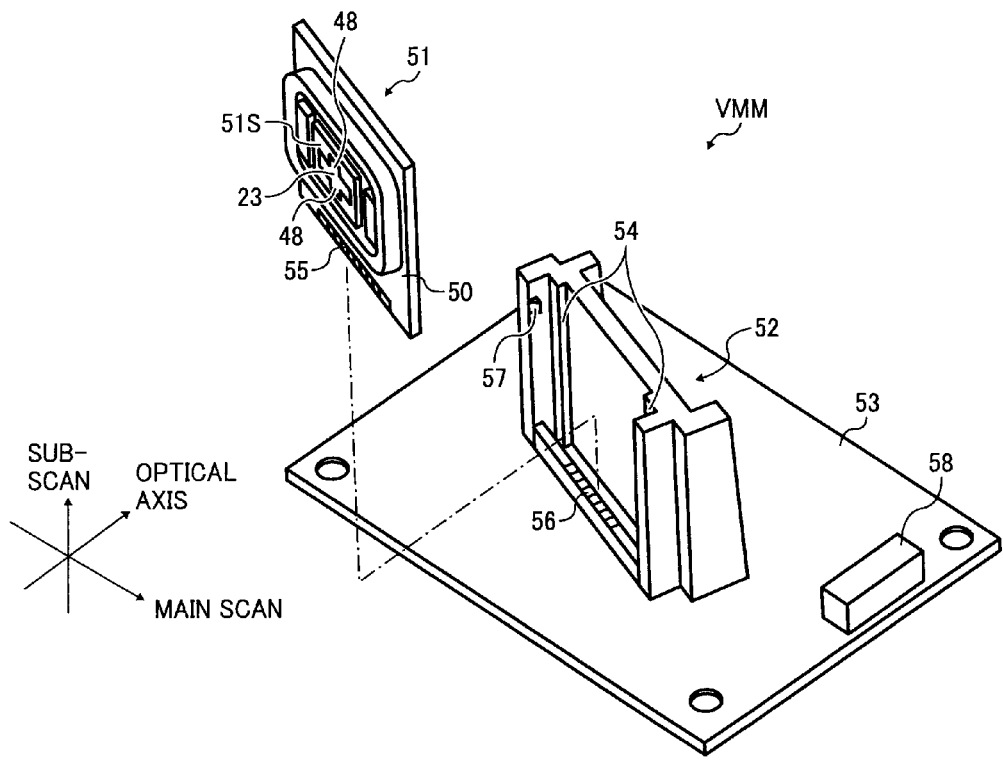
FIG. 5 is an exploded perspective view of a vibration mirror module VMM for the optical scan apparatus according to a first embodiment.

FIG. 5 shows a vibration mirror module VMM for the optical scan apparatus according to the present embodiment. The vibration mirror module VMM comprises a vibration mirror unit 51, a mirror body 51S, a torsion shaft 48 (also refer to FIG. 7), a substrate 50, a support member 52, a circuit board 53, a position determiner 54, a substrate side connector 55, a support member side connector 56, a holding pin 57, and a connector 58.

In the present embodiment, rotation torque of the vibration mirror 23 is generated by electromagnetic drive technique as described in the following, for example.

The vibration mirror 23 is supported by the torsion shaft 48, and made of a single silicon substrate by etching as described later.

The support member 52 is molded with resin and disposed on the circuit board 53 at a predetermined position. It includes the position determiner 54 which determines the position of the substrate 50 so that the torsion shaft 48 is orthogonal to the optical axis of the fθ lens 30 and the mirror surface of the vibration mirror 23 is inclined in the main scan direction at a predetermined angle (22.5° in the present embodiment). It also includes the support member side connector 56 with metal terminals to get in contact with the substrate side connector 55 formed on a side of the substrate 50, when the substrate 50 is mounted thereon.

With the substrate 50 mounted on the support member 52, the substrate side connector 55 is inserted into the support member side connector 56 to electrically connect the substrate 50 and support member 52. Also, both ends of the substrate 50 are supported by the position determiner 54 and the holding pin 57 of the support member 52. With such a configuration, the vibration mirror 23 is made replaceable when necessary.

Note that control IC, a crystal oscillator and the like constituting a drive circuit of the vibration mirror unit 51 are mounted on the circuit board 53 to output/input power supply and control signals via the connector 58.

Figure 6:
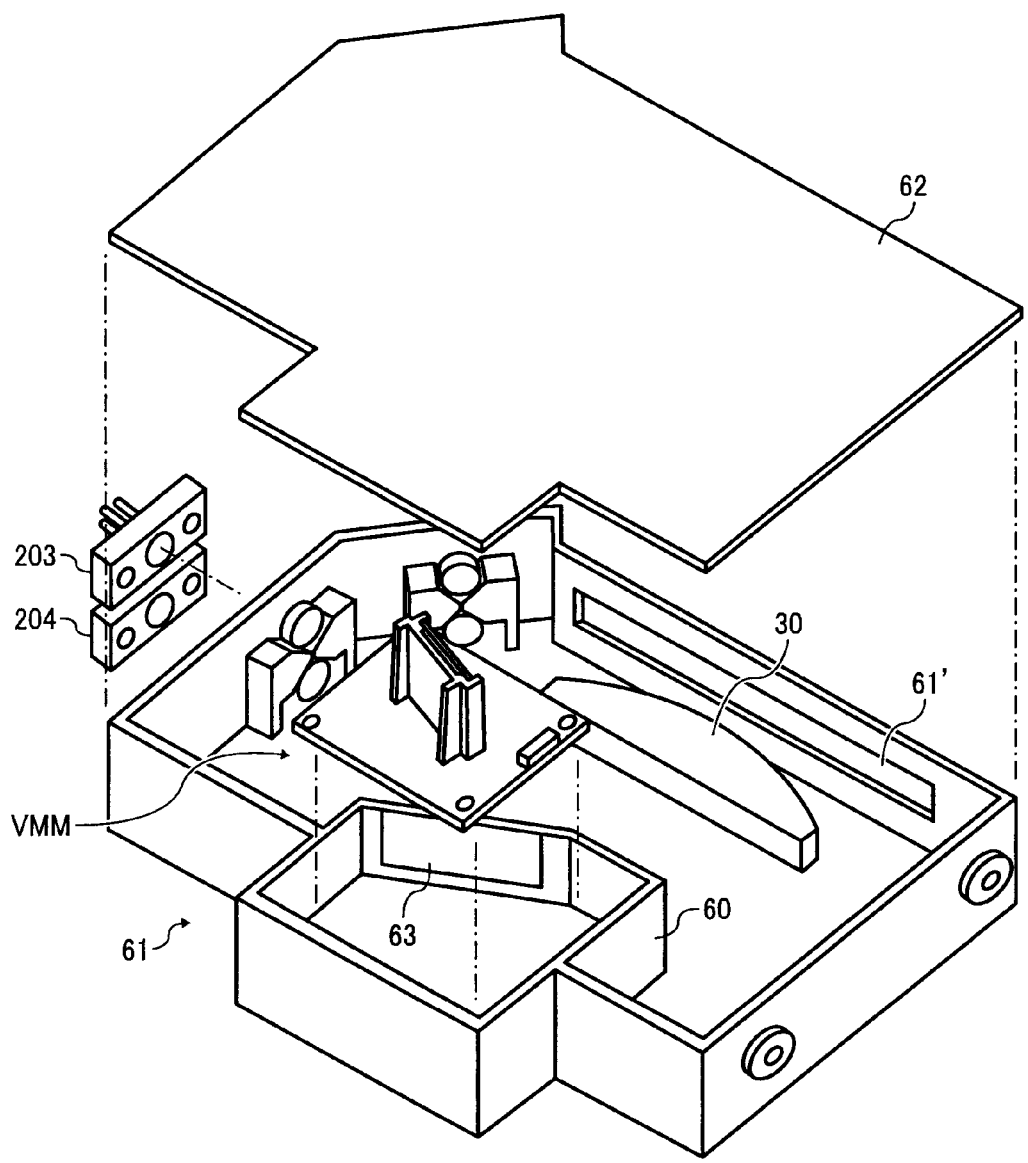
FIG. 6 is a schematic perspective view of an optical housing 61.

FIG. 6 shows an optical housing 61 on which the vibration mirror module VMM is mounted. As shown in the drawing the optical housing 61 is integrated with a side wall 60 to surround the vibration mirror module VMM.

The side wall 60 is provided with a transparent window through which the light beam passes. The fθ lens 30 is fixed on the bottom surface of the optical housing 61.

The upper end of the side wall is sealed with an upper cover 62 to airtightly seal the inside of the optical housing 61 and block it from ambient air. This can prevent the deflection angle of the vibration mirror 23 from varying owing to convective ambient air. Light beams are emitted through an exit window 61' to outside.

Figure 7:
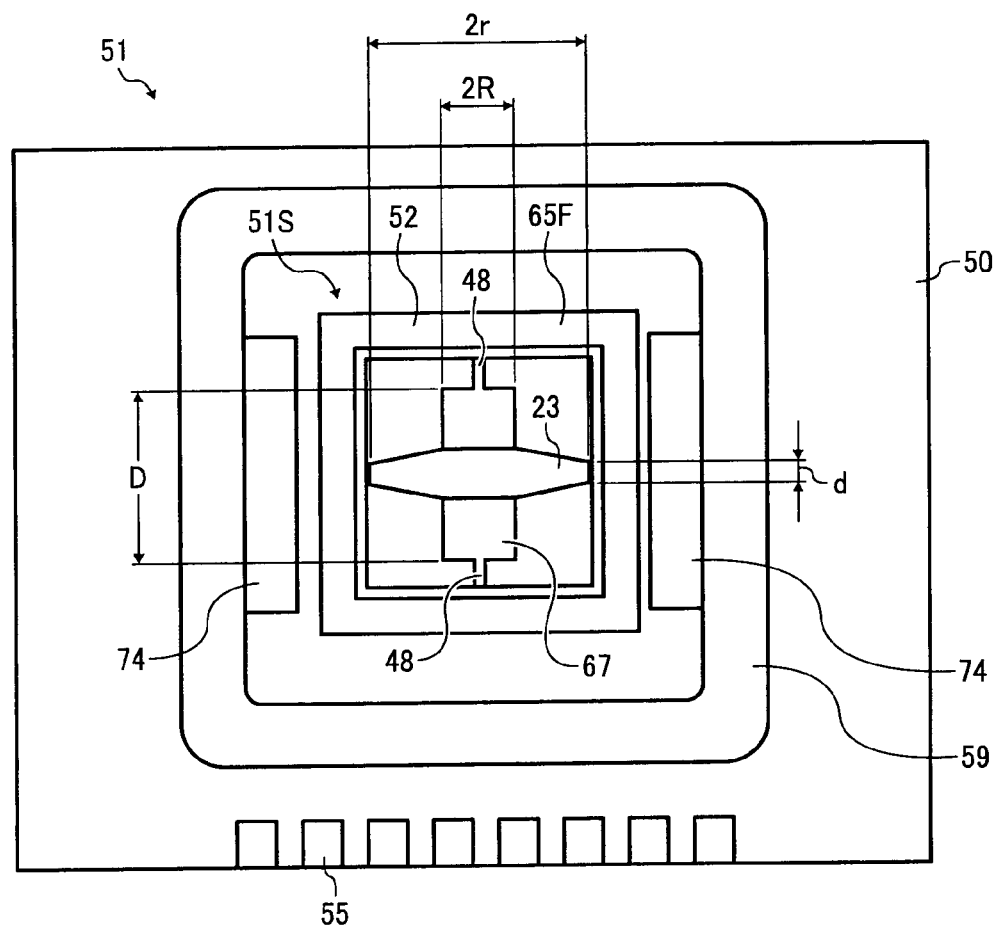
FIG. 7 is a front view of a vibration mirror unit 51.
Figure 8:
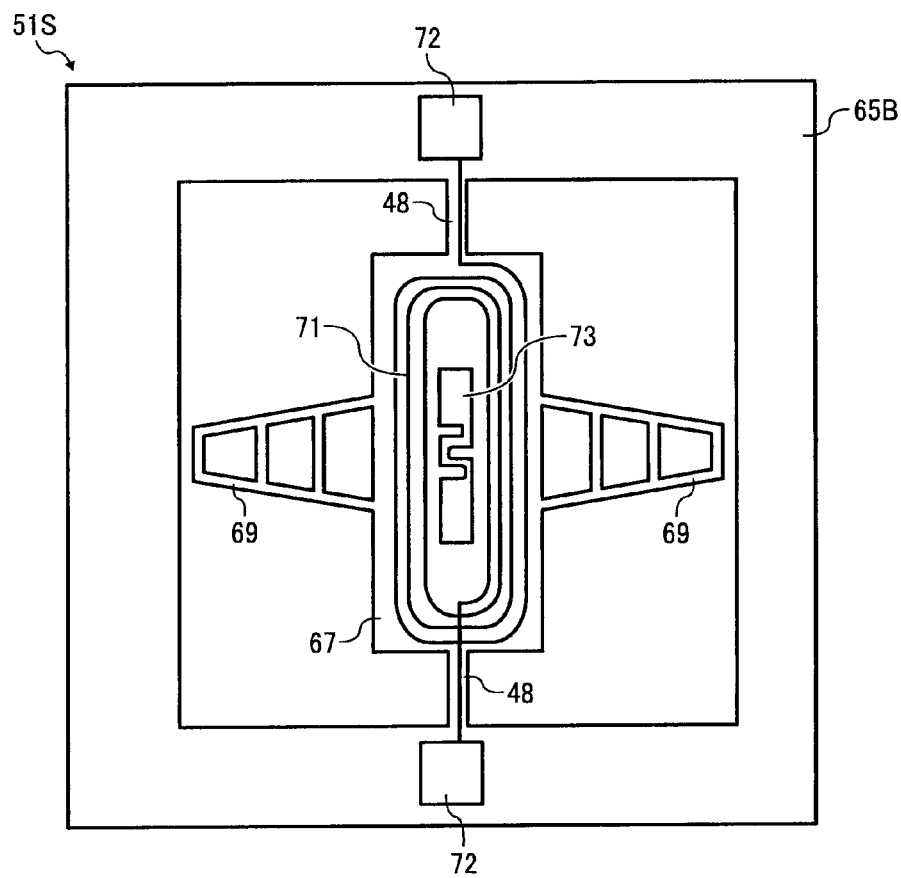
FIG. 8 is a back view of the vibration mirror unit 51.
Figure 9:
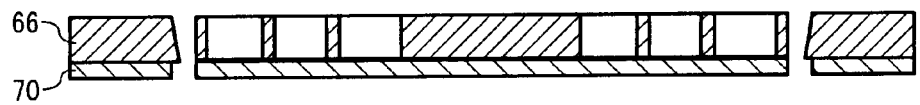
FIG. 9 is a cross-sectional view of a substrate side connector 55.
Figure 10:
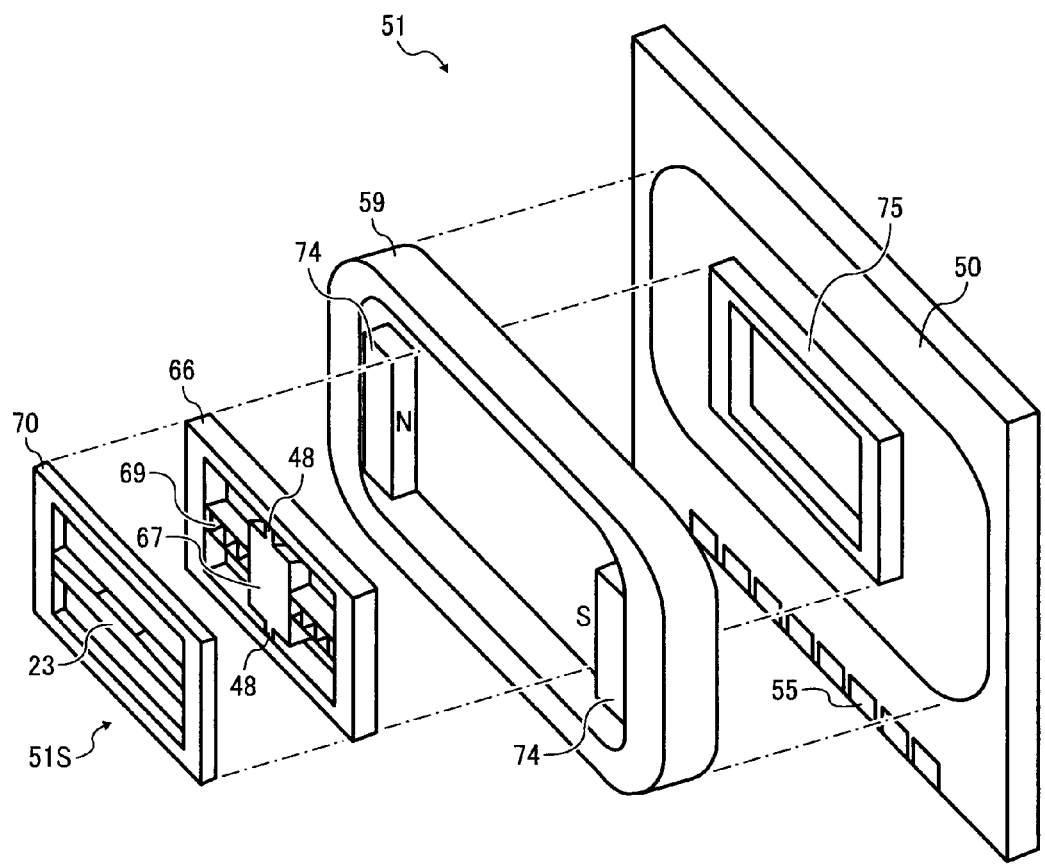
FIG. 10 is an exploded perspective view of the vibration mirror unit 51.

Next, the vibration mirror unit 51 will be described in detail with reference to FIGS. 7 to 10. FIG. 7 shows a front side of the vibration mirror unit 51, FIG. 8 shows a back side thereof, FIG. 9 shows a cross section of the substrate side connector 55, and FIG. 10 is an exploded perspective view of the vibration mirror unit 51.

The vibration mirror body 51S comprises a vibration mirror 23 as a vibrator having a mirror surface, a torsion shaft 48 as the rotation axis supporting the vibration mirror 23, and frame 65F, 65B as a support part.

In the present embodiment the vibration mirror body 51S is manufactured using a wafer which is made of two joined SOI substrates in thickness of 60 μm, 140 μm (first and second substrates) with an oxide film therebetween.

First, an unnecessary portion of the second substrate 66 (140 μm) is removed through dry process by plasma etching to form a vibration plate 67 on which the torsion shaft 48 and a coil pattern 71 of a planar coil are formed, a reinforced beam 69 as a framework of the vibration mirror 23, and a frame 65B.

Next, an unnecessary portion of the first substrate 70 (60 μm) is removed by anisotropic etching such as KOH to form the vibration mirror 23 and the frame 65F. The widths of the torsion shaft 48 and reinforced beam 69 are set to 40 to 60 μm for the purpose of decreasing inertia moment of the vibration mirror 23 and increasing deflection angle thereof. The reinforced beam 69 helps prevent the vibration mirror 23 from being deformed due to inertia force during its vibration.

Then, a reflective surface is formed on a front surface of the first substrate 70 by evaporating a thin aluminum film. Terminals 72 wired with the coil pattern 61 and a patch 73 for trimming are formed on a front surface of the second substrate 66. The coil pattern 61 of a planar coil is formed of a thin copper film via the torsion shaft on the vibration plate 67.

It can be also configured that a thin film permanent magnet is formed on the vibration plate 67 and the planar coil is formed on the frame 65B.

On the substrate 50, mounted are a frame-like base 75 mounting the vibration mirror body 51S and a yolk 59 surrounding the vibration mirror body 51S. The yolk 59 includes a pair of permanent magnets 74 (south and north poles) facing right and left sides of the vibration mirror body 51S, which generate magnetic field in a direction orthogonal to the torsion shaft 48.

The vibration mirror body 51S is disposed on the base 75 so that the mirror surface of the vibration mirror 23 faces opposite of the substrate 50. In flowing a current between the terminals 72 of the vibration mirror body 51S, Lorentz force is generated on the coil pattern 71 of the planar coil parallel to the torsion shaft 48, thereby twisting the torsion shaft 48 and generating rotation torque T to rotate the vibration mirror 23. With termination of the current flow, return force of the torsion shaft 48 brings the vibration mirror 23 back to an original position. Accordingly, alternately switching the direction of current flow to the coil pattern 71 makes it possible to move the vibration mirror 23 reciprocatively.

The current switching cycle is set to a close value to a resonant vibration rate f0 which is an inherent vibration rate in a primary vibration mode of the structure with the vibration mirror 23 and the torsion shaft 48 as a rotation axis, to excite and increase deflection angle of the vibration mirror 23.

Generally, scan frequency fd is controlled in accordance with or to follow the resonant vibration rate f0. However, since the resonant frequency f0 is determined by inertia moment I of the vibration mirror 23, with use of plural vibration mirrors 23 with variance in finished dimension, their resonant frequencies f0 will be different from each other. In such a case, it is hard to allow the scan frequencies fd of the respective vibration mirror 23 to coincide with each other.

The difference in the resonant frequency f0 is generally ±200 Hz approximately, depending on performance of the manufacture process of the vibration mirrors 23. This means that, for example, at the scan frequency fd=2 kHz, displacement of a scan line pitch will be equivalent to 1/10 line, and final displacement on a document of A4 size will be as much as several dozen mm in the sub scan direction.

In order to prevent the displacement, plural bandwidths of several Hz around the scan frequency fd can be set, for example, at ±2.5 Hz in which deflection angle of the vibration mirror 23 is adjustable by gain adjustment. Vibration mirror modules VMM are ranked in advance by the bandwidths according to a range of variances in the resonant frequency f0. Accordingly, with use of vibration mirror modules VMM in the same rank (bandwidth), plural vibration mirrors 23 can be driven at the same scan frequency fd.

However, there is a drawback that when the difference in the resonant frequency f0 is great, the numbers of ranks and set scan frequencies fd are increased. This increases the number of drive circuits for the vibration mirror 23 in accordance with the scan frequencies fd and deteriorates production efficiency. Further, In view of replacement of the vibration mirror 23, another vibration mirror module VMM with a vibration mirror 23 in the same rank is needed, in other words, vibration mirror modules VMM in every rank need be kept in stock, which is not cost efficient.

In order to reduce the number of ranks as much as possible, with use of plural vibration mirrors 23, the mass of each vibration mirror 23 is gradually decreased by making a cut in the patch 71 on the back side of the vibration mirror 23 with a carbon dioxide laser or the like prior to mounting the vibration mirror unit 51 on the substrate 50. This allows adjustment of inertia moment I of each vibration mirror 23 even with the dimensional variances in individual vibration mirrors 23 so that their resonant frequencies f0 are substantially equal to each other. In the present embodiment, the resonant frequency f0 is adjusted to be within ±50 Hz and a scan frequency fd is pre-fixed in each ranked bandwidth.

Figure 11:
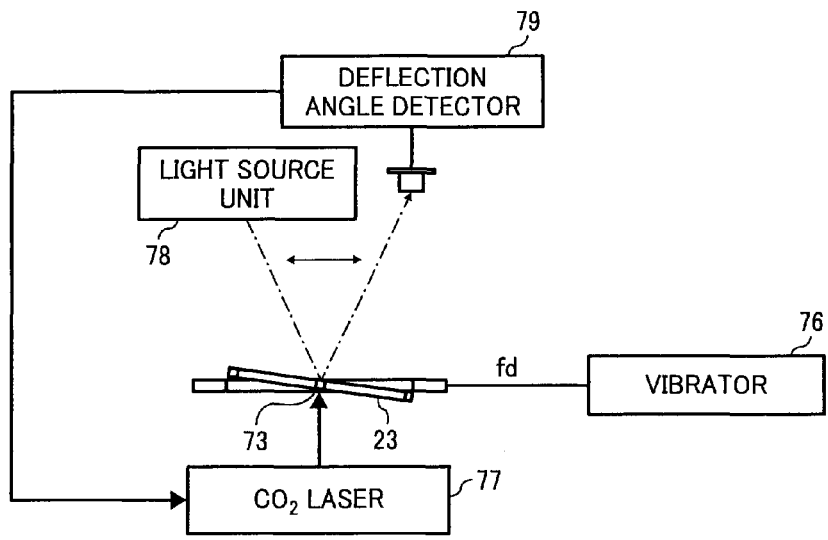
FIG. 11 shows a vibration mirror 23 when resonance frequency f0 is adjusted for changing (trimming) mass thereof.

FIG. 11 shows adjustment of the resonance frequency f0 by varying (trimming) the mass of the vibration mirror 23. In such a manner, the resonance frequency f0 of the vibration mirror 23 can be adjusted to be within a predetermined bandwidth without ranking the vibration mirror 23 in accordance with the variance in the resonance frequency f0.

The vibration mirror 23 is given vibration equivalent to the scan frequency fd from a vibrator 76. A patch 73 on the back side of the vibration mirror 23 is cut with a carbon dioxide laser until occurrence of resonance abruptly increases the deflection angle of the vibration mirror 23. Resonance is detectable by illuminating the front side of the vibration mirror 23 with a light beam and detecting deflection angle of a reflected light beam. Note that the mass of the vibration mirror 23 can be trimmed by increasing the mass with addition of balance weights, in replace of reducing the mass as above.

Figure 12:
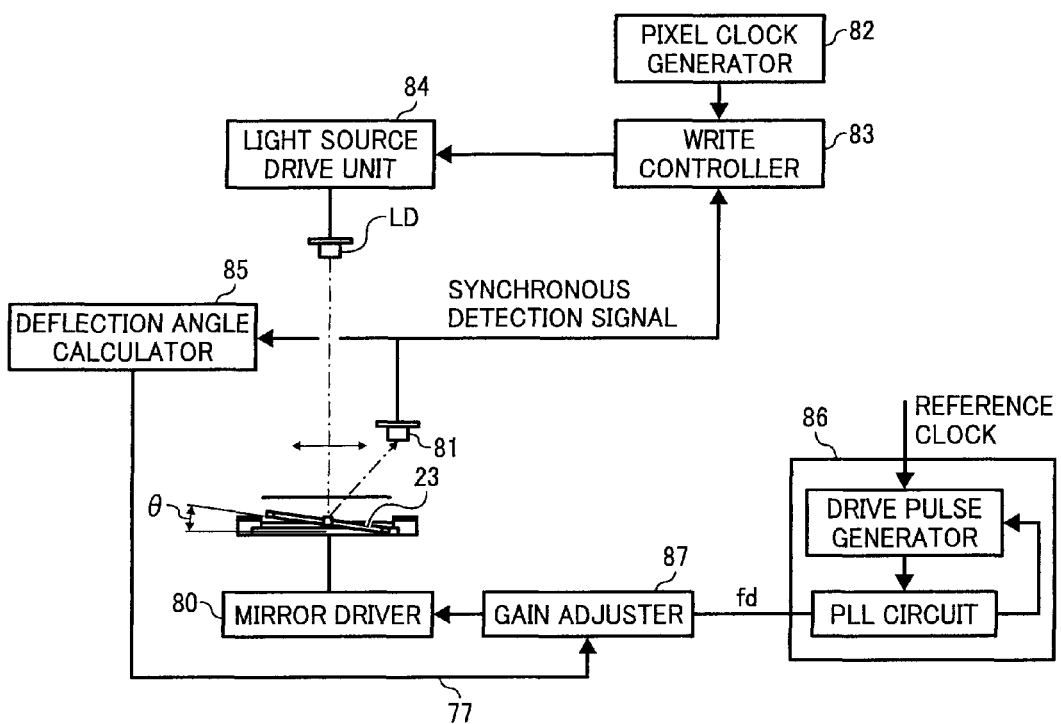
FIG. 12 shows a drive unit driving the vibration mirror 23.

FIG. 12 shows a drive unit for the vibration mirror 23 which comprises a pixel clock generator 82, a write controller 83, a light source drive unit 84, a deflection angle calculator 85, a phase controller 86 including a drive pulse generator and a PLL (phase lock group) circuit, and a gain adjuster 87. The drive unit is disposed on the circuit board 53. As described above, the coil pattern 71 of the planer coil on the vibration plate 67 is applied with alternate voltage or pulse wave voltage from the drive unit in order to switch the direction of current flow. For moving the vibration mirror 23 reciprocatively, the drive unit adjusts gain of the current flowing into the coil pattern 71 to set the deflection angle θ0 of the vibration mirror 23 to be constant.

Figure 13:
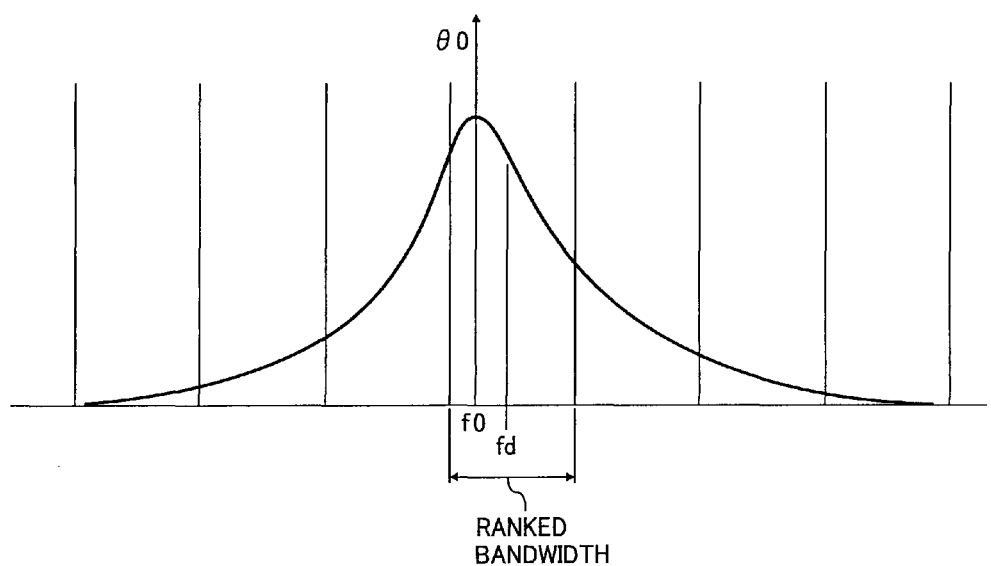
FIG. 13 shows a relation between frequency f for switching direction in which a current flows and deflection angle θ of the vibration mirror 23.

FIG. 13 shows a characteristic of frequency f switching the direction of current flow relative to the deflection angle θ0 of the vibration mirror 23. Generally, the deflection angle of the vibration mirror 23 is to be maximum when the frequency characteristic shows a peak at the resonance frequency f0, and scan frequency fd thereof matches the resonance frequency f0 as shown in FIG. 13. However, the frequency characteristic sharply varies in the vicinity of the resonance frequency f0, which causes a problem that even with the scan frequency fd set equal to the resonance frequency f0, the resonance frequency f0 may vary due to variance of spring constant or the like owing to temperature change, substantially reducing the deflection angle of the vibration mirror 23. It is therefore difficult to maintain stable operation of the vibration mirror 23 over time.

In light of the problem, the present embodiment is configured that the scan frequency fd is fixed to a constant frequency irrespective of the resonance frequency f0 and the deflection angle θ0 of the vibration mirror 23 is adjusted by gain adjustment of the drive unit. Specifically, the scan frequency fd is set to 2.5 kHz at an arbitrary resonance frequency f0 to change the deflection angle θ0 of the vibration mirror 23 by ±25 degrees by the gain adjustment of the drive unit.

Temporally, the drive unit detects the deflection angle θ0 of the vibration mirror 23 based on a difference in time between output signals from a synchronous detector 81 (synchronous detector 42 in FIG. 2) at forward and backward scannings of the light beam (later described) and controls the vibration mirror 23 to make the deflection angle θ0 thereof constant.

Figure 14:
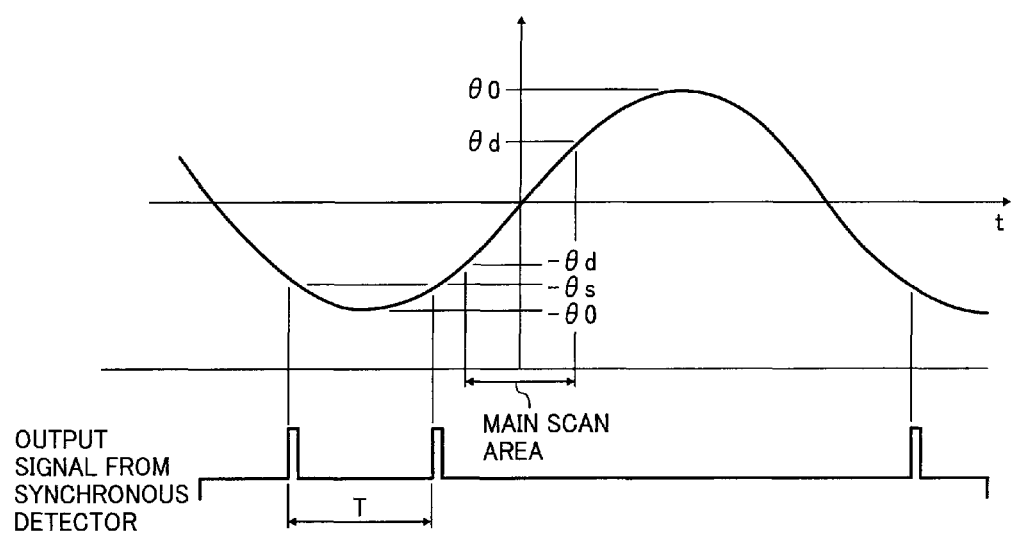
FIG. 14 shows fluctuation of the deflection angle θ of the vibration mirror 23 over time.

FIG. 14 shows that reflection angle of the light beam by the vibration mirror 23 varies with time. The vibration mirror 23 is resonance-vibrated and the deflection angle θ thereof varies with time t in sine waveform as shown in the drawing. The deflection angle θ is expressed by the following expression (5):

$$\theta = \theta 0 \times \sin 2\pi f d \cdot t \quad (5)$$

where θ0 is maximum deflection angle of the vibration mirror 23.

Upon detecting a reciprocative light beam with a deflection angle 2θs, the synchronous detector 81 outputs an output signal at forward and backward scannings of the light beam. The deflection angle θs is obtained by the following expression (6):

$$\theta s = \theta 0 \times \cos 2\pi f d \cdot T/2 \quad (6)$$

where T is difference in time between the output signals from the synchronous detector 81. Since θs is fixed, the maximum deflection angle θ0 can be detected by measuring T.

Note that the light sources 21, 22 are inhibited from emitting light beam during a period from light beam detection at forward scanning to that at backward scanning, that is, in which the deflection angle θ of the vibration mirror 23 satisfies θ0>θ>θs.

The optical scan apparatus comprises the synchronous detector 81 detecting a light beam deflected by the vibration mirror 23 and a vibration mirror drive unit 80 which controls the maximum deflection angle θ0 of the vibration mirror 23 according to output signals from the synchronous detector so that a main scan area is to be scanned in constant time.

With thus-configured optical scan apparatus, it is able to reliably correct displacement of focus positions of light beams which occurs due to the variance in optical power of the vibration mirror 23 caused by its own deformation, and depends on the deflection angle of the vibration mirror 23, as well as to form high-quality images without unevenness of density.

Figure 15:
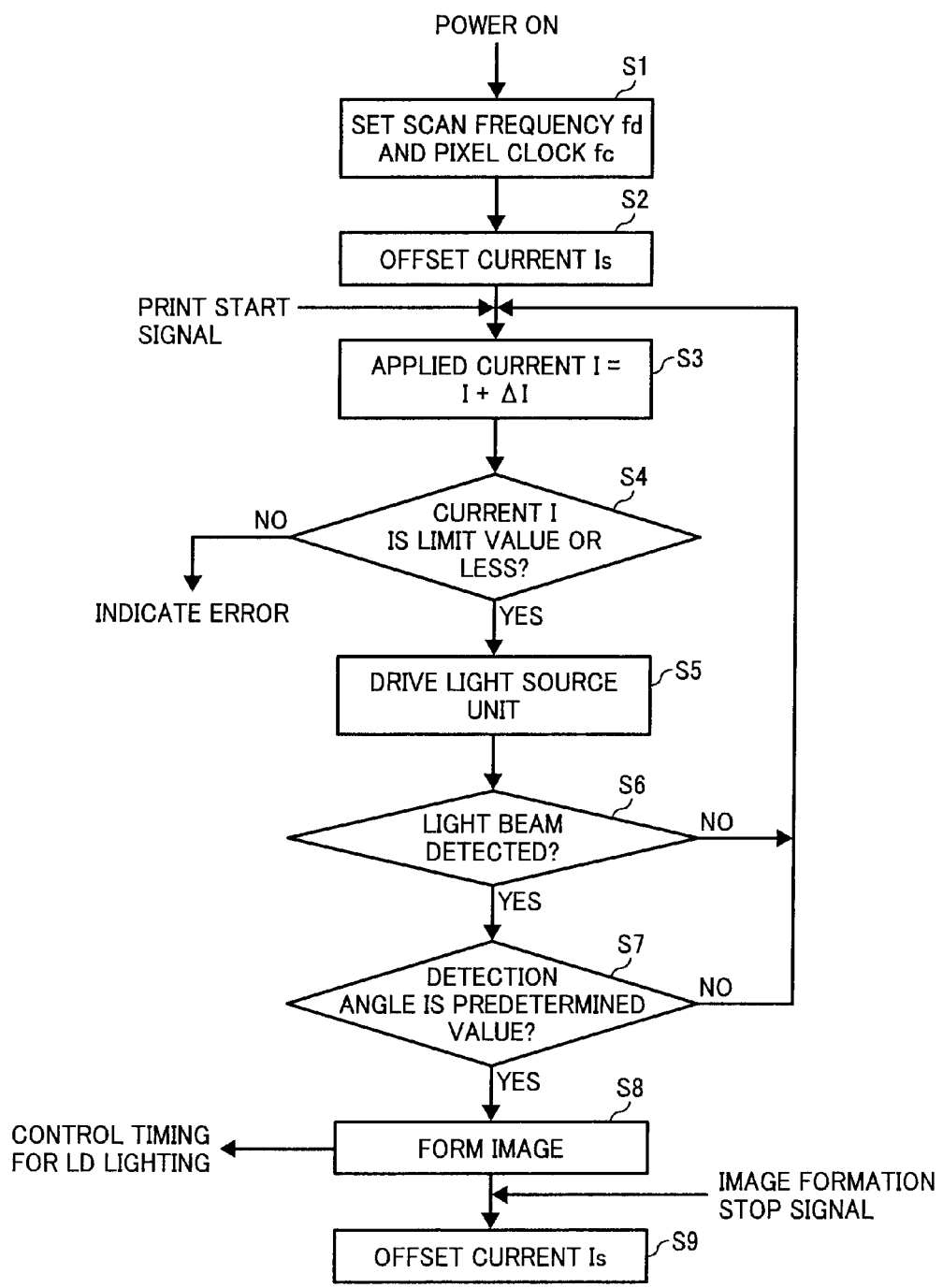
FIG. 15 is a flowchart for controlling the vibration mirror 23.

FIG. 15 is a flowchart for controlling the vibration mirror 23. Upon turning-on of main power supply of the optical scan apparatus, scan frequency fd of the vibration mirror 23 and a pixel clock fc for the light source 21, 22 are set to predetermined values (S1).

Then, offset current Is is supplied to the coil pattern of the planer coil (S2). The offset current Is is such a minute current not to drive the vibration mirror 23 but to preheat the coil pattern 71. Preheating the coil pattern 71 can prevent the deflection angle of the vibration mirror 23 from being unstabilized due to unbalanced heat generation and radiation of the coil pattern 71 which occurs when a current flows into a cold vibration mirror 23 at start of driving.

Upon receipt of a print start signal from an external device, a current I applied to the coil pattern 71 is gradually increased until the deflection angle of the vibration mirror 23 reaches a predetermined value (S3).

Then, the current I is judged whether it is equal to or less than a limit value (S4), and when it is, the light sources 21, 22 are driven to emit light beams (S5).

In step S6, a determination is made on whether or not the synchronous detector 81 has detected the light beams. When it has detected, the deflection angle of the vibration mirror 23 is judged as to whether it is a predetermined value or not (S7). At the deflection angle being a predetermined value, an image formation is made (S8). Also, the light sources 21, 22 are controlled according to image signals and at a timing based on the synchronous detection signal.

The deflection angle of the vibration mirror 23 is constantly monitored to be controlled by adjusting the current I to be applied to the coil pattern 71 of the planar coil. At completion of the image formation, the offset current Is is applied to coil pattern 71 in replace of the current I (S9). During standby period for image formation, the coil pattern is continuously preheated.

Figure 16:
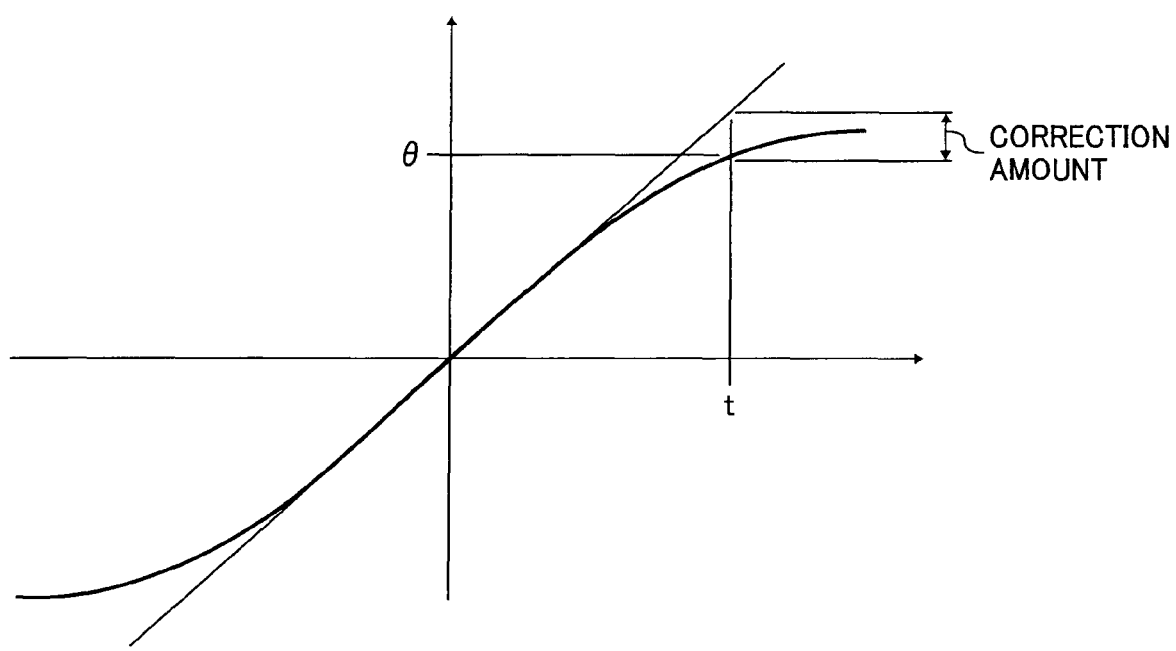
FIG. 16 shows nonlinearity of deflection angle θ of the vibration mirror 23 relative to time.

FIG. 16 shows a correction of nonlinearity of deflection angle θ of the vibration mirror 23 relative to time. For image formation, pixels need be formed on the photoconductive drums 1a to 1d at even spacing in the main scan direction over time. However, as shown in the drawing, the deflection angle θ of the vibration mirror 23 is gradually decreased over time so that the spacing between pixels on the photoconductive drums 1a to 1d is decreased in the main scan direction as the light beam approaches both ends of the main scan area.

Generally, variation in the pixel spacing in the main scan direction can be corrected by use of f-arcsin lens as the fθ lens 30. Here, when a pixel clock has a constant frequency as in a polygon mirror deflecting light beam, it need be controlled in phase in such a manner that the variation in the pixel spacing increases in the main scan direction as the light beam approaches both ends of the main scan area, in order to produce the pixels with equal spacing, that is, move the light beam at a constant velocity on the photoconductive drums 1a to 1d.

Assumed that it take time t for the light beam to sweep from the center of an image to an arbitrary position H in the main scan direction, a relation between the position H and the deflection angle θd is obtained by the following expression (7):

$$H = \omega \times t = (\omega/2\pi f d) \times \sin^{-1}(\theta d/\theta 0) \quad (7)$$

where ω is a constant.

However, there arise two problems. One is that with a large difference in the pixel spacing or a large amount of correction for nonlinearity of the deflection angle, deviation in the power of the fθ lens 30 in the main scan direction will increase as well as variance in the spot size of the light beam on the surfaces of the photoconductive drums 1a to 1d. Another problem is that when the center of deflection angle of the vibration mirror 23 does not coincide with the optical axis of the fθ lens 30, an fθ lens 30 with asymmetric curved surfaces relative to the optical axis need be provided, as described above. To solve these problems, in the present embodiment the phase Δt of the pixel clock is shifted in accordance with a position in the main scan area so as to reduce the deviation in the power of the fθ lens 30 in the main scan direction as much as possible.

When a variance in the deflection angle due to a phase shift of the pixel clock is assumed to be 2Δθ, the following relations hold true:

$$H = (\omega/2\pi fd) \times \sin^{-1}\{(\theta - \Delta\theta)/\theta 0\} \quad (8)$$

$$\Delta\theta/\theta 0 = \sin 2\pi fdt - \sin 2\pi fd(t - \Delta t) \quad (9)$$

If the fθ lens 30 is set to have a power distribution closer to a desired one and the focus position is corrected by shifting the phase Δt of the pixel clock, the following relations will hold true:

$$H = (\omega/2\pi fd) \times \{(\theta - \Delta\theta)/\theta 0\} \quad (10)$$
$$= (\omega/2\pi fd) \times \sin^{-1}(\theta/\theta 0)$$
$$\Delta\theta/\theta 0 = \theta/\theta 0 - \sin^{-1}(\theta/\theta 0)$$

The emission timing of the light sources 21, 22 is controlled in such a manner as to determine a phase Δt (sec.) of a predetermined pixel in the main scan direction by the following relation:

$$(\theta/\theta 0) - \sin^{-1}(\theta/\theta 0) = \sin 2\pi fdt - \sin 2\pi fd(t - \Delta t) \quad (11)$$

Figure 17:
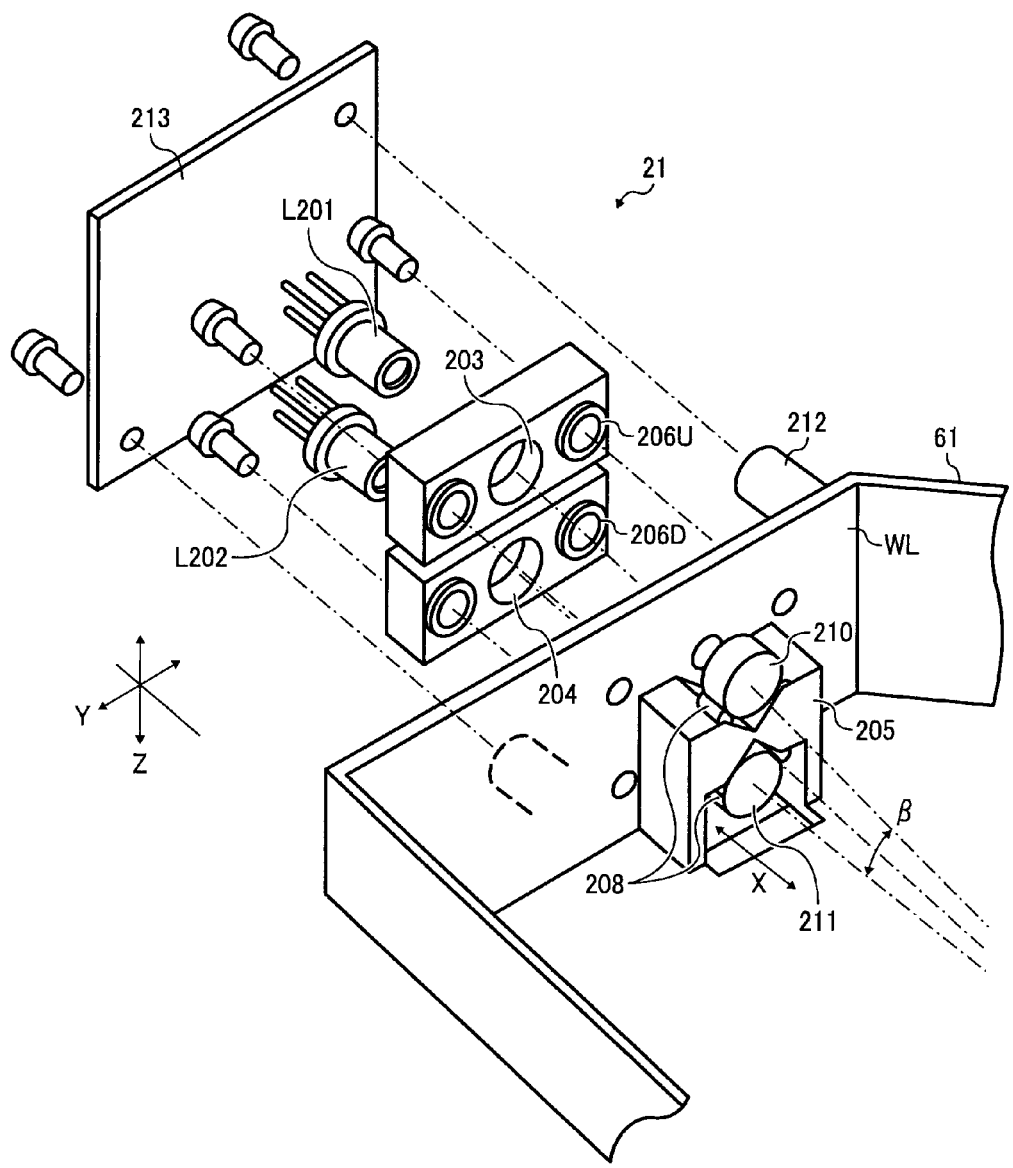
FIG. 17 is an exploded perspective view of a light source 21.

FIG. 17 shows an exploded perspective view of the light source 21 which comprises semiconductor lasers L201, L202 as light emitters and holder members 206U, 206D. After correctly positioned in the outer circumference of a stem, the semiconductor lasers are press fitted into through holes 203, 204 of the holder members 206U, 206D from the back side thereof.

The holder members 206U, 206D are fixed on an outer wall WL of the optical housing 61 with screws so that the optical axes of the semiconductor lasers L201, L202 are decentered relative to respective coupling lenses 210, 211 by a predetermined amount. This enables the light beams from the semiconductor lasers L201, L202 to intersect with each other at 2.5 degrees in the sub scan direction (Z-axis direction in FIG. 17), as described above.

A base 205 having V-form grooves vertically is provided on an inner surface of the outer wall WL with the holder members 206U, 206D thereon. The coupling lenses 210, 211 are disposed on the base 205 such that their outer circumferences abut with the grooves. Thereby, the coupling lenses 210, 211 are positioned in a plane orthogonal to the optical axes of the semiconductor lasers L201, L202. The light source is configured that by rotating the coupling lenses 210, 211 along the V-form grooves, light beams passing through the coupling lenses 210, 211 are adjusted to be collimated light beams in the optical axis direction. Gaps between the coupling lenses 210, 211 and the grooves are filled with a UV adhesive 208, and hardening of the UV adhesive enables fixation of the coupling lenses 210, 211.

According to the present embodiment, the respective positions of the holder members 206U, 206D and the coupling lenses 210, 211 are adjusted while mounted on the outer wall XL. Thereby, the light beams 25 to 28 can be controlled to be incident on the rotation axis of the vibration mirror 23 in the main scan direction (Y-axis direction in FIG. 17).

Moreover, the light beams 25 to 28 can be controlled to be deflected at an arbitrary position of the vibration mirror 23 in the sub scan direction, and to become collimated light beams in the optical axis direction X with surface precision of the vibration mirror 23 taken into consideration. The precision of the light beams incident on the fθ lens 30 is uniformed irrespective of the mounting posture or surface precision of the vibration mirror 23.

A printed circuit board 213 on which the drive circuit for the semiconductor lasers L201, L202 is formed is fixed with screws on two bosses 212 of the outer wall WL.

Generally, the light beam is set to be incident on the rotation axis of the vibration mirror 23. However, in the present embodiment, the optical scan apparatus has an adjuster or an adjust structure for adjusting incidence positions of the light beams on the vibration mirror 23 at least in the main scan direction. Therefore, it is possible for the optical scan apparatus to correct displacement of the incidence positions of the light beams due to the deformation (variance of optical power) of the vibration mirror 23. Accordingly, it is possible to correct, without fail, displacement of the focus positions of the light beams on the photoconductive drums 1a to 1d due to the variance of the optical power of the vibration mirror 23 and form high quality image without unevenness of density accordingly.

The adjuster adjusts exit direction of the light beams from the light source 21. Therefore, the incidence positions of the light beams on the vibration mirror 23 can be adjusted at the same time the positions of the semiconductor lasers 201, 202 constituting the light source 21 and the coupling lenses 210 are 211 are adjusted. This can achieve reduction of the number of adjustments and improvement of productivity of the optical scan apparatus.

Furthermore, according to the present embodiment, the optical scan apparatus comprises the optical imaging system with the vibration mirror 23 which is supported by the torsion shaft 48 and deflects the light beams from the light sources 21, 22 to reciprocatively scan the main scan area. The optical imaging system is designed to have the optical power to shift the focus positions of the light beams from an ideal focus position in accordance with the deflection angle θ of the vibration mirror 23, thereby correcting the shifts of the focus positions on the photoconductive drums 1a to 1d due to the deformation of the vibration mirror 23.

The deformation of the vibration mirror 23 due to its own vibration is substantially constant when the effective scan rate (deflection angle θd/maximum deflection angle θ0) thereof is constant. However, there may be a case where the incidence position of the light beam on the vibration mirror 23 is shifted from the rotation axis, changing the maximum deflection angle θ0. Consequently, the focus positions will be shifted differently on the photoconductive drums 1a to 1d. For the purpose of preventing this, the optical scan apparatus of the present embodiment comprises the adjuster which controls the maximum deflection angle θ0 of the vibration mirror 23 to be constant and adjusts the incidence positions of the light beams on the vibration mirror 23 at least in main scan direction, to equalize the shifts of the focus positions caused by the deformation of the vibration mirror 23 on the photoconductive drums 1a to 1d.

As configured above, even with the variance in the optical power of the vibration mirror 23 due to the deformation thereof, it is possible to efficiently correct the focus positions of the light beams on the photoconductive drums 1a to 1d and make the spot sizes of the light beams uniform in the main scan direction. This results in achieving the high quality image formation without uneven density.

Figure 18:
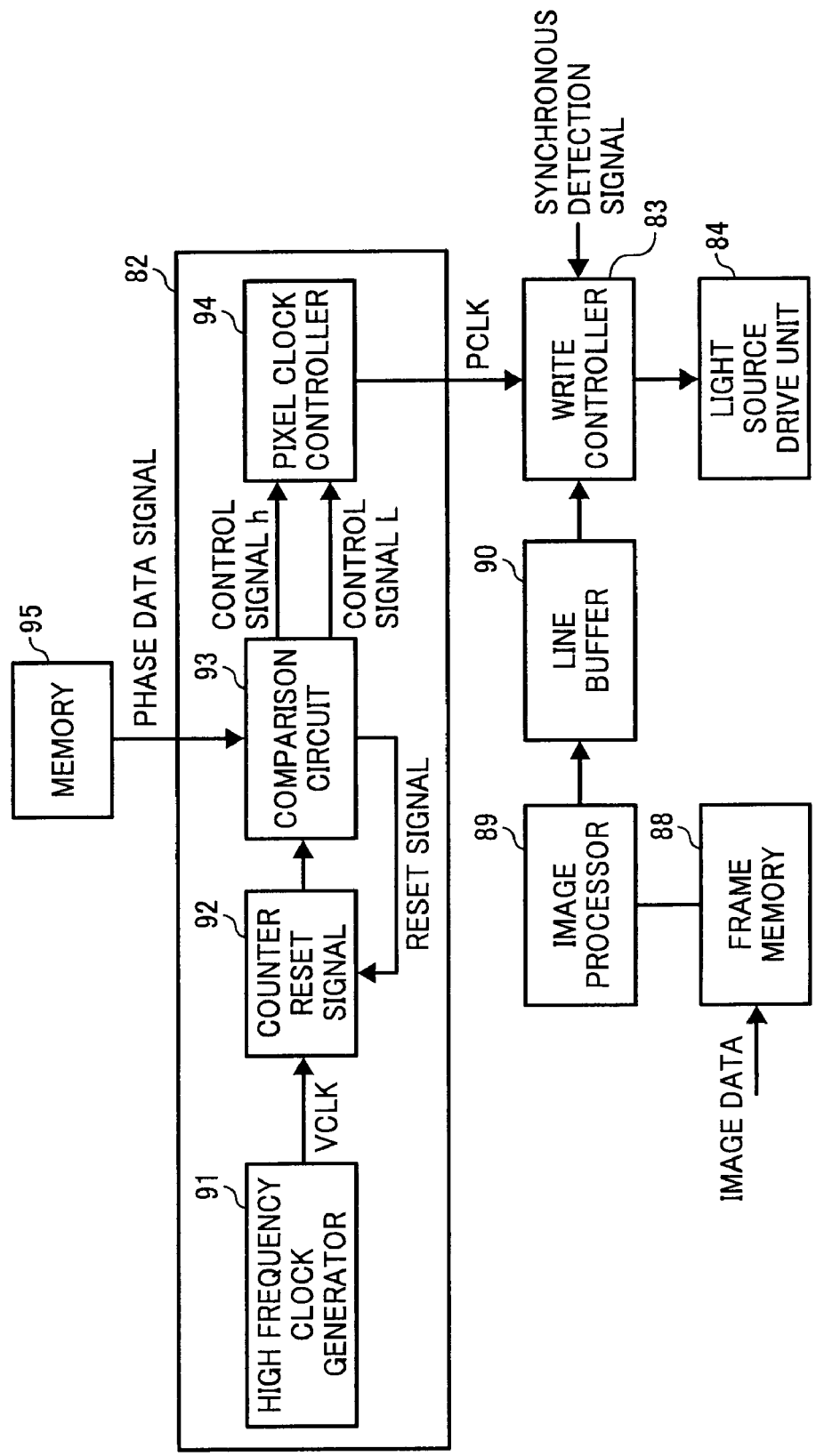
FIG. 18 shows a light source drive unit 84 driving semiconductor lasers L201 to L204 of light sources 21, 22 and peripheral components.

FIG. 18 shows the light source drive unit 84 and periphery components. The light source drive unit 84 drives the semiconductor lasers L201, L202 (FIG. 17) of the light source 21 and those L203, L204 (not shown) of the light source 22. The periphery components are a pixel clock generator 82 including a high frequency clock generator 91, a counter 92, a comparison circuit 93, and a pixel clock controller 94, a write controller 83, a line buffer 90, a frame memory 88, and an image processor 89.

Raster image data in the respective colors are temporarily stored in the frame memory 88 and sequentially read therefrom by the image processor 89. Referring to preceding and succeeding image data, image data on each scan line are formed from the read image data in accordance with halftone matrix pattern and transferred to the line buffer 90.

The write controller 83 reads the image data from the line buffer 90 by a synchronous detection signal as a trigger and outputs it to the light source drive unit 84 which drives the semiconductor lasers L201 to L204 according to modulation data which is image data superimposed on a clock signal output from the pixel clock generator 82.

Then, the pixel clock generator 82 modulates the semiconductor lasers L201 to L204. Therein, the counter 92 counts high frequency clocks VCLK generated by the frequency clock generator 91. The comparison circuit 93 compares a counter value, a value L preset according to duty ratio, and a phase data signal H which is supplied from exterior for transition timing for pixel clocks and indicates an amount of phase shift.

The pixel clock generator 82 outputs a control signal L signifying a falling of the pixel clock PCLK, when the counter value coincides with the preset value L while it outputs a control signal h signifying a rising of the pixel clock PCLK, when the counter value coincides with the phase data signal H. Concurrently with the output of the control signal h, the counter 92 is reset and counts up again from zero to form a continuous pulse train.

The pixel clock generator 82 receives the phase data signal H at every clock, and generates pixel clocks PCLK whose pulse cycles are sequentially varied. Note that in the present embodiment the pixel clock PCLK is set to be 1/8 of the high frequency clock VCLK, that is, the phase of the pixel clock can be shifted by resolution of 1/8 of the high frequency clock VCLK.

Figure 19:
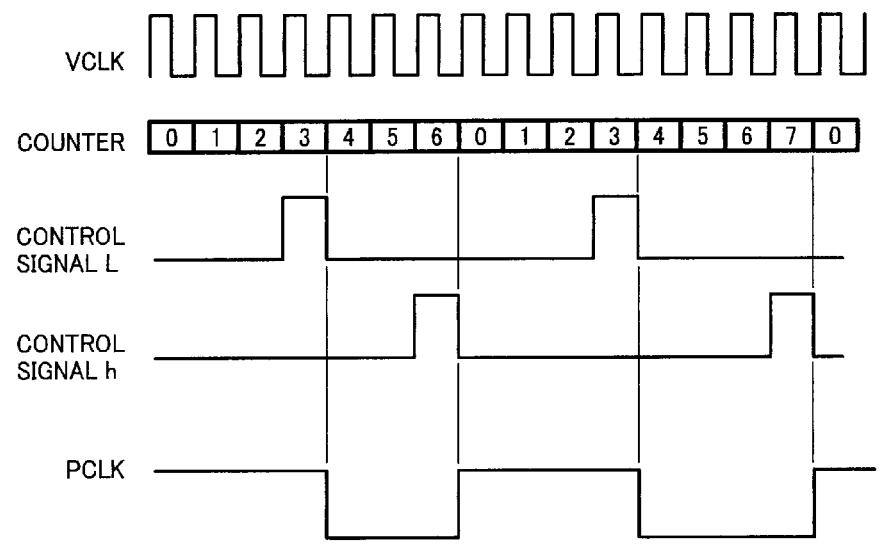
FIG. 19 is a timing chart for a pixel clock generator 82 when phase of a pixel clock PCLK of a pixel is shifted by ⅛ clock.

FIG. 19 is a timing chart for delaying an arbitrary pixel clock PCLK by 1/8 clock when duty ratio is 50% and the preset value is 3, for example. At the value of the counter 92 being 4, the pixel clock PCLK is fallen. Upon the phase data signal H being 6 given, the pixel clock PCLK is risen at the value of the counter 92 being 7. Concurrently, the counter 92 is reset to zero. At the value of the counter 92 being 4, the pixel clock PCLK is fallen again. Then, for delaying the pixel clock PCLK in phase by 1/8 clock, when the phase data signal H being 7 is given, the pixel clock PCLK is risen at the value of the counter 92 being 8. Thereby, the pulse cycles of adjacent pixel clocks PCLK are delayed by 1/8 clock. Thus generated pixel clocks PCLK are supplied to the light source drive unit 84 which drives the semiconductor lasers according to the pixel clocks and pixel data which is read from the line buffer 90.

Figure 20:
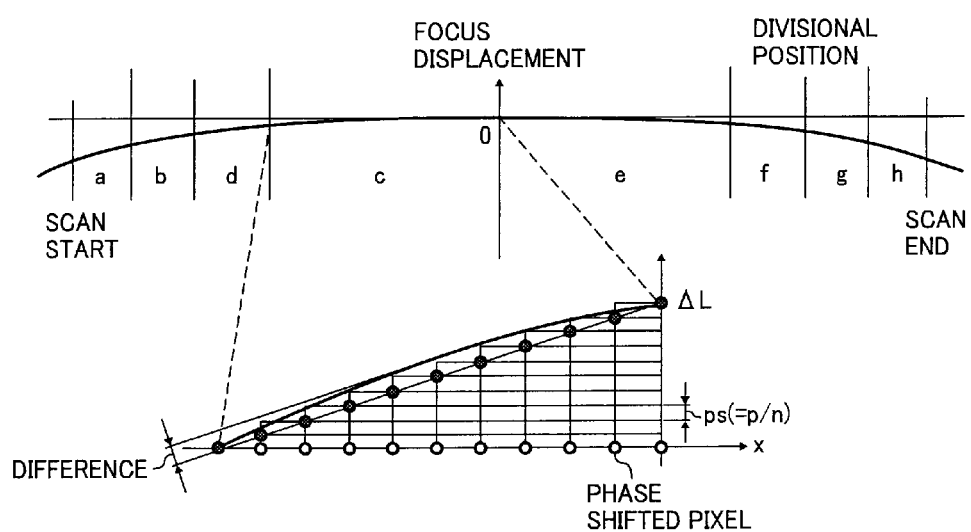
FIG. 20 shows a correction amount for a focus position of a light beam in the main scan direction.

FIG. 20 shows amount of correction for the focus position of the light beam on each pixel of a scan area in the main scan direction. According to the present embodiment, the scan area (from scan start to scan end) is divided into plural areas (eight areas a to h in FIG. 20) to correct the focus position of the light beam in each divided area. The correction is made by dividing a maximum difference $\Delta L$ of the focus position by a phase shift ps in each divided area and conducting broken line approximation for the focus position of the light beam with precision of the phase shift ps at each pixel position. The broken line approximation is conducted so that broken line approximation values are to be equal at end portions of adjacent divided areas.

For example, where the number of pixels in i-area is Ni, phase shift ps at each pixel is $1/n$ ($n=16$, for example) of pixel pitch p, and displacement of focus position of light beam at both ends of each divided area is $\Delta Li$, the following expression (12) holds true:

$$ni = Ni \times p/16 \Delta Li \quad (12)$$

Thus, one pixel in every ni pixels is to be shifted in phase. Accordingly, the number of phase shifts Ni/ni is set for every divided area to correct the focus position of the light beam stepwise.

Here, at the pixel clock being fc, phase difference $\Delta t$ at the N-th pixel is obtained by the following expression (13) using the number of phase shifts Ni/ni:

$$\Delta t = 1/16 fc \times \int (Ni/ni) di \quad (13)$$

The phase difference $\Delta t$ is obtained from the number of phase shifts previously made.

Note that the widths of the divided areas can be set either even or uneven, and the number of divided areas can be arbitrary. However, the widths of the divided areas are preferably 1/4 of pixel pitch p or less since a large phase shift at each pixel is conspicuous on an image. In contrast, a small phase shift leads to an increase in the number of phase shifts and increase of memory capacitance so that the less the number of divided areas, the better. Therefore, with the above taken into consideration, it is effective that a divided area with a large shift of the focus position is set to be in small width while a divided area with a small shift of the focus position is set to be in large width.

Also note that the semiconductor lasers L201 to L204 are each provided with a light amount sensor which is mounted in a laser package and detects, for each scan, amounts of backlights of the light beams 25 to 28 before reaching the photoconductive drums 1a to 1d. Then, the amounts of the light beams 25 to 28 are made constant during a single scan by controlling amounts of current supplied to the semiconductor lasers L201 to L204.

Figure 21:
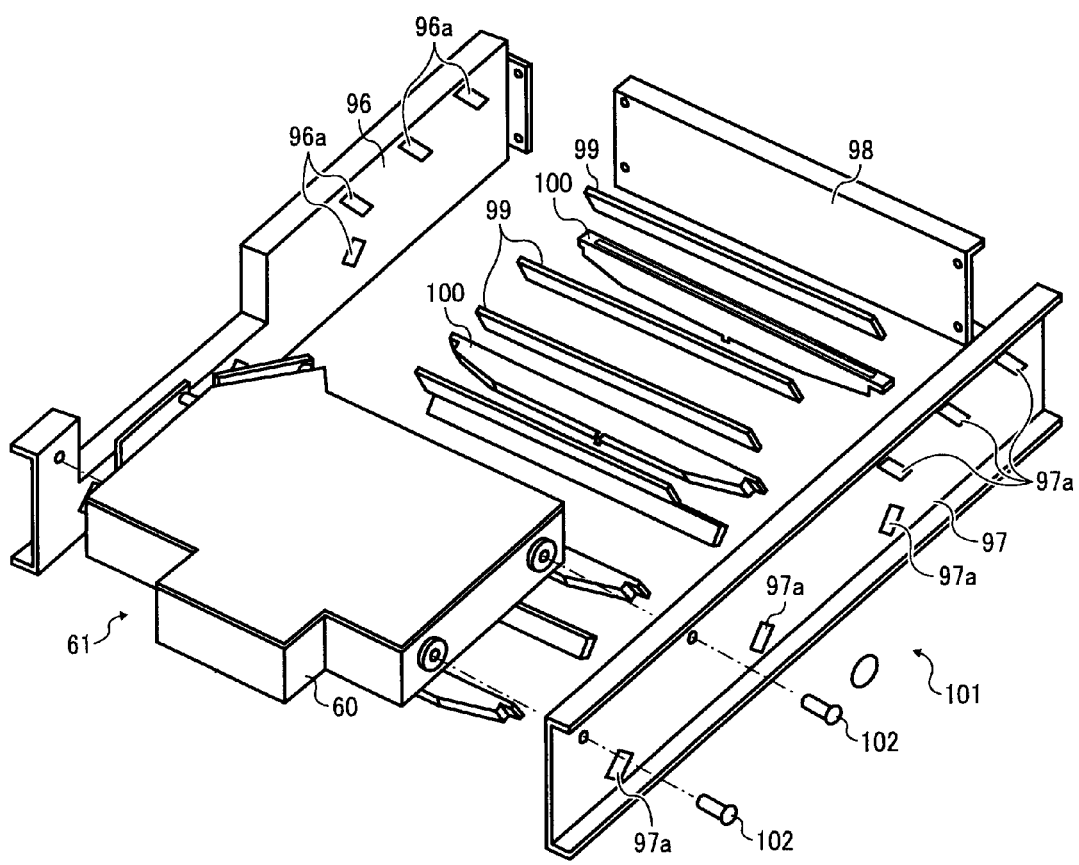
FIG. 21 shows housing of the optical scan apparatus.
Figure 22:
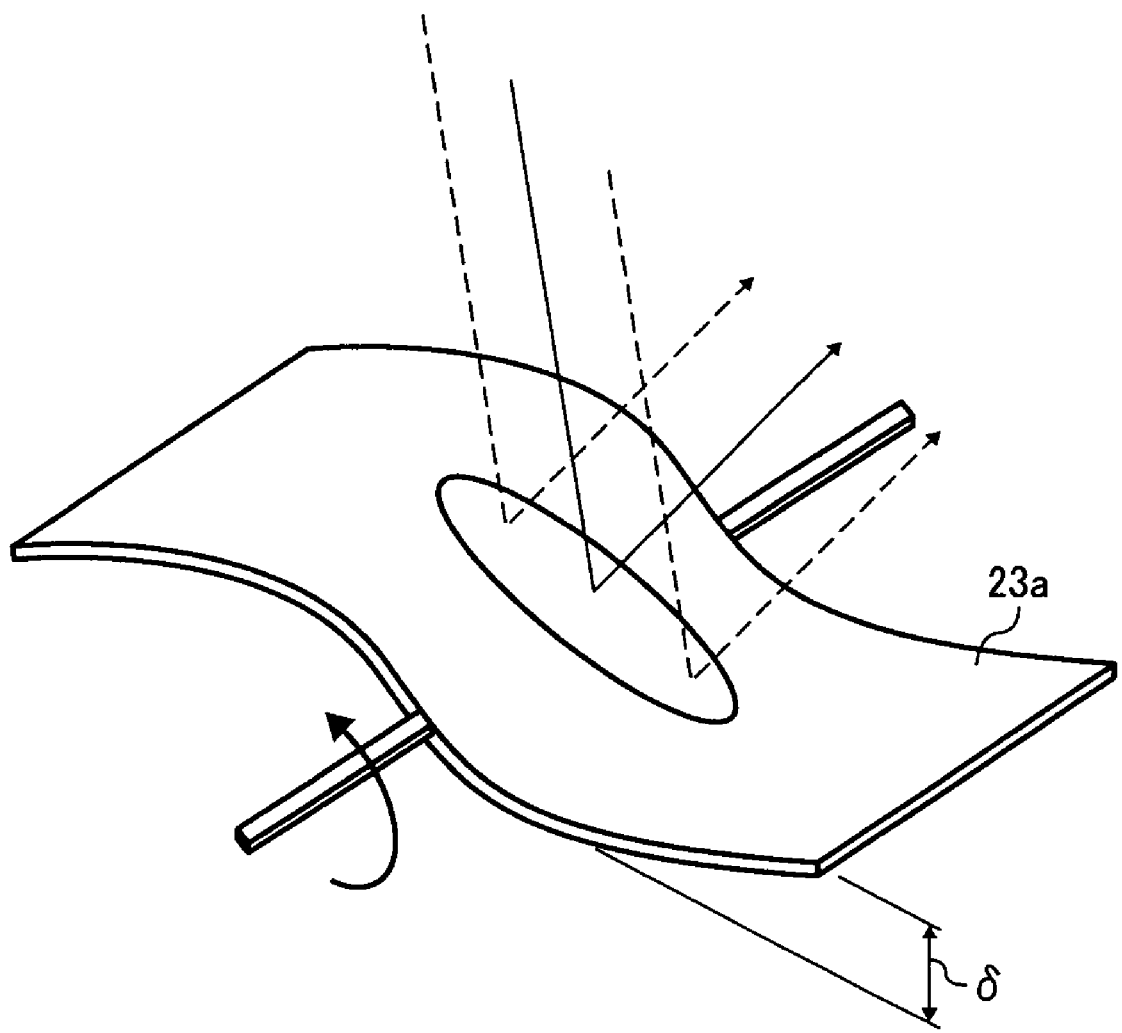
Figure 23A:
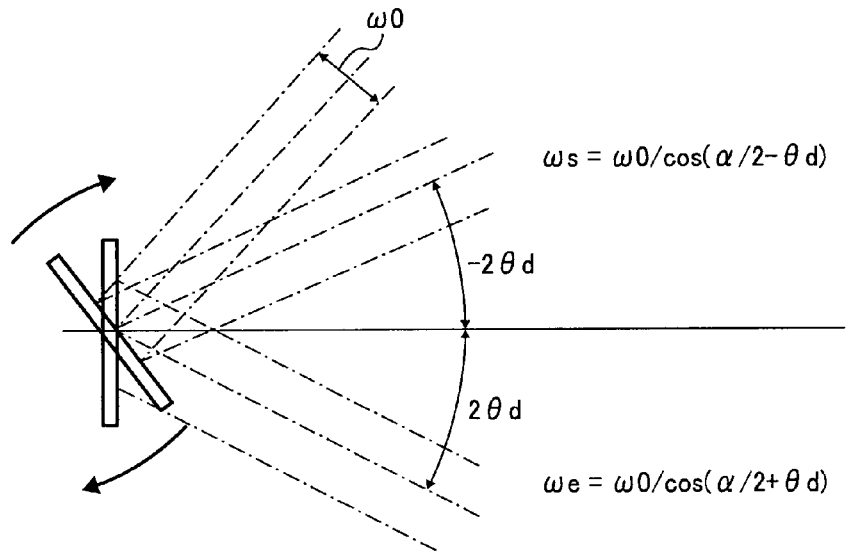
Figure 23B:
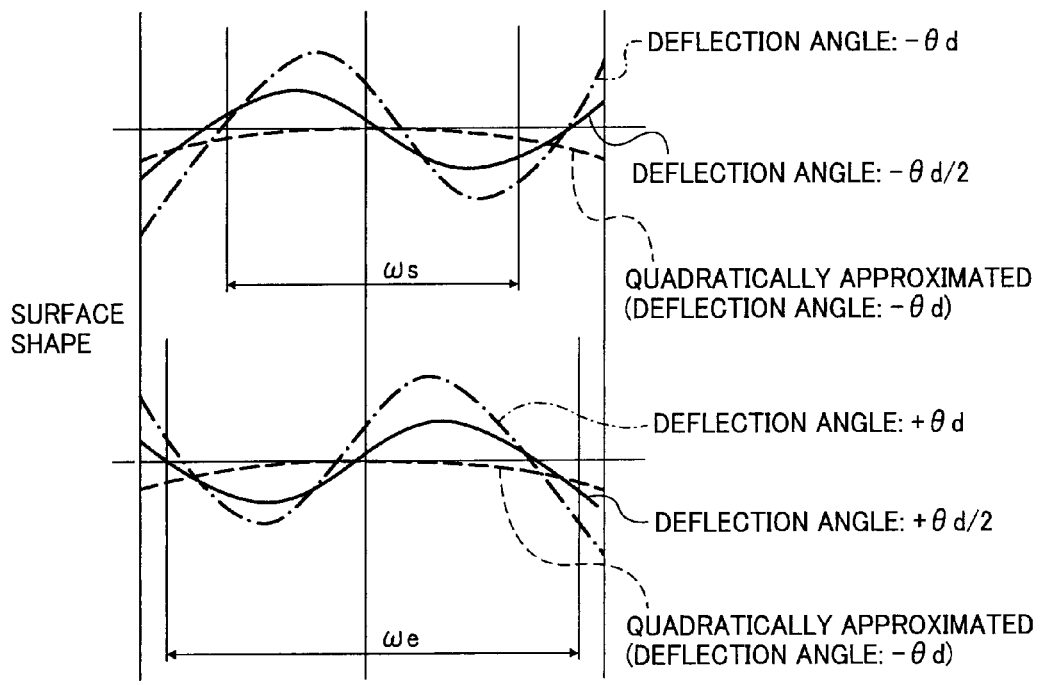

FIG. 21 is a schematic perspective view of the housing of the optical scan apparatus including the optical housing 61 and a return mirror support portion. The optical housing 61 contains the light sources 21, 22, vibration mirror module VMM, fθ lens 30 and else, as shown in FIG. 6. Holder members 203, 204 for the light source 21 with not-shown semiconductor lasers L201, L202 and holder members 203, 204 for the light source 22 with not-shown semiconductor lasers L203, L204 are mounted on the outer wall of a case of the housing 61 molded with resin. The vibration mirror module VMM is placed in a small area surrounded by the side wall 60 with the transparent window 63. The optical housing 61 is sandwiched by side plates 96, 97 and fixed thereto and a reinforced plate 98 with screws 102. The side plates have rectangular holes 96a, 97a, respectively by which return mirrors 99 and toroidal lenses 100 are bridged and supported.

Note that the light source drive unit 84 and its peripheral components shown in FIG. 18 function as a correction unit which corrects the focus positions of the light beams shown in FIG. 20.

The present embodiment has described an example in which the optical scan apparatus is applied to the image formation apparatus as a digital copying machine, a laser printer, or the like. However, the present invention is not limited thereto. It is applicable to an optical scan type barcode reader, a laser radar for automobiles, or else.

Second Embodiment

Hereinafter, an optical scan apparatus according to the second embodiment of the present invention will be described with reference to FIGS. 24 to 47.

Figure 24:
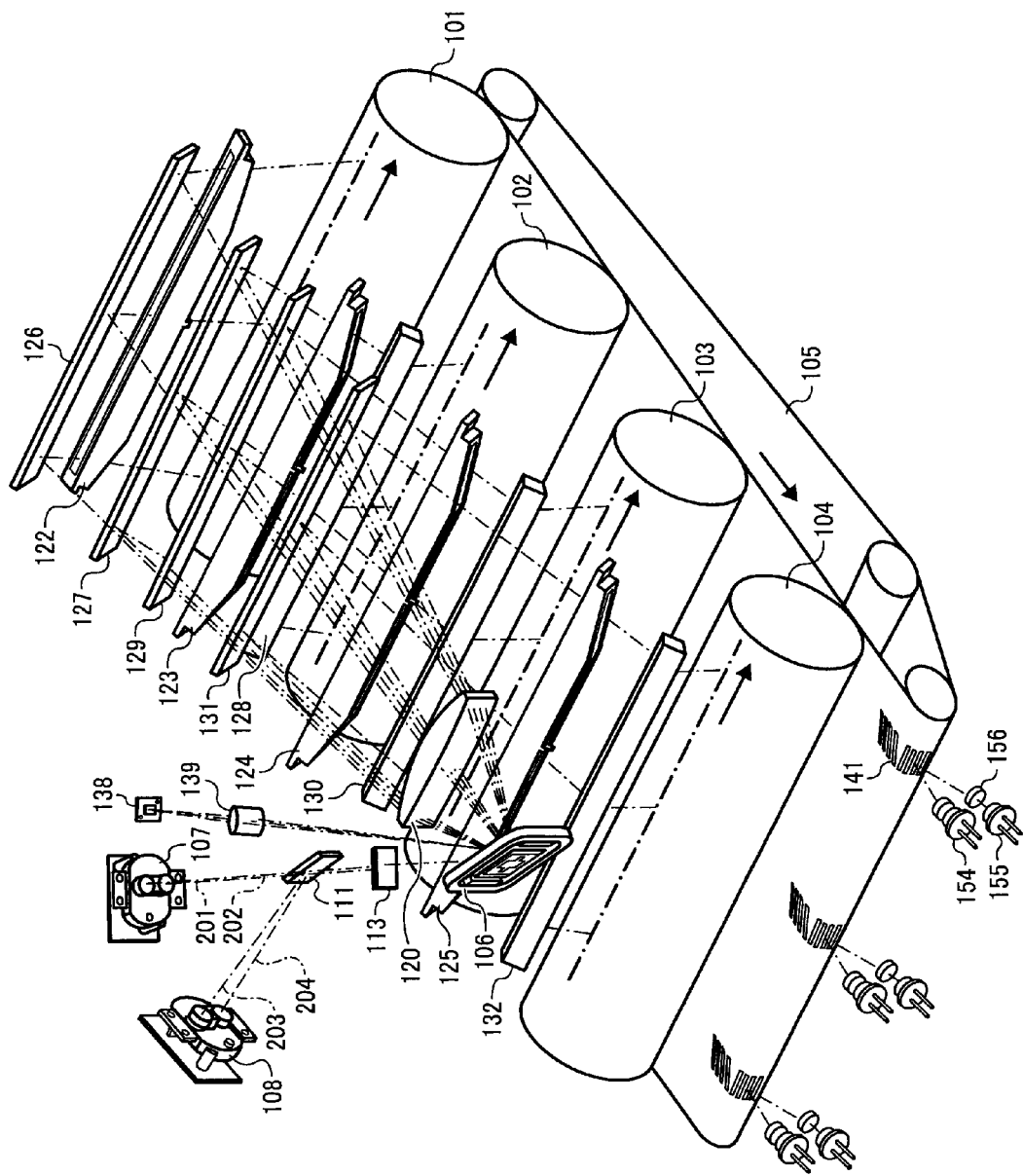
FIG. 24 is a schematic perspective view of an image formation apparatus incorporating an optical scan apparatus according to a second embodiment of the present invention.

FIG. 24 schematically shows a four station type image formation apparatus including an optical scan apparatus according to the second embodiment. The optical scan apparatus 126 is composed of light sources emitting light beams, a vibration mirror deflecting the light beams emitted from the light sources to scan a scan area, a drive unit driving the vibration mirror, and an optical imaging system focusing the light beam deflected by the vibration mirror on a predetermined focus position. The drawing shows photoconductive drums 101, 102, 103, 104, a transfer belt 105, a vibration mirror 106, light sources 107, 108 each including light emitters, an incidence mirror 111, a cylindrical lens 113 and other components.

The photoconductive drums 101 to 104 are disposed with equal interval in a moving direction of the transfer belt 105. The optical scan apparatus scans the photoconductive drums 101 to 104 and is integrally formed therewith. Light beams from the light source 107, 108 are deflected by the vibration mirror 106 and divided to scan the four photoconductive drums 101 to 104 concurrently.

The light beams from the light sources 107, 108 are incident diagonally on the vibration mirror 106 at different incidence angles in the sub scan direction and collectively deflected for scanning. Thus, the light beams deflected by a single vibration mirror 23 can scan plural scan areas at the same time, thereby reducing manufacture cost of the optical scan apparatus. Also, this eliminates necessity for adjusting resonant vibration frequency, scan frequency, deflection angles of plural vibration mirrors, enabling improvement of optical performance and shortening of a manufacture process for the apparatus.

The light source 107 includes two light emitters for the photoconductive drums 101, 102 arranged in the sub scan direction. Likewise, the light source 108 includes two light emitters for the photoconductive drums 103, 104 arranged in the sub scan direction. In each light source, the two light emitters are integrally supported so that the light beams from the two light emitters are set to make an angle of 4.8 degrees, and the light beams intersect with each other in the sub scan direction on the vibration mirror 106. Although each light emitter has two luminous points, FIG. 24 shows only an optical path of a light beam from a single luminous point.

In the present embodiment, the two light emitters in the light source 107 are set so that relative to a normal line of the vibration mirror 106, a light beam from a lower one of the light emitters is inclined upward at 1.5 degrees and a light beam from an upper one is inclined downward at 3.0 degrees. The light source 107 is inclined downward at 0.9 degrees relative to the normal line of the vibration mirror 106. Similarly, the two light emitters in the light source 108 are set so that relative to a normal line of the vibration mirror 106, a light beam from a lower one of the light emitters is inclined upward at 3.3 degrees and a light beam from an upper one is inclined downward at 1.5 degrees. The light source 108 is inclined upward at 0.9 degrees relative to the normal line of the vibration mirror 106.

The light sources 107, 108 are disposed at different positions (heights) in the sub scan direction so that the light beam from the light source 107 and that from the light source 108 are vertically aligned and incident on the vibration mirror 106.

The light beams 201, 202, 203, 204 from the light sources are incident on the incidence mirror 111 to be aligned vertically in the sub scan direction and then incident on the cylindrical lens 113. Also, they are each incident on the vibration mirror 106 at incidence angle of 22.5° (=α/2+θd) relative to the normal line of the vibration mirror 106 in the main scan direction.

The light beams 201 to 204 are converged in the sub scan direction by the cylindrical lens 113 in the vicinity of the vibration mirror 106. Being deflected by the vibration mirror 106, the light beams are diverged from each other and incident on the fθ lens 120, which is shared by all the four stations and has no convergence in the sub scan direction.

Having passed through the fθ lens 120, the light beam 204 from the light source 108 is reflected by a return mirror 126 and focuses a spot on the photoconductive drum 101 via a toroidal lens 122. Thereby, an electrostatic latent image is formed with the light beam 204 on the photoconductive drum 101 according to yellow-color image information (first image formation station).

Here, the combination of the fθ lens 120 and the toroidal lens 122 functions as an optical imaging system as well as the combination of the fθ lens 120 and toroidal lenses 123, 124, 125.

If a rotary device at a constant velocity such as a polygon mirror is used for a deflector of the light beam, use of the fθ lens 120 makes it possible to make the velocity of the light beam constant and form pixels with equal spacing on the photoconductive drum 101. However, with use of the vibration mirror 106, the velocity of the light beam cannot be constant in a range of deflection angles thereof. Because of this, the use of the fθ lens 120 does not assure that pixels are formed with equal spacing on the photoconductive drum 101. The present embodiment deals with the problem by shifting the phase of a pixel clock, which will be described in detail later.

The light beam 203 from the light source 108 is reflected by a return mirror 127 and focuses a spot on the photoconductive drum 102 via the toroidal lens 123 and a return mirror 128. Thereby, an electrostatic latent image is formed with the light beam 203 on the photoconductive drum 102 according to magenta-color image information (second image formation station).

The light beam 201 from the light source 107 is reflected by a return mirror 129 and focuses a spot on the photoconductive drum 103 via the toroidal lens 124 and a return mirror 130. Thereby, an electrostatic latent image is formed with the light beam 201 on the photoconductive drum 103 according to cyan-color image information (third image formation station).

The light beam 202 from the light source 107 is reflected by a return mirror 131 and focuses a spot on the photoconductive drum 104 via the toroidal lens 125 and a return mirror 132. Thereby, an electrostatic latent image is formed with the light beam 202 on the photoconductive drum 104 according to black-color image information (fourth image formation station).

In the present embodiment, the electrostatic latent image corresponding to black color is formed with the light beam 202 which is incident on the vibration mirror 106 at a small incidence angle. This is because with a large incidence angle of the light beam on the vibration mirror 106 in the sub scan direction, a warp occurs in a scan line, deteriorating optical performance of the apparatus. Especially, a warp of a scan line in black color conspicuously degrades image quality.

Figure 25:
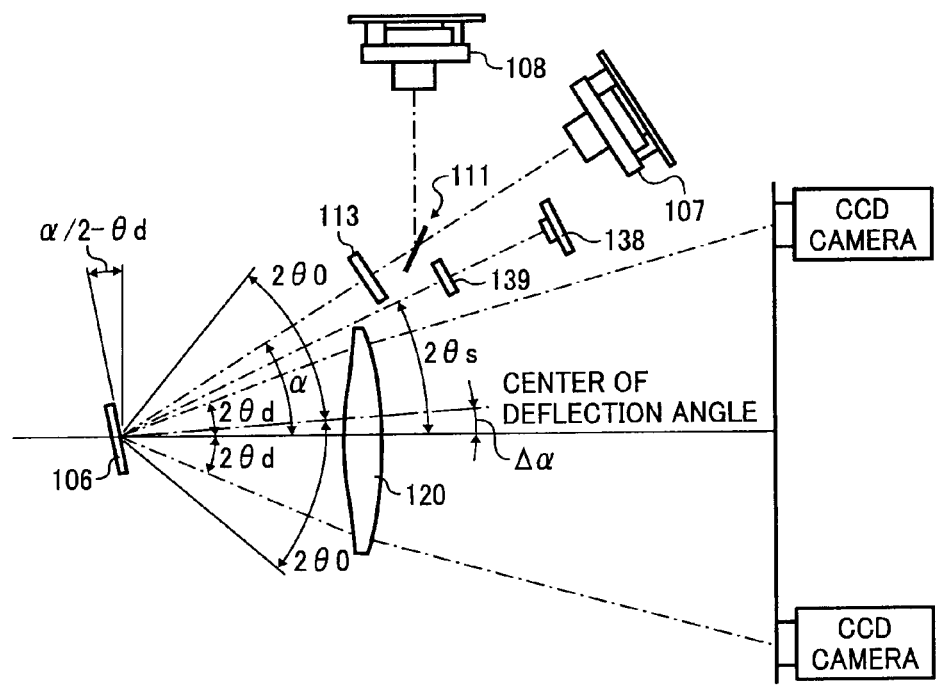
FIG. 25 is a schematic flat view of the optical scan apparatus according to the second embodiment of the present invention.

FIG. 25 shows optical paths of the light beams from the light source 107, 108 to the photoconductive drums 101 to 104, a synchronous detector 138, and an imaging lens 139.

The light beams deflected by the vibration mirror 106 pass by the fθ lens 120, are gathered by the imaging lens 139 and incident on the synchronous detector 138. The optical scan apparatus according to the second embodiment is configured that synchronous detection signals are generated for each image formation station according to output signals from the synchronous detector 138 to the light beams.

According to the present embodiment, in order to suppress effective scan rate (θd/θ0) to a predetermined value (0.6, for example) or less, mean incidence angle α of the light beams from the light sources 107, 108 is set to satisfy the following relations (14) and (15):

$$\theta 0 \geq \alpha/2 > \theta d \quad (14)$$

$$\theta 0 \geq \theta s > \theta d \quad (15)$$

where θd is effective deflection angle of the light beams sweeping the photoconductive drums 101 to 104, θs is deflection angle of the light beam at synchronous detection, and θ0 is maximum deflection angle of the light beam. The reason for setting the effective scan rate to 0.6 or less is to set the light beam to scan a scan area within a range of deflection angles at constant velocity as possible.

For example, θ0=25°, θd=15°, α=45°, and θs=18° are set in the drawing. The synchronous detector can be disposed so as to satisfy θs>α/2.

The light beams from the light sources 107, 108 are modulated with image information from an external device and incident on the vibration mirror 106. Then, the light beams is deflected by the vibration mirror 106, to scan and form the electrostatic latent images of the respective colors on the photoconductive drums 101 to 104 (image write). The electrostatic latent images are developed in the respective colors by a not-shown develop unit. The image write can be performed in both or either of forward and backward movements of the vibration mirror 106 by use of a prior art signal processing.

In FIG. 25, the center of deflection angle of the vibration mirror 106 is shifted by Δα relative to the optical axis of the fθ lens 120, that is, shifted towards a light source side. Accordingly, the deflection angle of the vibration mirror 106 varies at scan starting point and scan ending point relative to the center of the deflection angle. This can reduce the spot size of the light beam on the vibration mirror 106 on a scan start side where incidence angle of the light beam is to be larger, compared with a case where the center of the deflection angle of the vibration mirror 106 coincides with the optical axis of the fθ lens 120.

In the present embodiment, however, the vibration mirror 106 is disposed so that the center of deflection angle thereof coincides with the optical axis of the fθ lens 120, that is, Δα=0. The fθ lens 120 and toroidal lens 122 to 125 are configured to have horizontally symmetric curved planes in the main scan direction.

Near the end of downstream of the transfer belt 105 a detector is disposed for detecting positional offsets of toner images in the four colors superimposed on the transfer belt 105. The detector detects offsets of write start positions (main and sub scan resists) of the toner images in main and sub scan directions relative to those of a reference toner image (black image, for example) by reading a detection pattern of the toner images. According to the offsets of the write start positions, the positional offsets of the toner images are periodically corrected.

Such a detector is composed of a LED device 154 for illumination, a photosensor 155, and a condenser lens 156 and disposed at three positions, both ends and center of the transfer belt 105 (FIG. 24).

Figure 26:
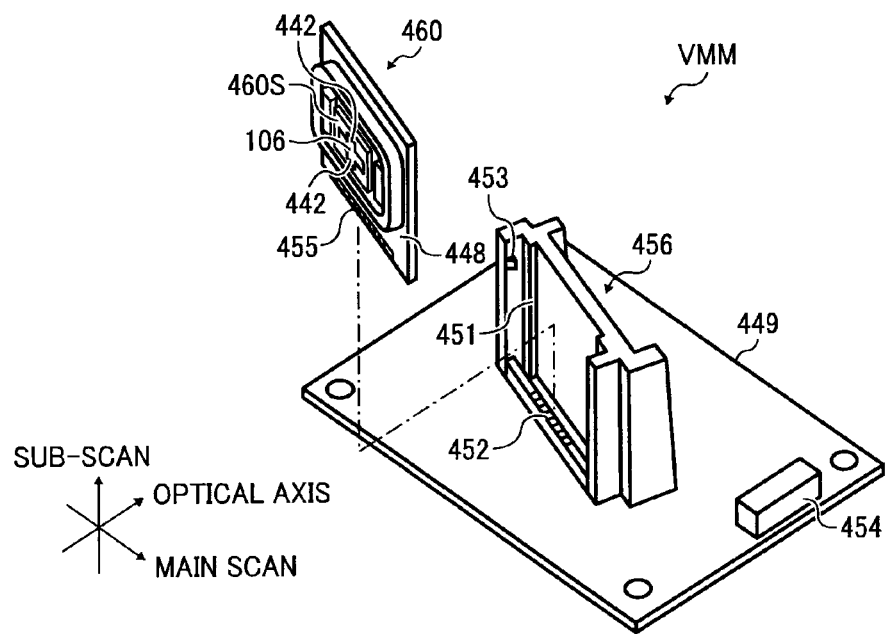
FIG. 26 is an exploded perspective view of a vibration mirror module VMM for the optical scan apparatus according to the second embodiment of the present invention.

FIG. 26 shows a vibration mirror module VMM for the optical scan apparatus according to the present embodiment. The vibration mirror module VMM comprises a vibration mirror unit 460, a mirror body 460S, a torsion shaft 442 (also refer to FIG. 28A), a substrate 448, a support member 456, a circuit board 449, a position determiner 451, a support member side connector 452, a holding pin 453, a connector 454, and a substrate side connector 455.

In the present embodiment, rotation torque of the vibration mirror 106 is generated by electromagnetic drive technique as described in the following, for example.

The vibration mirror 106 is supported by the torsion shaft 442, and made of a single silicon substrate by etching as described later.

The support member 456 is molded with resin and disposed on the circuit board 449 at a predetermined position. It includes the position determiner 451 which determines the position of the substrate 448 so that the torsion shaft 442 is orthogonal to the optical axis of the fθ lens 120 and the normal line of the vibration mirror 106 is inclined in the main scan direction at a predetermined angle (22.5° in the present embodiment). It also includes the support member side connector 452 with metal terminals to get in contact with the substrate side connector 455 formed on a side of the substrate 48, when the substrate 448 is mounted therein.

With the substrate 448 mounted in the support member 456, the substrate side connector 455 is inserted into the support member side connector 452 to electrically connect the substrate 448 and support member 456. Also, both ends of the substrate 448 are supported by the position determiner 451 and the holding pin 453 of the support member 456. The substrate 448 is detachable from the support member 456. With such a configuration, the vibration mirror 106 is made replaceable when necessary.

Note that control IC, a crystal oscillator and the like constituting a drive circuit of the vibration mirror unit 460 are mounted on the circuit board 449 to output/input power supply and control signals via the connector 454.

Figure 27:
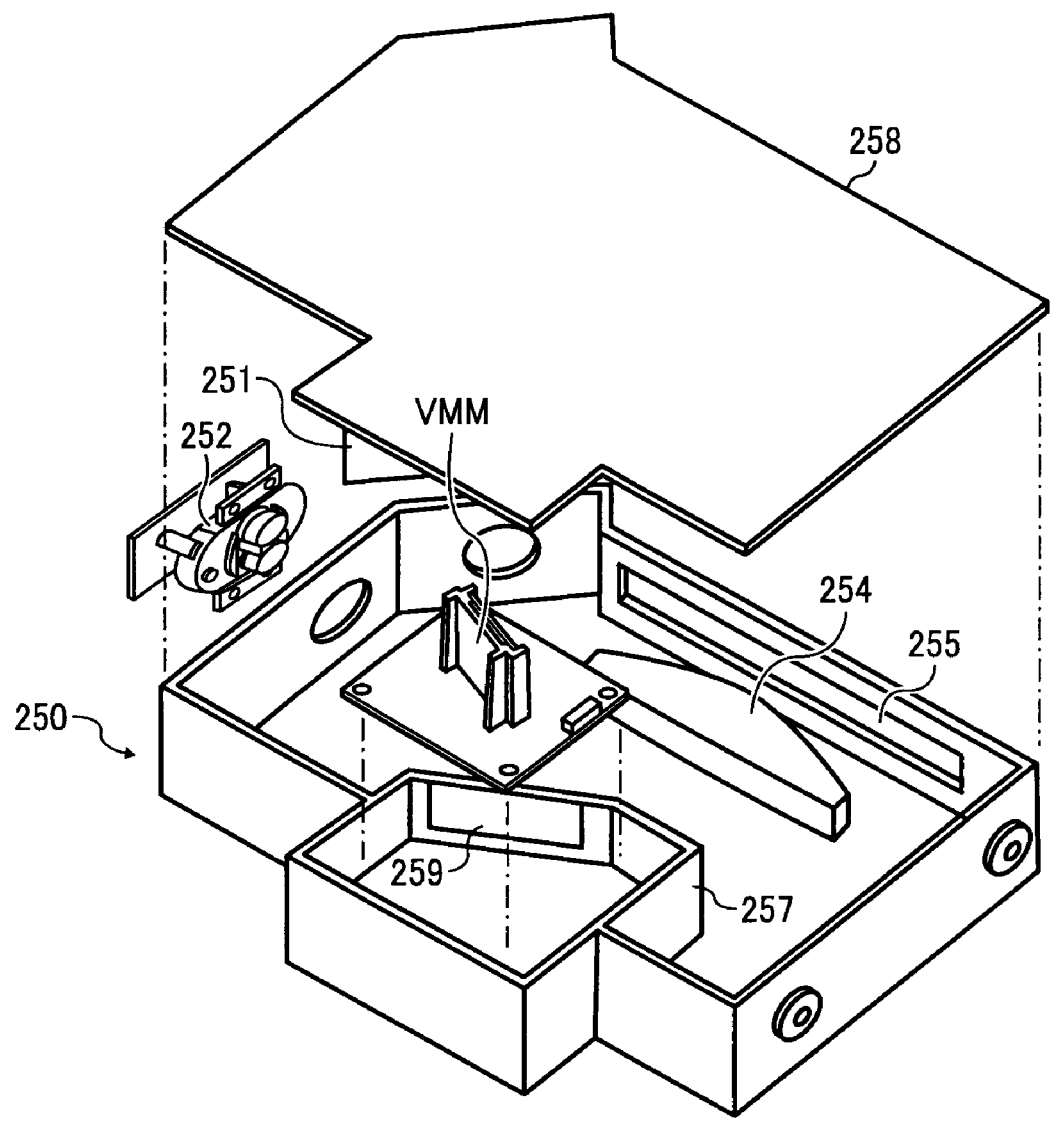
FIG. 27 is a schematic perspective view of an optical housing 250.

FIG. 27 shows an optical housing 250 on which the vibration mirror module VMM is mounted. As shown in the drawing the optical housing 250 is integrated with a side wall 257 to surround the vibration mirror module VMM.

The side wall 257 is provided with a rectangular transparent window 259 through which the light beam passes. The fθ lens 254 is fixed on the bottom surface of the optical housing 250.

The upper end of the side wall 257 is sealed with an upper cover 258 to airtightly seal the inside of the optical housing 250 and block it from ambient air. This can prevent the deflection angle of the vibration mirror 106 from varying owing to convective ambient air. Light beams are emitted through an exit window 255 to outside.

Figure 28A:
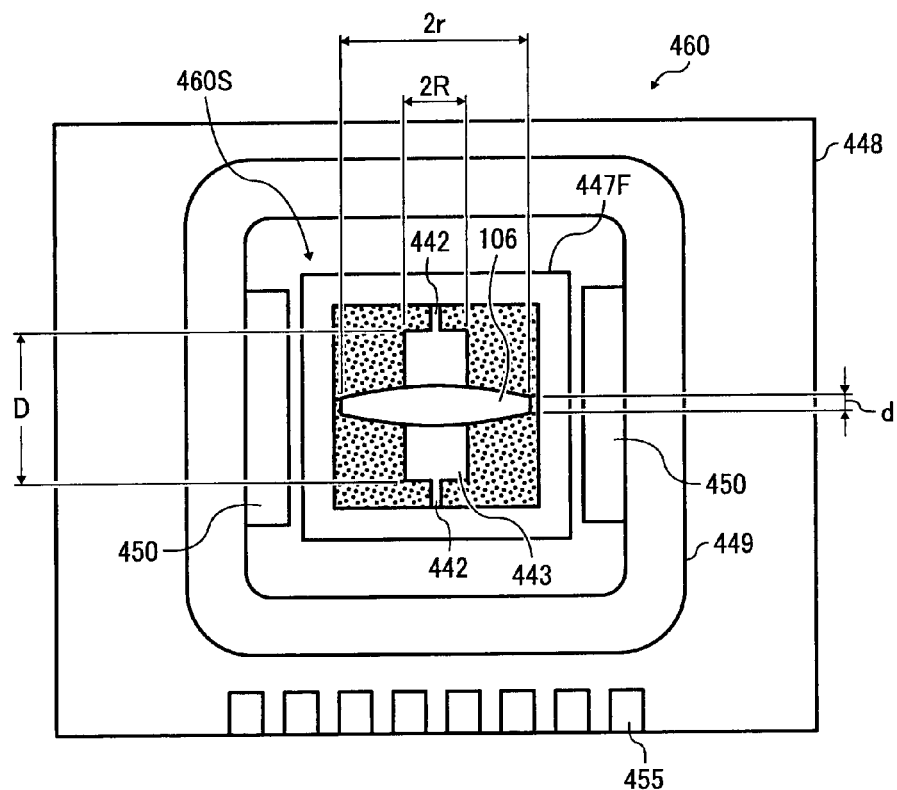
FIG. 28A is a front view of a vibration mirror unit 460.
Figure 28B:
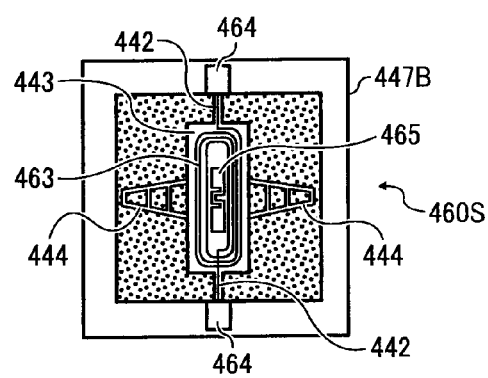
FIG. 28B is a back view thereof.
Figure 28C:
FIG. 28C is a cross sectional view of a substrate side connector 455 of the vibration mirror unit 460.
Figure 29:
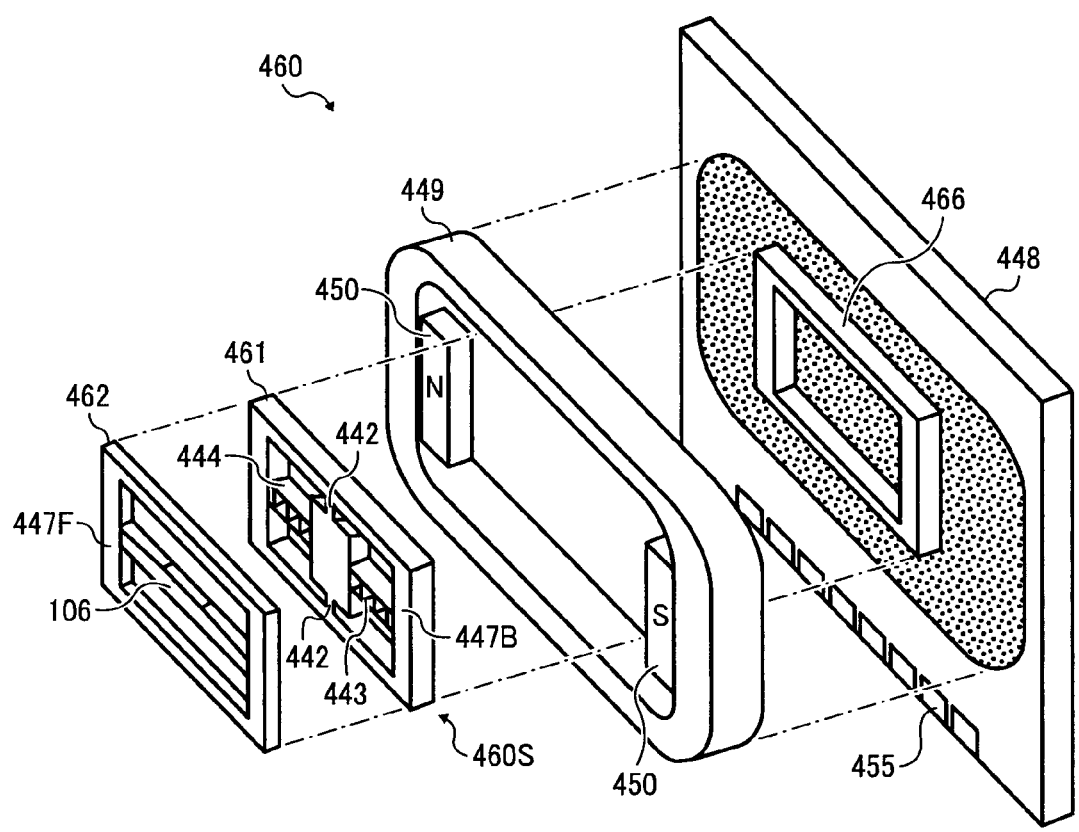
FIG. 29 is an exploded perspective view of the vibration mirror unit 460.

Next, the vibration mirror unit 460 will be described in detail with reference to FIGS. 28A to 28C and 29. FIGS. 28A, 28B show front and back sides of the vibration mirror unit 460, respectively, FIG. 28C is a cross section of a substrate side connector 455, and FIG. 29 is an exploded perspective view of the vibration mirror unit 460. The vibration mirror unit 460 comprises a vibration plate 443, a pair of permanent magnets 450, a first substrate 462, a second substrate 461, a coil pattern of a planar coil 463, terminals 464, a trimming patch 465, and a base 466.

The vibration mirror body 460S comprises a vibration mirror 106 having a mirror surface, a torsion shaft 442 as a rotation axis supporting the vibration mirror 106, and frames 447F, 447B as a support part.

In the present embodiment the vibration mirror body 460 S is manufactured using a wafer which is made of two joined SOI substrates in thickness of 60 µm, 140 µm (first and second substrates) with an oxide film therebetween.

First, an unnecessary portion of the second substrate 461 (140 µm) is removed through dry process by plasma etching, to form the torsion shaft 442, the vibration plate 443 on which the coil pattern 463 of the planar coil is formed, a reinforced beam 444 as a framework of the vibration mirror 106, and the frame 447B.

Next, an unnecessary portion of the first substrate 462 (60 µm) is removed by anisotropic etching such as KOH to form the vibration mirror 106 and the frame 447F. Lastly, an oxide film is removed from around the vibration mirror body 460S, separating the vibration mirror body 460S from the first and second substrates 462, 461.

The widths of the torsion shaft 442 and reinforced beam 444 are set to 40 to 60 µm for the purpose of decreasing inertia moment of the vibration mirror 106 and increasing deflection angle thereof. The reinforced beam 444 helps prevent the vibration mirror 106 from being deformed by the inertia force during its vibration.

Then, the mirror surface is formed on a front surface of the first substrate 462 by evaporating a thin aluminum film. The terminals 464 wired with the coil pattern 463 and the trimming patch 465 are formed on a front surface of the second substrate 461. The coil pattern 463 is formed of a thin copper film via the torsion shaft 442 on the vibration plate 443.

It can be also configured that the vibration plate 443 includes a thin film permanent magnet and the planar coil is formed on the frame 447B.

On the substrate 448 mounted are a frame-like base 466 mounting the vibration mirror body 460S and a yolk 449 surrounding the vibration mirror body 460S. The yolk 449 includes a pair of permanent magnets 450 (south and north poles) facing two side of the vibration mirror body 460S, which generate magnetic field in a direction orthogonal to the torsion shaft 442.

The vibration mirror body 460S is disposed on the base 466 so that the mirror surface of the vibration mirror 106 is on an opposite side to the substrate 448. In flowing a current between the terminals 464 of the vibration mirror body 460S, Lorentz force is generated on portions of the coil pattern 463 parallel to the torsion shaft 442, twisting the torsion shaft 442 and generating rotation torque T to rotate the vibration mirror 106. With termination of the current flow, return force of the torsion shaft 442 brings the vibration mirror 106 back to an original position. Accordingly, alternately switching the direction of current flow to the coil pattern 463 makes it possible to switch the rotation direction of the vibration mirror 106.

The current switching cycle is set to a close value to a resonant vibration rate f0 which is an inherent vibration rate in a primary vibration mode of the structure with the vibration mirror 106 and the torsion shaft 442 as a rotation axis, to excite and increase deflection angle of the vibration mirror 106.

Generally, scan frequency fd is controlled in accordance with or to follow the resonant vibration rate f0. However, since the resonant frequency f0 is determined by the inertia moment I of the vibration mirror 106, with use of plural vibration mirrors 106 with variance in finished dimension, the vibration mirrors 106 will have different resonant frequencies f0. In such a case, it is hard to allow the scan frequencies fd of the respective vibration mirror 106 to coincide with each other.

The difference in the resonant frequency f0 is generally approximately ±200 Hz depending on performance of the manufacture process of the vibration mirrors 106. For example, at the scan frequency fd=2 kHz, displacement of a scan line pitch equivalent to 1/10 line will occur, and final displacement on a document of A4 size will be as much as several dozen mm in the sub scan direction.

In order to prevent the displacement, plural bandwidths of several Hz around the scan frequency fd can be set, for example, at ±2.5 Hz in which deflection angle of the vibration mirror 106 is adjustable by gain adjustment. Vibration mirror modules VMM are ranked in advance according to the bandwidths and a range of variances in the resonant frequency f0. Accordingly, with use of vibration mirror modules VMM in the same rank (bandwidth), plural vibration mirrors 106 can be driven at the same scan frequency fd even with the difference in the resonant frequencies f0 thereof.

However, there is a drawback that when the difference in the resonant frequencies f0 is great, the numbers of ranks and set scan frequencies fd are increased. This increases the number of drive circuits for the vibration mirrors 106 in accordance with the scan frequencies fd and deteriorates production efficiency. Further, in view of replacement of the vibration mirror 106, a vibration mirror in the same rank is needed, in other words, vibration mirrors in every rank need be kept in stock, which is not cost efficient.

In order to reduce the number of ranks as much as possible, prior to mounting the vibration mirror body 460S on the substrate 448, the mass of the vibration mirror 106 is gradually decreased by making a cut in the patch 465 on the back side of the vibration mirror 106 with a carbon dioxide laser or the like. This allows adjustment of inertia moment I of individual vibration mirrors 106 even with the dimensional variance so that their resonant frequencies f0 are substantially equal to each other. In the present embodiment, the resonant frequency f0 is adjusted to be within ±50 Hz and scan frequency fd is pre-fixed in each ranked bandwidth.

Figure 30:
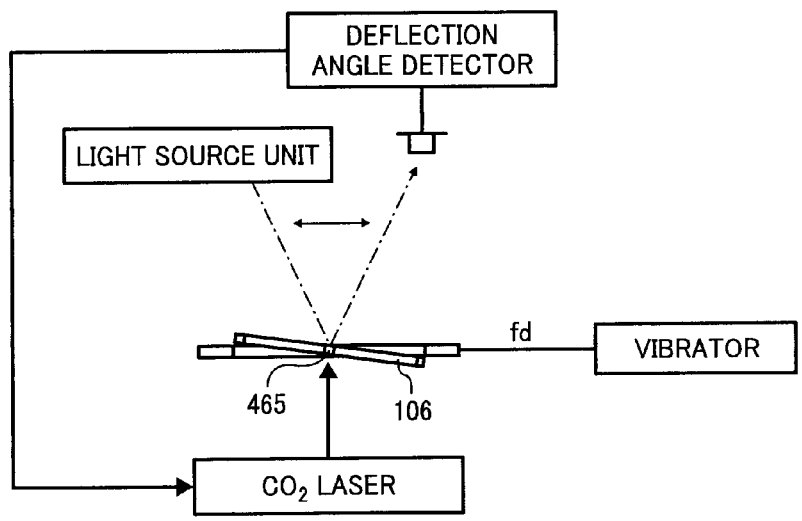
FIG. 30 shows a vibration mirror 106 when resonance frequency f0 is adjusted for changing (trimming) mass thereof.

FIG. 30 shows adjustment of the resonance frequency f0 by varying (trimming) mass of the vibration mirror 106. In such a manner, the resonance frequency f0 of the vibration mirror 106 can be adjusted to be within a predetermined bandwidth without ranking the vibration mirror 106 in accordance with the variance in the resonance frequency f0.

The vibration mirror 106 is given vibration equivalent to the scan frequency fd from a vibrator. The patch 465 on the back side of the vibration mirror 106 is cut with a carbon dioxide laser until resonance abruptly increases the deflection angle of the vibration mirror 106. Magnitude of resonance is detectable by illuminating the front side of the vibration mirror 106 with a light beam and detecting deflection angle of a reflected light beam. Note that the mass of the vibration mirror 106 can be trimmed by adding the mass with balance weights in replace of reducing the mass as above.

The vibration mirrors 106 with the resonance frequencies f0 in ±50 Hz are ranked in every 5 Hz and driven at a scan frequency fd as a center frequency of each rank. This scan frequency fd determines a frequency of a pixel clock (later described), preventing a variation in magnification of the optical imaging systems of plural optical scan apparatuses.

According to the second embodiment, scan time of the light beam in the main scan direction and the deflection angle of the vibration mirror 106 are made constant, thereby suppressing degradation of image quality caused by a magnification deviation in the main scan direction. Moreover, with the constant deflection angle, it is possible to reduce dynamic deformation of the vibration mirror 106 to a certain level in the scan area of the light beam and reduce the degradation of the image quality due to the deformation thereof.

Figure 31:
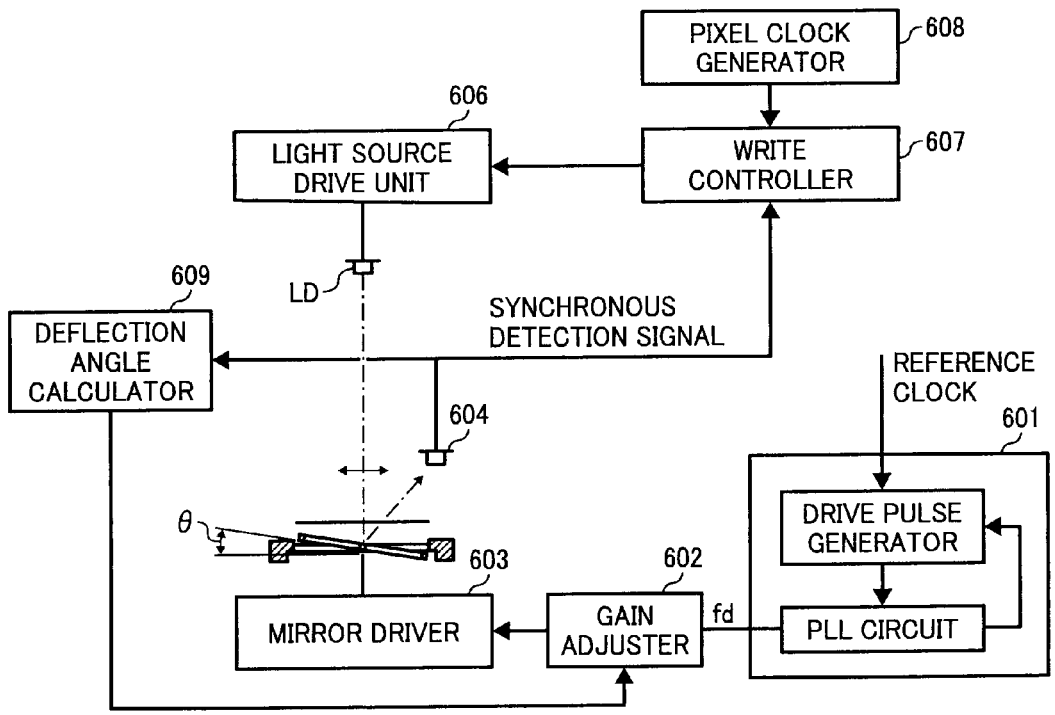
FIG. 31 shows a drive unit for driving the vibration mirror 106.

FIG. 31 shows a drive unit for the vibration mirror 106 which comprises a pixel clock generator 608, a write controller 607, a light source drive unit 606, a deflection angle calculator 609, a phase controller 601 including a drive pulse generator and a PLL (phase lock group) circuit, a gain adjuster 602, and a mirror driver 603. The drive unit is disposed on the circuit board 449.

As described above, the coil pattern 463 of the planer coil on the vibration plate 443 is applied with alternate voltage or pulse wave voltage from the drive unit in order to switch the direction of current flow. Thus, for driving the vibration mirror 106, the drive unit adjusts gain of the current flowing into the coil pattern 463 to set the maximum deflection angle θ0 of the vibration mirror 106 to be constant.

Figure 32:
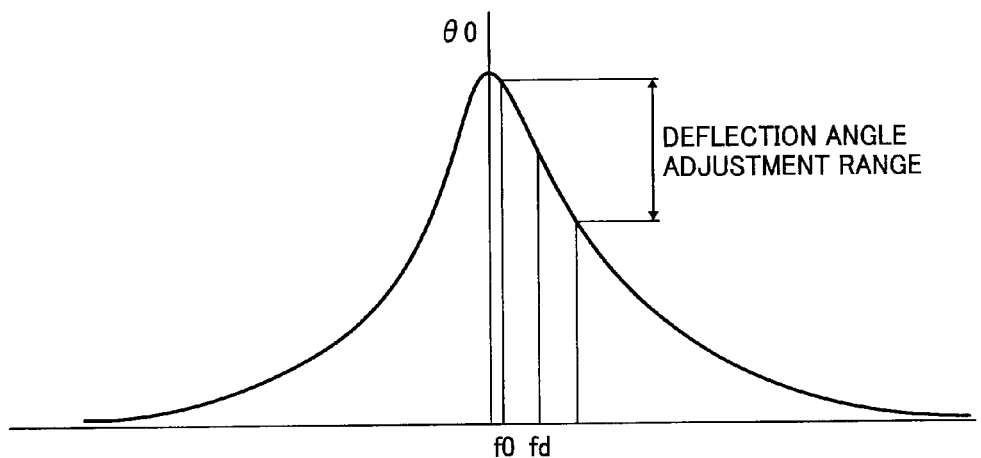
FIG. 32 shows a relation between frequency f for switching direction in which a current flows and deflection angle θ of the vibration mirror 106.

FIG. 32 shows a characteristic of frequency f for switching the direction of current flow relative to the deflection angle θ0 of the vibration mirror 106. Generally, the deflection angle of the vibration mirror 106 is to be maximum when the frequency characteristic shows a peak at the resonance frequency f0, and scan frequency fd thereof matches the resonance frequency f0 as shown in FIG. 32. However, the frequency characteristic sharply varies near the resonance frequency f0, which causes a problem that even with the scan frequency fd set equal to the resonance frequency f0, the resonance frequency f0 may vary due to variance of spring constant or the like owing to temperature change, substantially reducing the deflection angle of the vibration mirror 106. It is therefore difficult to maintain stable operation of the vibration mirror 106 over time.

In light of the problem, the present embodiment is configured that the scan frequency fd is fixed to a single frequency different from the resonance frequency f0 and the deflection angle θ of the vibration mirror 106 is adjusted by gain adjustment of the drive unit. Specifically, the scan frequency fd is set to 2.5 kHz at resonance frequency f0 being 2 kHz to change the maximum deflection angle θ0 of the vibration mirror 106 by ±25 degrees by the gain adjustment of the drive unit.

Temporally, the drive unit detects the maximum deflection angle θ0 of the vibration mirror 106 based on a difference in time between output signals from a synchronous detector 604 at forward and backward scannings of the light beam (later described) and drives the vibration mirror 106 to make the deflection angle θ0 thereof constant.

Figure 33:
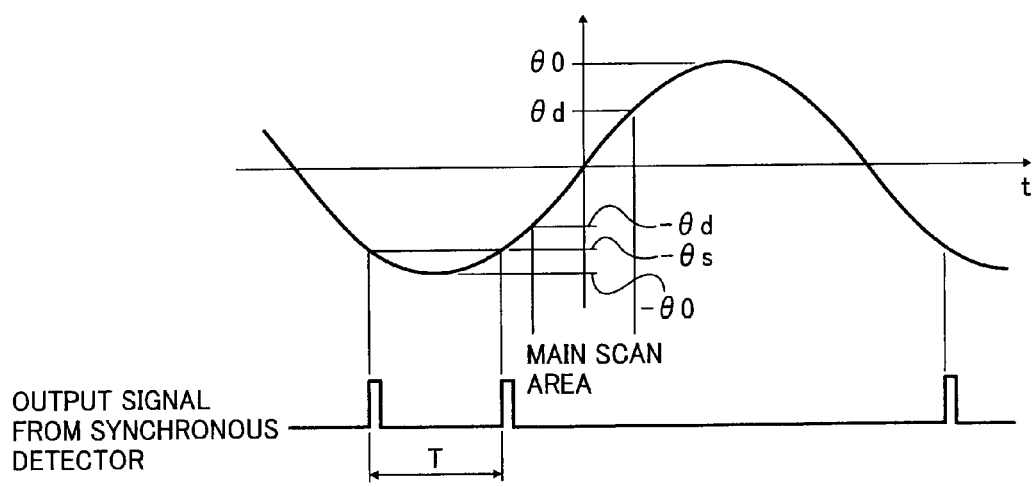
FIG. 33 shows fluctuation of the deflection angle θ of the vibration mirror 106 over time.

FIG. 33 shows that reflection angle of the light beam by the vibration mirror 106 varies with time. The vibration mirror 106 is resonance-vibrated and the deflection angle θ thereof varies with time t in sine waveform as shown in the drawing. The deflection angle θ of the vibration mirror 106 is expressed by the following expression (16):

$$\theta = \theta 0 \times \sin 2\pi fd \cdot t \tag{16}$$

where θ0 is maximum deflection angle of the vibration mirror 106.

Upon detecting a light beam with a deflection angle 2θs, the synchronous detector 604 outputs an output signal at forward and backward movements of the light beam. The deflection angle θs is obtained by the following expression (17):

$$\theta s = \theta 0 \times \cos 2\pi fd \cdot T/2 \tag{17}$$

where T is difference in time between the output signals from the synchronous detector 604. Since θs is fixed, the maximum deflection angle θ0 can be detected by measuring T.

Note that the light emitters are inhibited from emitting the light beams during a period from light beam detection at forward scanning to that at backward scanning, that is, in which the deflection angle θ of the vibration mirror 106 satisfies θ0>θ>θs.

Figure 34:
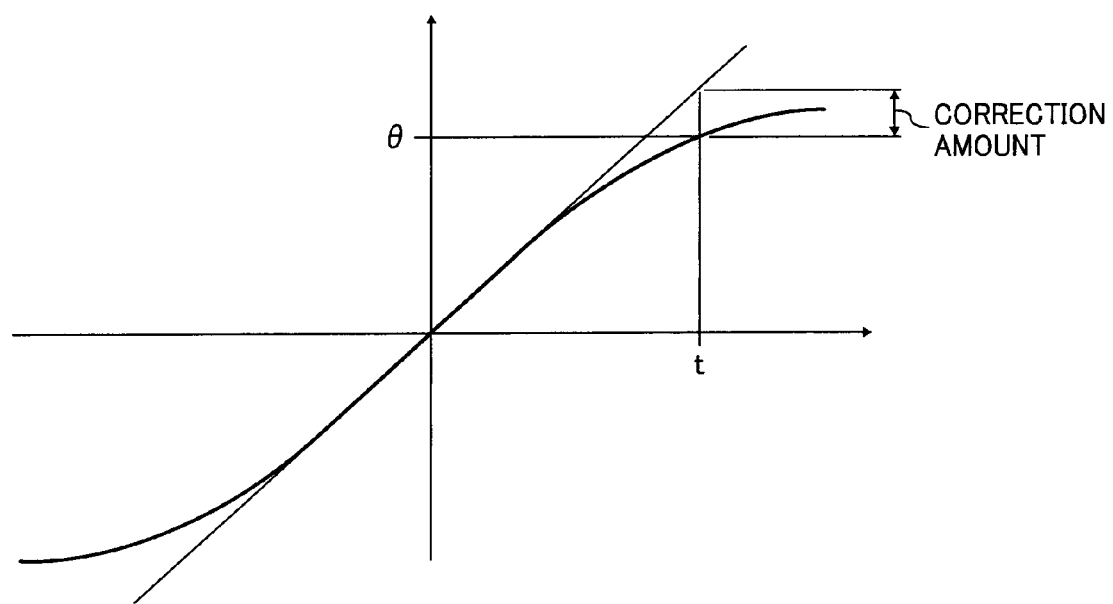
FIG. 34 shows linearity of deflection angle θ of the vibration mirror 106 relative to time.

FIG. 34 shows a correction of nonlinearity of deflection angle θ of the vibration mirror 106 relative to time. For image formation, pixels need be formed on the photoconductive drums 101 to 104 at even spacing in the main scan direction. However, as shown in the drawing, the deflection angle θ of the vibration mirror 106 is gradually decreased over time so that the spacing between pixels on the photoconductive drums 101 to 104 is decreased in the main scan direction as the light beam approaches both ends of the main scan area.

Generally, variation in the pixel spacing in the main scan direction can be corrected by use of f-arcsin lens for the fθ lens 120. Here, when a pixel clock has a constant frequency as in a polygon mirror deflecting light beam, the phase of the pixel clock need be controlled in such a manner that a shift in the pixel spacing increases as the light beam approaches both ends of the main scan area in order to produce the pixels with equal spacing, that is, move the laser beam at a constant velocity on the photoconductive drums 101 to 104.

Assumed that it take time t for the light beam to sweep from the center of an image to an arbitrary position H, a relation between the position H and the deflection angle θd is obtained by the following expression (18):

$$H = \omega \times t = (\omega/2\pi fd) \times \sin^{-1}(\theta d/\theta 0) \tag{18}$$

where ω is a constant.

However, there arise two problems. One is that with a large difference in the pixel spacing or a large amount of correction for nonlinearity of the deflection angle, deviation in the power of the fθ lens 120 in the main scan direction will increase as well as variance in the spot size of the light beam on the surfaces of the photoconductive drums 101 to 104. Another problem is that when the center of deflection angle of the vibration mirror 106 does not coincide with the optical axis of the fθ lens 120, an fθ lens 120 with asymmetric curved surfaces relative to the optical axis need be provided, as described above. To solve these problems, in the present embodiment the phase Δt of the pixel clock is shifted in accordance with a position in the main scan area so as to reduce the deviation in the power of the fθ lens 120 in the main scan direction as much as possible.

When a variance in the deflection angle due to a phase shift of the pixel clock is assumed to be 2Δθ, the following relations hold true:

$$H = (\omega/2\pi fd) \times \sin^{-1}\{(\theta - \Delta\theta)/\theta 0\} \tag{19}$$

$$\Delta\theta/\theta 0 = \sin 2\pi fd \cdot t - \sin 2\pi fd (t - \Delta t) \tag{20}$$

If the fθ lens 120 is set to have a power distribution closer to a desired one and a focus position is corrected by shifting the phase Δt of the pixel clock, the following expressions will hold true:

$$H = (\omega/2\pi fd) \times \{(\theta - \Delta\theta)/\theta 0\} \quad (21)$$
$$= (\omega/2\pi fd) \times \sin^{-1}(\theta/\theta 0)$$

$$\Delta\theta/\theta 0 = \theta/\theta 0 - \sin^{-1}(\theta/\theta 0) \quad (22)$$

The emission timing of the light sources 107, 108 is controlled in such a manner as to determine a phase Δt (sec.) of a predetermined pixel in the main scan direction by the following relation:

$$(\theta/\theta 0) - \sin^{-1}(\theta/\theta 0) = \sin 2\pi fdt - \sin 2\pi fd(t - \Delta t) \quad (23)$$

Figure 35:
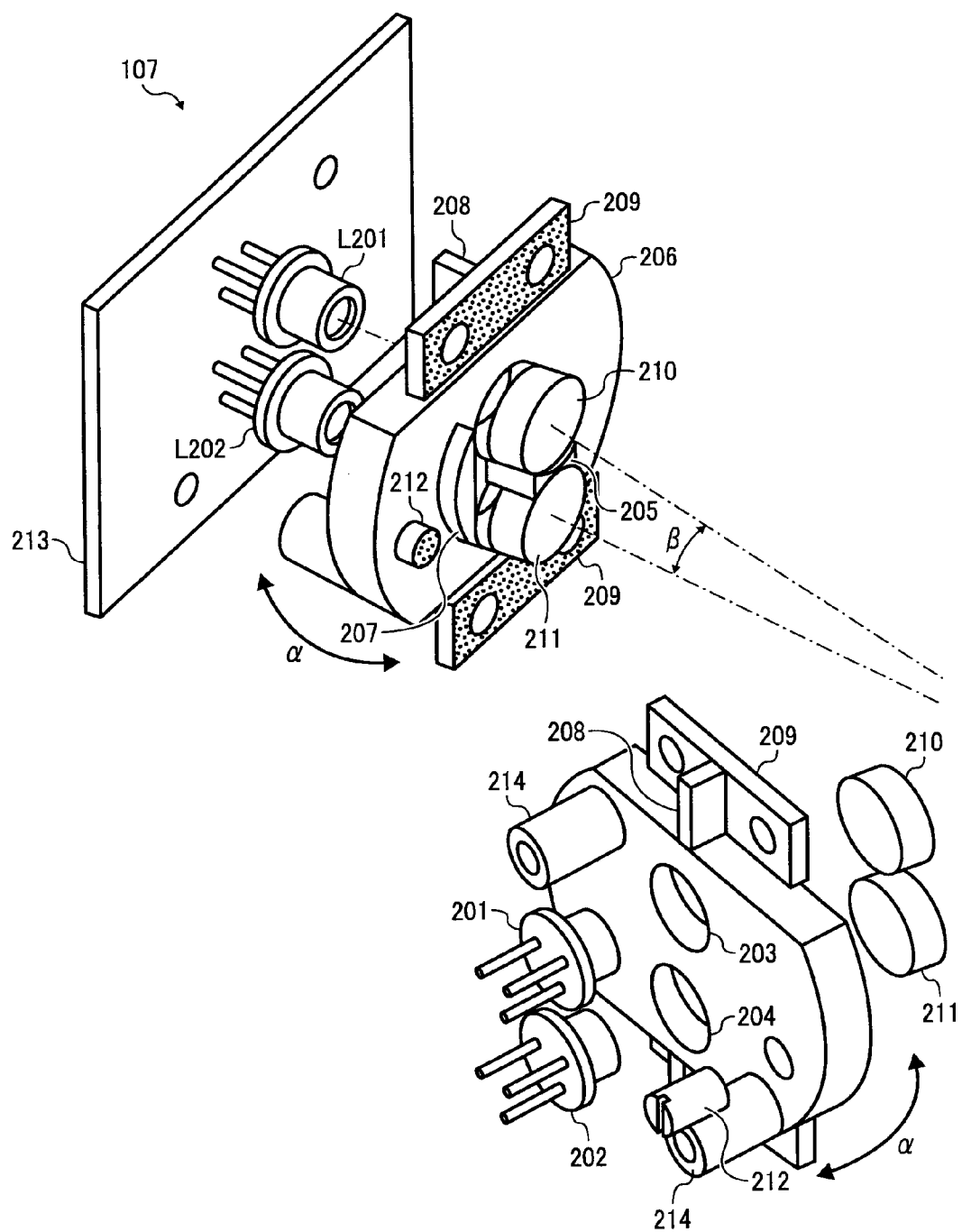
FIG. 35 is an exploded perspective view of a light source 107.

FIG. 35 shows an exploded perspective view of the light source 107 which comprises semiconductor lasers L201, L202 as light emitters, a holder member 206, a protrusion 205, a circular protrusion 207, a support portion 208, a seating surface 209, coupling lenses 210, 211, a printed circuit board 213, and a column support 214. After correctly positioned in the outer circumference of a stem, the semiconductor lasers are press fitted into through holes 203, 204 of the holder member 206 from the back side thereof.

The coupling lenses 210, 211 are mounted on the protrusion 205 with a U-shaped vertical groove by filling a UV adhesive into a gap between the coupling lenses and the protrusion and hardening it. The coupling lenses 210, 211 are positioned in the optical axis direction so that the optical axes thereof coincide with exit axes of light beams of the semiconductor lasers L201, L202 and the optical axes of the light beams from the semiconductor lasers L201, L202 are parallel to each other, when the light source 107 is seen from the above.

When the light source 107 is seen from the side, the coupling lens 210 is slightly decentered so that the light beam from the semiconductor laser L201 intersects with that from the semiconductor laser L202 at a cross angle β of 2.4 degrees.

The seating surface 209 and the support portion 208 are integrally formed with the holder member 206. The position of the light source 107 relative to the optical housing 250 is determined by the circular protrusion 207 on the holder member 206. The light source 107 is attached to the optical housing 250 via the seating surface 209 fixed with screws on a wall of the housing 250.

An adjustor screw (adjuster) 212 is screwed into one end of the holder member 206 in the main scan direction and a tip of the adjustor screw 212 protrudes therefrom and abuts with the wall of the optical housing 250. The holder member 206 is elastically deformed around the support portion 208 according to the protrusion of the adjustor screw 212. This allows inclination of the light source 107 to be adjusted in the direction of arrow (α direction) in FIG. 35. Thereby, it is possible to correct the incidence positions of the light beam on the vibration mirror 106 in the main scan direction.

At both ends of the scan area an optical sensor such as two-dimensional CCD camera (FIG. 25) is provided for measuring the spot size of the light beam in the main scan direction, for example. Then, the inclination of the holder member 206 is adjusted so as to make the spot sizes of the light beam coincide with each other at both ends of the scan area. In order to prevent image degradation which will occur when the spot size of the light beam varies by 10% or more in a single scan line, the inclination of the holder member 206 is adjusted by the adjustor screw 212 so as to satisfy the following relations (24), (25):

$$|r(+)-r| < r \times 0.05 \quad (24)$$

$$|r(-)-r| < r \times 0.05 \quad (25)$$

where spot sizes of the light beam at both ends in the main scan direction are r(+), r(−), and an average of r(+) and r(−) is r. Accordingly, it is possible to allow a difference between the spot sizes r(+) and r(−) to be less than 10% even when the displacement of the focus position is largest.

The column support 214 is provided at two positions on the back side of the holder member 206 to fix the holder member 206 on the printed circuit board 213 on which the drive unit is formed. Lead wires of the semiconductor lasers L201, L202 are also connected to the printed circuit board 213. In such a manner, the light emitters 201, 202 for two stations, the coupling lenses 210, 211 and the printed circuit board 213 of the drive unit are integrally formed.

Figure 36:
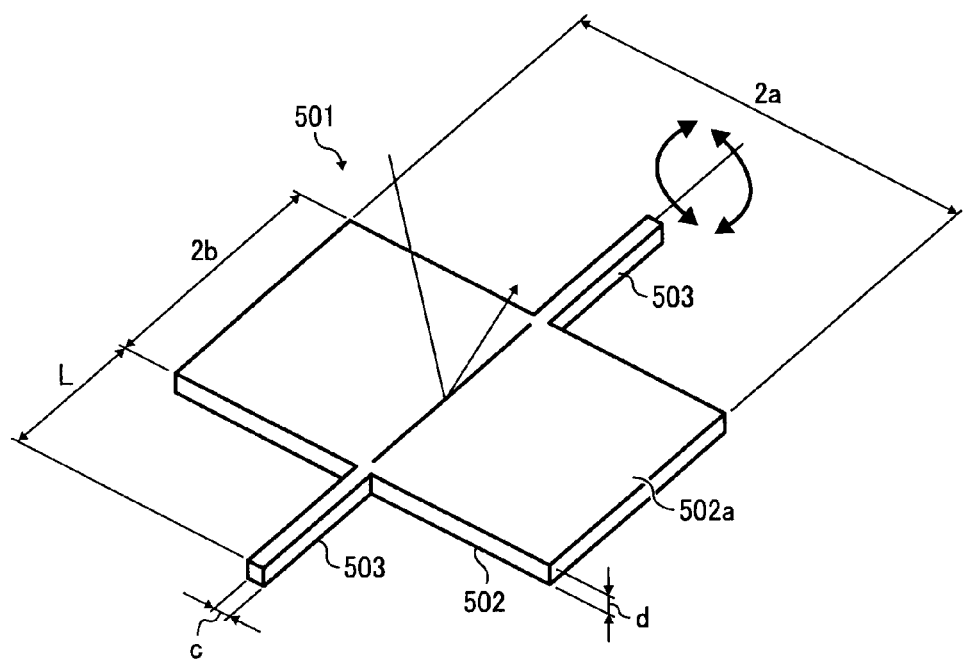
FIG. 36 is a perspective view of a vibration mirror 502 with a torsion shaft 503.
Figure 37:
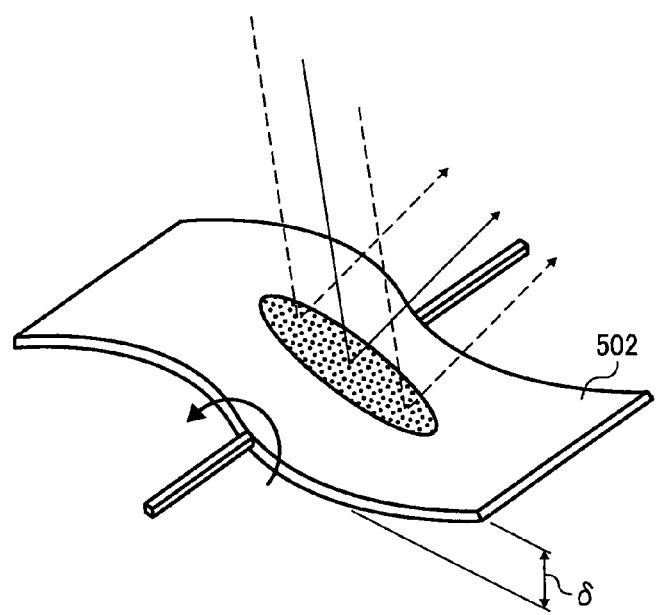
FIG. 37 is a pattern diagram of deformation of the vibration mirror 502.

Hereinafter, a method to make the spot sizes of the light beam coincide at both ends of the scan area will be described in detail with reference to FIGS. 36 to 38. FIG. 36 is an exploded perspective of a vibration mirror 502 with a torsion shaft 503, FIG. 37 is a pattern diagram of deformation of the vibration mirror 502, and FIG. 38 shows a relation between a deformed vibration mirror 502 and a light beam.

While the vibration mirror 502 is driven, a dynamic deformation occurs on the vibration mirror 502 caused by inertia moment and restoring force of the vibration mirror 502, as shown in the following.

Suppose that the vibration mirror 502 in FIG. 36 has width 2a, height 2b, thickness d, the torsion shaft 503 has a length L and a width c, silicon density is ρ, and G is material consonant, the inertia moment I of the vibration mirror 502 is calculated by the following expression (26):

$$\text{Inertia moment } I = (4ab\rho d/3) \times a^2 \quad (26)$$

Figure 38A:
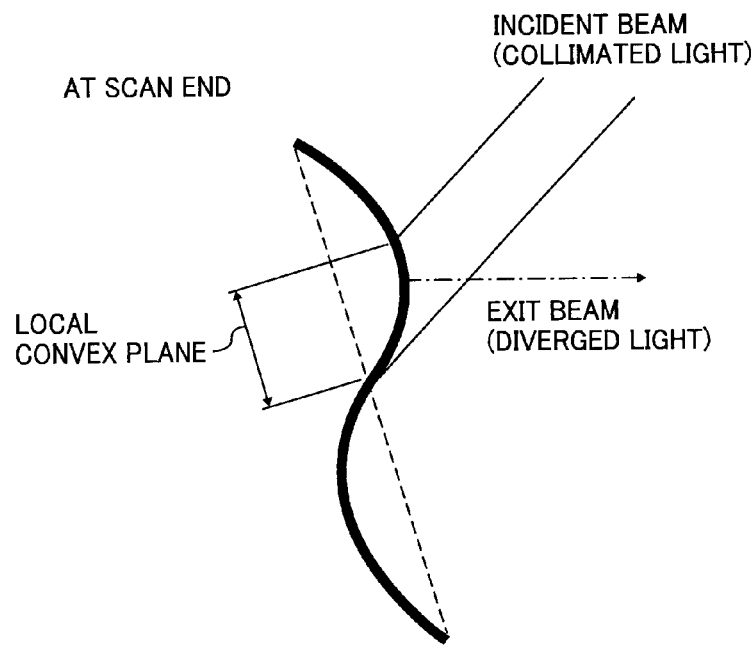
FIGS. 38A and 38B show a relation between a deformed vibration mirror 502 and a light beam.

As shown in the expression (26), local inertia moment I on the vibration mirror 502 is a function of a distance from the rotation axis thereof (torsion shaft 503), and the larger the distance from the rotation axis, the larger the inertia moment I. Moreover, since the vibration mirror 502 is very thin in thickness as several hundred μm, variance in the rotation speed due to the vibration and the inertia moment I exert force on the vicinity of the torsion shaft 503 and ends of the vibration mirror 502 in opposite directions, causing undulating deformation of the vibration mirror 502 as shown in FIG. 37. Furthermore, if the incidence position of the light beam on the vibration mirror 502 is shifted from the rotation axis due to assembling error in the light source 107, the incidence mirror 111, cylindrical lens 113, and vibration mirror module VMM, the focus position of the light beam will be shifted, as shown in FIGS. 38A, 38B.

The deformation of the vibration mirror 502 arises from the inertia moment I and restoring force; therefore, the shape of the deformation will be symmetric relative to the rotation axis at both start and end of the scan area. For example, when a deformed shape of the vibration mirror 502 at the start of the scan area is one shown in FIG. 38A, that at the end of the scan area will be one shown in FIG. 38B.

Figure 38B:
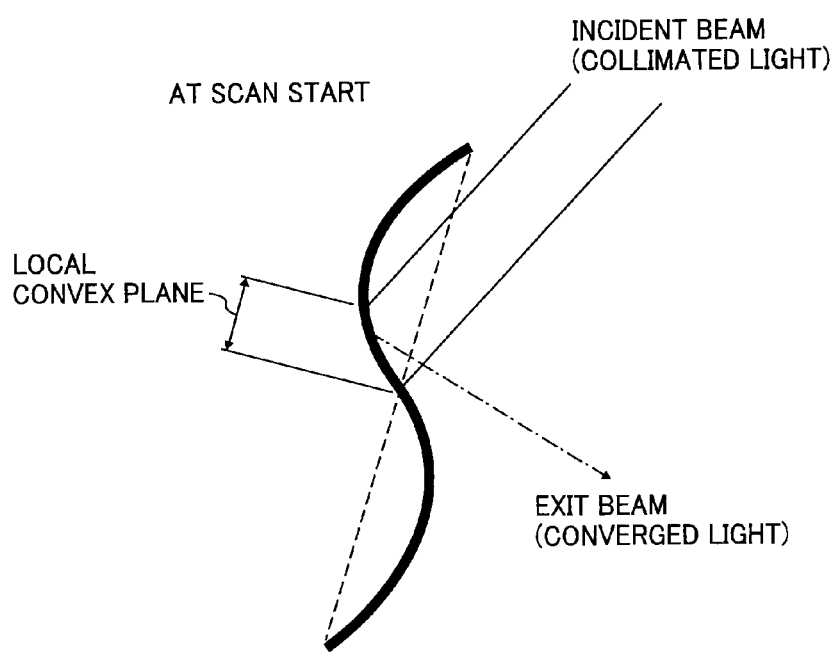

When the incidence position of the light beam on the vibration mirror 502 is shifted from the rotation axis as described above, reflected light therefrom will be convergent light at the start of the scan area (FIG. 38A) while it will be divergent light at the end of the scan area (FIG. 38B). As a result, the focus positions will be displaced from ideal focus positions at both ends of the scan area, which causes unevenness of the spot size of the light beam in the main scan direction.

The provision of the adjuster for adjusting the angles of the light sources 107, 108 in α direction as described above makes it possible to adjust the incidence position of the light beam on the vibration mirror 502 to be on substantial rotation axis. This accordingly allows the spot sizes of the light beam to match with each other in the main scan direction of the scan area or reduce the variation thereof.

Further, the same effect is attainable by an angle adjuster for other optical device disposed prior to the vibration mirror 502 or a position adjuster for the light beam in the main scan direction in replace of the adjuster for the incidence position of the light beam.

As described above, making the spot sizes of the light beam substantially the same at both ends of the main scan area allows the range of defocus positions (later described) to be large, which assures a desired beam spot size. This enables a provision of an optical scan apparatus with high robustness and unsusceptible to environmental changes or tolerance fluctuations.

Figure 39:
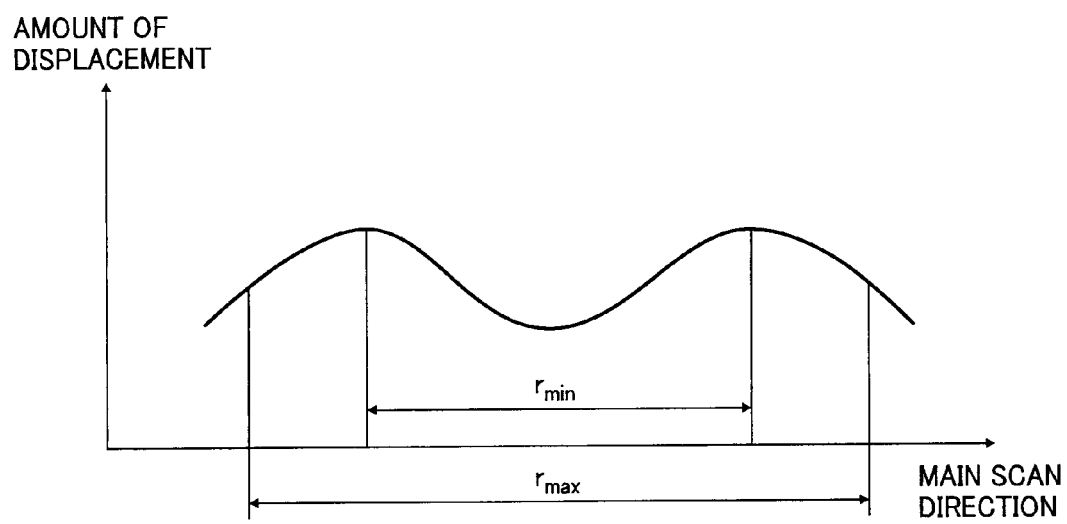
FIG. 39 shows a cross sectional shape of the vibration mirror 502 in a still state.
Figure 40:
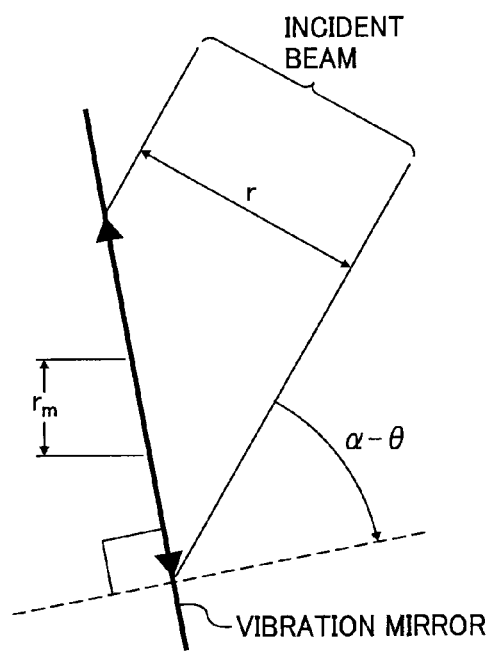
FIG. 40 shows incident light beam size on the vibration mirror 502.

FIG. 39 shows a cross section of the vibration mirror 502 in a still state. FIG. 40 shows a spot size of an incident light beam to be projected onto the vibration mirror 502.

Due to the manufacture process of the vibration mirror 502, the mirror surface thereof cannot be precisely even. In the present embodiment, in scanning the vibration mirror 502, the spot sizes of the light beam differ at both ends of vibration mirror 502. This is because the spot size of the light beam depends on the deflection angle θ of the vibration mirror 502. As shown in FIG. 40, when the light beam is deflected by the vibration mirror 502 at deflection angle θ, the spot size rm of the light beam is expressed by a relation, $rm = r/\cos(\alpha-\theta)$, where α is mean incidence angle of the light beam, and r is width thereof. In the present embodiment, the range of deflection angles θ is set to $90° > \alpha-\theta > 0°$, and the beam spot size rm monotonously decreases as the light beam sweeps from one end to the center in the main scan direction. Note that the maximum spot size of the light beam on the vibration mirror 502 is to be rmax and the minimum spot size thereof is to be rmin when the light beam scans both ends of the scan area.

The vibration mirror 502 with curvature has optical power as shown in FIGS. 38A, 38B, which is in proportional to curvature of approximate curve of a quadratic function of a cross sectional shape of the vibration mirror 502 in the range of the light beam spot sizes. Suppose that the vibration mirror 502 has a cross sectional shape as shown in FIG. 39 at a position deflecting the light beam, the vibration mirror 502 has almost no optical power when the beam spot size is in a range of rmax in which the approximate curve becomes substantially linear. In contrast, when it is in a range of rmin, the vibration mirror 502 has optical power to converge the light beam.

As described above, the optical power of the vibration mirror 502 differs depending on surface precision of a static vibration mirror 502, which may also cause displacement of the focus position from an ideal focus position. As shown in FIG. 39, the cross sectional shape of a portion of the vibration mirror 502 deflecting the light beam includes three or more extreme values (maximum and minimum). In this case, in order to achieve even beam spot size on the surface of the photoconductive drum, it is not sufficient to reduce displacement of the focus position due to the deformation of the vibrating vibration mirror 502 by adjusting the incidence position of the light beam to be on the rotation axis of the vibration mirror 502 since there still remains displacement thereof due to the deformation of the static vibration mirror 502.

In view of preventing the above from occurring, in the present embodiment the incidence position of the light beam is adjusted to shift from the rotation axis of the vibration mirror 502 so that the displacements of the focus positions of the light beam are corrected by allowing the focus position to be displaced due to the deformation of the vibration mirror 502 caused by the vibrating vibration mirror 502 in one side and the focus position to be displaced due to the surface precision thereof in the other side at scanning the start position of the scan area so as to cancel out the displacements. This can eliminate the displacements of the focus positions in the entire scan area or make amounts of the displacements constant, resulting in reducing the variation in the spot size of the light beam in the main scan direction.

Thus, the optical scan apparatus according to the present embodiment is configured that the spot sizes of the light beams can be uneven in the entire scan area by canceling out, in the main scan direction, the displacements of the focus positions caused by the deformation of the vibrating vibration mirror 502 and those caused by the surface precision of the static vibration mirror 502. This makes it possible to provide an image formation apparatus which can form high quality images.

As described above, the position and angle of the optical device is adjusted so that the spot sizes of the light beam match each other at both ends of the scan area in the main scan direction. In other words, the displacement of the focus position can be decreased in the main scan direction.

More preferably, the optical device can be adjusted at two or more defocus positions so as to match the spot sizes of the light beam at both ends of the scan area in the main scan direction. The defocus position refers to amount of displacement in the optical axis direction of the vibration mirror 502, and generally, the defocus position of an ideal imaging plane is considered zero.

Figure 41:
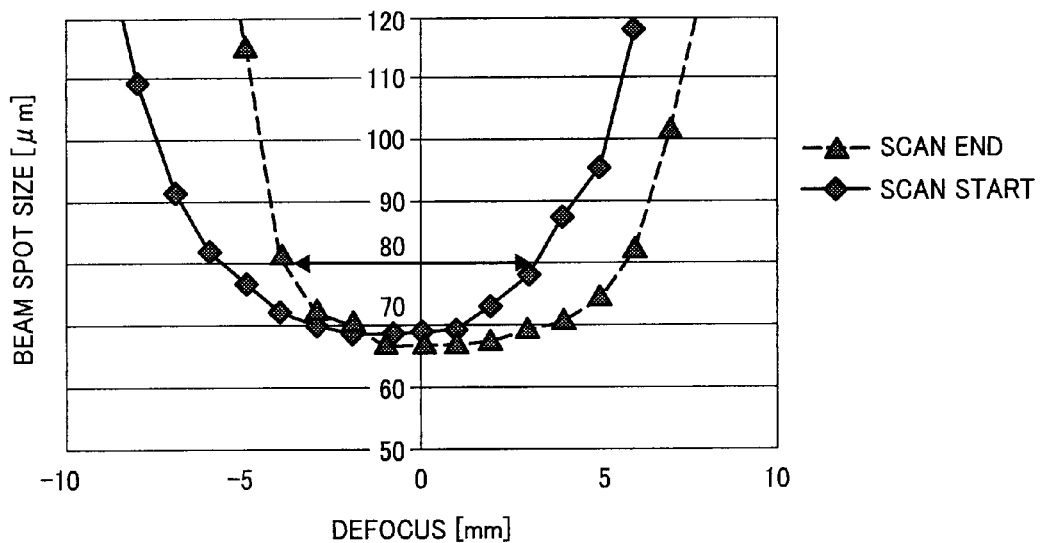
FIG. 41 is a graph of beam spot size and defocus.
Figure 42:
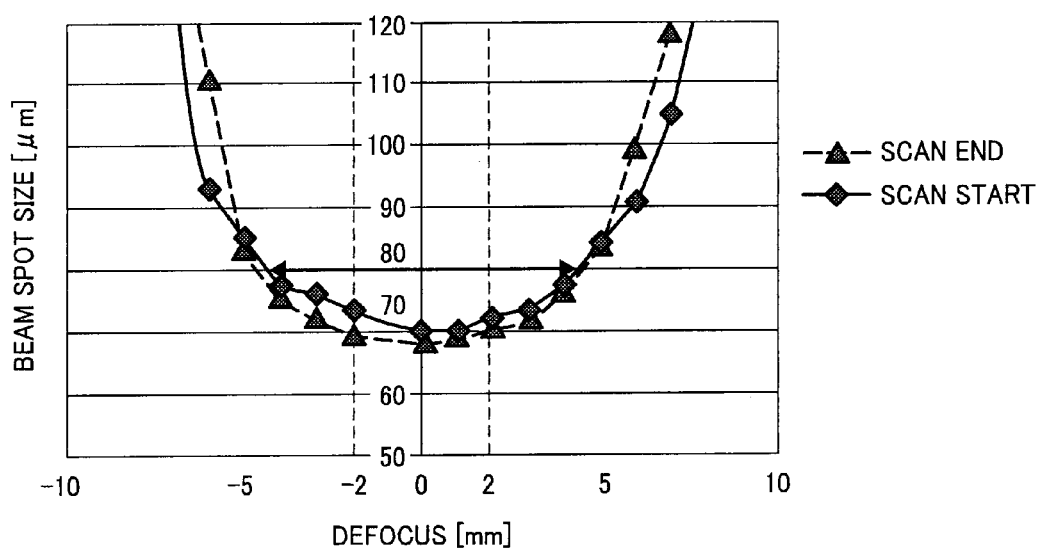
FIG. 42 is another graph of beam spot size and defocus.

FIGS. 41, 42 are graphs showing beam spot size relative to defocus position when the optical device is adjusted so as to match the beam spot sizes in the main scan direction at one or two defocus positions.

FIG. 41 shows that at defocus position of 0 mm, the beam spot sizes at start and end of the scan area are substantially the same. As the defocus position goes away from 0 mm, however, they are shifted from each other by approximately 3 mm. The range of defocus positions for assuring the beam spot size of 80 μm or less in the main scan direction is approximately 5 mm.

Meanwhile, FIG. 42 shows that at two defocus position, +2 mm and −2 mm, the beam spot sizes at the start and end of the scan area are substantially the same, and so are the focus positions. Moreover, the range of defocus positions for assuring the beam spot size of 80 μm or less in the main scan direction is a larger value, approximately 8 mm. With such adjustments to the optical device, it is possible to realize an optical scan apparatus with the light beam of even spot sizes even when the focus position is shifted due to environmental changes or tolerance fluctuation.

Also, in the present embodiment the optical device is adjusted to match the beam spot sizes at the start and end of the scan area substantially at the two defocus positions. However, it can be adjusted by measuring, at each defocus position, the beam spot size at start and end of the scan area and making beam waist positions substantially match each other.

Furthermore, the optical device can be adjusted to have the beam spot size or waist position of the light beam come closer to a design value by measuring the beam spot size not only at both ends of the scan area but predetermined positions in the main scan direction, which can realize the optical scan apparatus with more even beam spot size.

Figure 43:
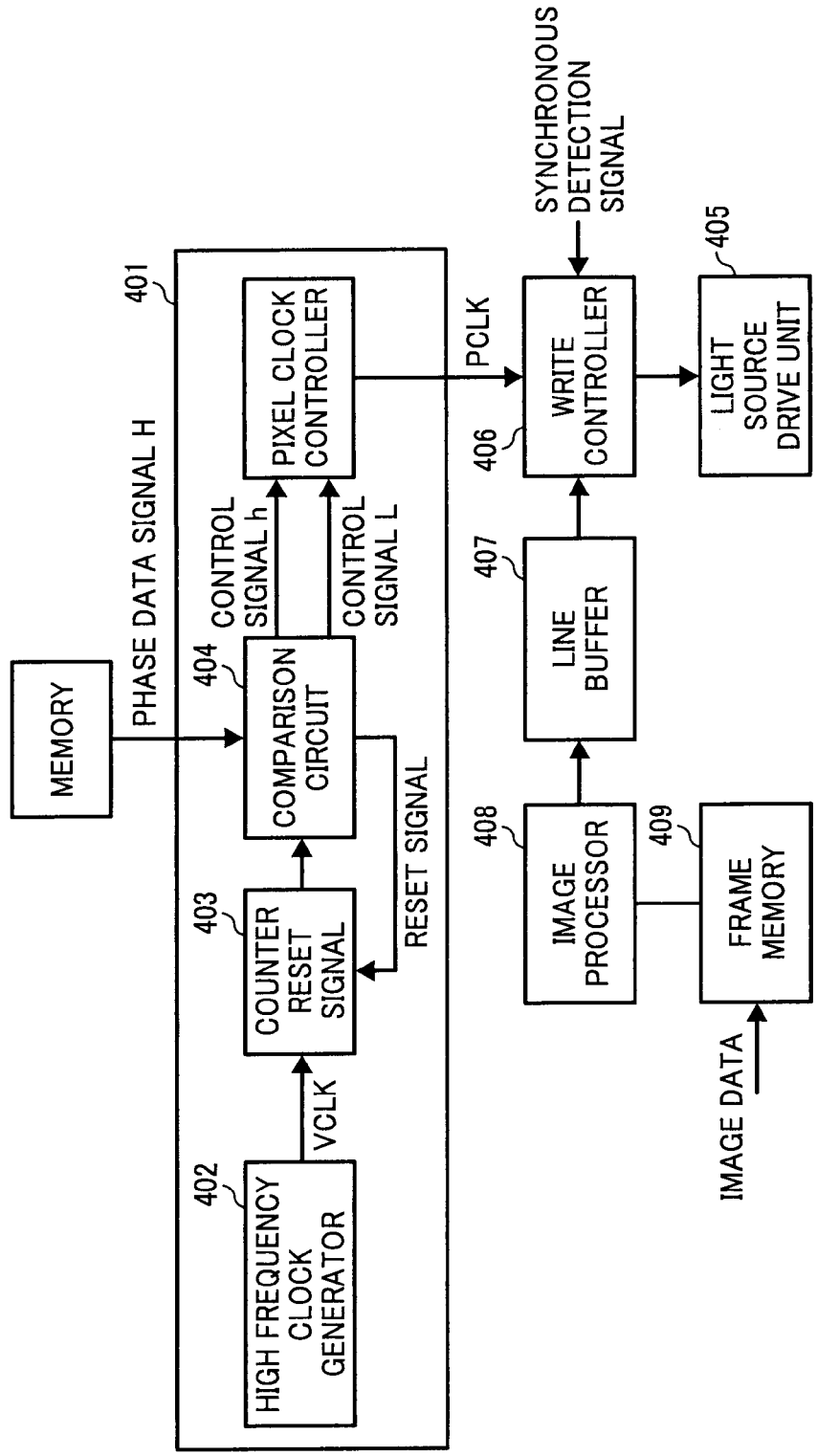
FIG. 43 shows a light source drive unit 405 driving semiconductor lasers L201 to L204 of light sources 107, 108 and peripheral components.

FIG. 43 shows the light source drive unit 405 and periphery components. The light source drive unit 405 drives the semiconductor lasers L201, L202 of the light source 107 (FIG. 35), L203, L204 (not shown) of the light source 108. The periphery components are a pixel clock generator 401 including a high frequency clock generator 402, a counter 403, and a comparison circuit 404, a write controller 406, a line buffer 407, an image processor 408 and a frame memory 409.

Raster image data in the respective colors are temporarily stored in the frame memory 409 and sequentially read therefrom by the image processor 408. Referring to preceding and succeeding image data, image data on each scan line are formed from the read image data in accordance with halftone matrix pattern and transferred to the line buffer 407.

The write controller 406 reads the image data from the line buffer 407 by a synchronous detection signal as a trigger and outputs it to the light source drive unit 405 which drives the semiconductor lasers L201 to L204 according to modulation data which is image data superimposed on a clock signal output from the pixel clock generator 401.

The pixel clock generator 401 modulates the semiconductor lasers L201 to L204. Therein, the counter 403 counts high frequency clocks VCLK generated by the frequency clock generator 402. The comparison circuit 404 compares a counter value, a value L preset according to duty ratio, and a phase data signal H which is supplied from exterior for transition timing for pixel clocks and indicates an amount of phase shift.

The pixel clock generator 401 outputs a control signal L signifying a falling of the pixel clock PCLK, when the counter value coincides with the preset value L while it outputs a control signal h signifying a rising of the pixel clock PCLK, when the counter value coincides with the phase data signal H. Concurrently with the output of the control signal h, the counter 403 is reset and counts up again from zero to form a continuous pulse train.

The pixel clock generator 401 receives a phase data signal H at each clock, and generates pixel clocks PCLK whose pulse cycles are sequentially varied. Note that in the present embodiment the pixel clock PCLK is set to be 1/8 of the high frequency clock VCLK, that is, the phase of the pixel clock can be shifted by resolution of 1/8 of the high frequency clock VCLK.

Figure 44:
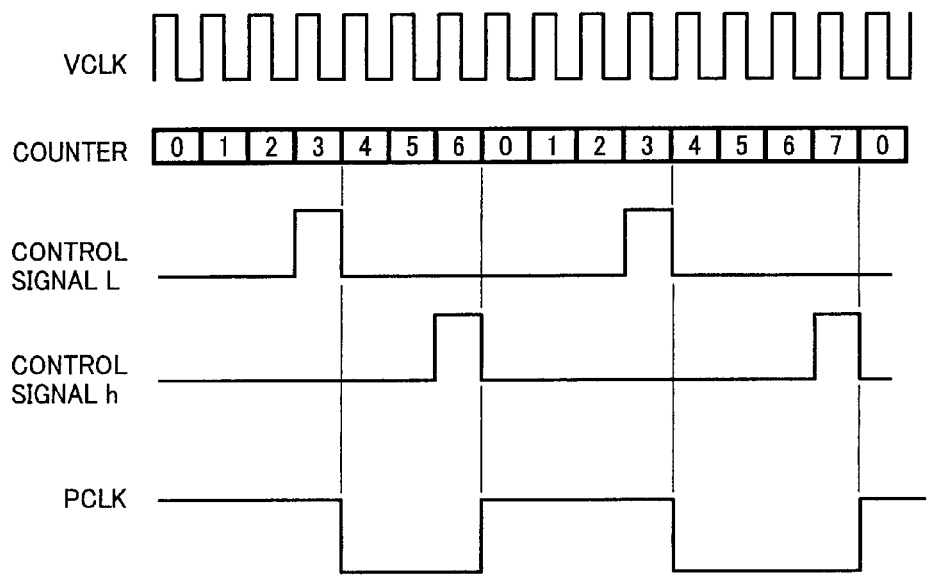
FIG. 44 is a timing chart for a pixel clock generator 401 when phase of a pixel clock PCLK of a pixel is shifted by ⅛ clock.

FIG. 44 is a timing chart for delaying an arbitrary pixel clock PCLK by 1/8 clock when duty ratio is 50% and the preset value is 3, for example. At the value of the counter 403 being 4, the pixel clock PCLK is fallen. Upon the phase data signal H being 6 given, the pixel clock PCLK is risen at the value of the counter 403 being 7. Concurrently, the counter 403 is reset to zero. At the value of the counter 403 being 4, the pixel clock PCLK is fallen again. Then, for delaying the pixel clock PCLK in phase by 1/8 clock, when the phase data signal H being 7 is given, the pixel clock PCLK is risen at the value of the counter 403 being 8. Thereby, the pulse cycles of adjacent pixel clocks PCLK are delayed by 1/8 clock. Thus generated pixel clocks PCLK are supplied to the light source drive unit 405 which drives the semiconductor lasers according to the pixel clocks and pixel data which is read from the line buffer 407.

Figure 45:
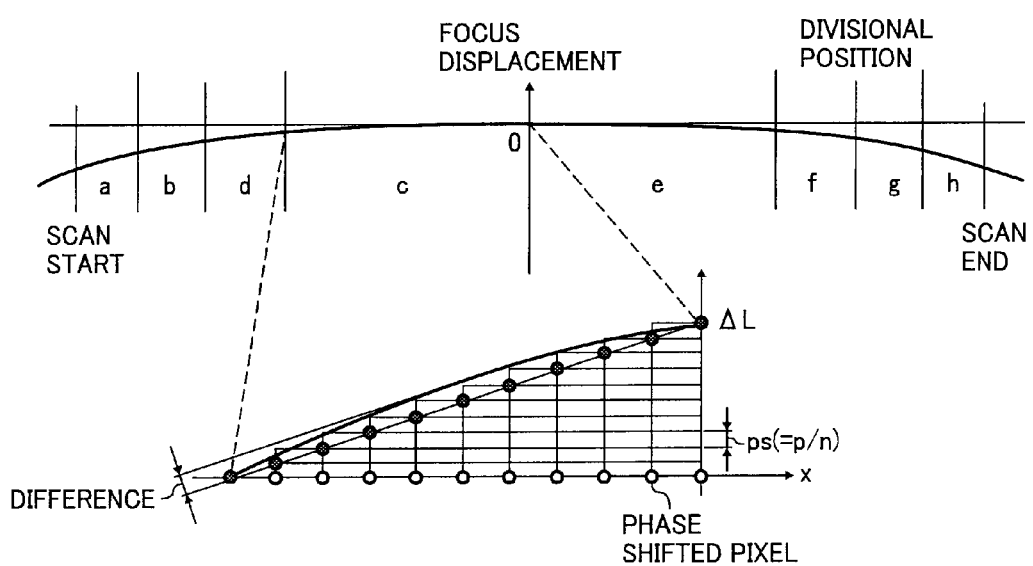
FIG. 45 shows a correction amount for a focus position of a light beam in the main scan direction.

FIG. 45 shows amount of correction for the focus position of the light beam on each pixel in the main scan direction. According to the present embodiment, the scan area (from the scan start to end) is divided into plural areas (eight areas a to h in FIG. 45) to correct the focus position of the light beam in each divided area. The correction is made by dividing a maximum difference $\Delta L$ in the focus position by a phase shift ps in each divided area and conducting broken line approximation for the focus position of the light beam with precision of the phase shift ps at each pixel position. The broken line approximation is conducted so that broken line approximation values are to be equal at end portions of adjacent divided areas.

For example, where the number of pixels in i-area is Ni, phase shift ps is $1/n$ ($n=16$, for example) of pixel pitch p, and displacement of focus position of light beam at both ends of the scan area is $\Delta Li$, the following expression (27) holds true:

$$ni = Ni \times p/16 \Delta Li \qquad (27)$$

One pixel in every ni pixels is to be shifted in phase. Accordingly, the number of phase shifts Ni/ni is set for every divided area to correct the focus position of the light beam stepwise.

Here, at the pixel clock being fc, phase difference $\Delta t$ at the N-th pixel is obtained by the following expression (28) using the number of phase shifts Ni/ni:

$$\Delta t = 1/16 fc \times \int (Ni/ni) di \qquad (28)$$

The phase difference $\Delta t$ is obtained from the number of phase shifts previously made.

Note that the widths of the divided areas can be set either even or uneven, and the number of divided areas can be arbitrary. However, the widths of the divided areas are preferably 1/4 of pixel pitch p or less since a large phase shift amount at each pixel is conspicuous on an image. In contrast, a small shift amount means increase in the number of phase shifts and increase of memory capacitance so that the less the number of divided areas, the better. Therefore, with the above taken into consideration, it is effective that a divided area with a large shift of the focus position is set to be in small width while a divided area with a small shift of the focus position is set to be in large width.

Also note that the semiconductor lasers L201 to L204 are each provided with a light amount sensor which is mounted in a laser package and detects, for each scan line, amounts of backlights of the light beams 25 to 28 before reaching the photoconductive drums 101 to 104. Then, the amounts of the light beams 201 to 204 are made constant during a single scan by controlling amounts of current supplied to the semiconductor lasers L201 to L204.

Note that the light source drive unit 401 and its peripheral components shown in FIG. 43 function as a correction unit which corrects the focus positions of the light beams shown in FIG. 45.

Figure 46:
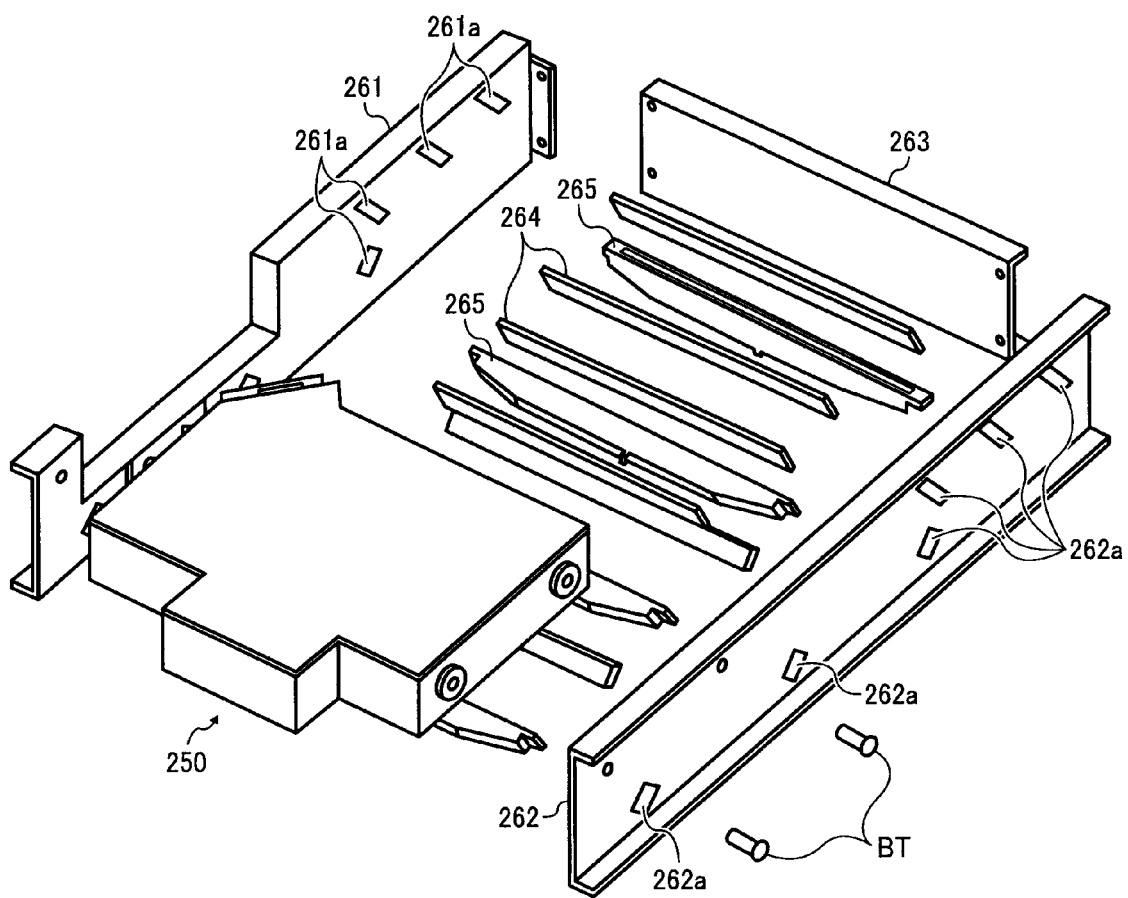
FIG. 46 shows housing of the optical scan apparatus.

FIG. 46 is a schematic perspective view of the housing of the optical scan apparatus including the optical housing 250 and a return mirror support portion. The optical housing 250 contains the light sources 251, 252, vibration mirror module VMM, fθ lens 254 and else, as shown in FIG. 27. The light sources 251, 252 with the semiconductor lasers L201 to L204 are mounted on the outer wall of a case of the housing 250 molded with resin. The vibration mirror module VMM is placed in a small area surrounded by the side wall 257 with the transparent window 256. The optical housing 250 together with a reinforced plate 263 are sandwiched by side plates 261, 262 and fixed thereto with screws BT. The side plates have rectangular holes 261a, 262a, respectively by which return mirrors 264 and toroidal lens 265 are bridged and supported.

Figure 47:
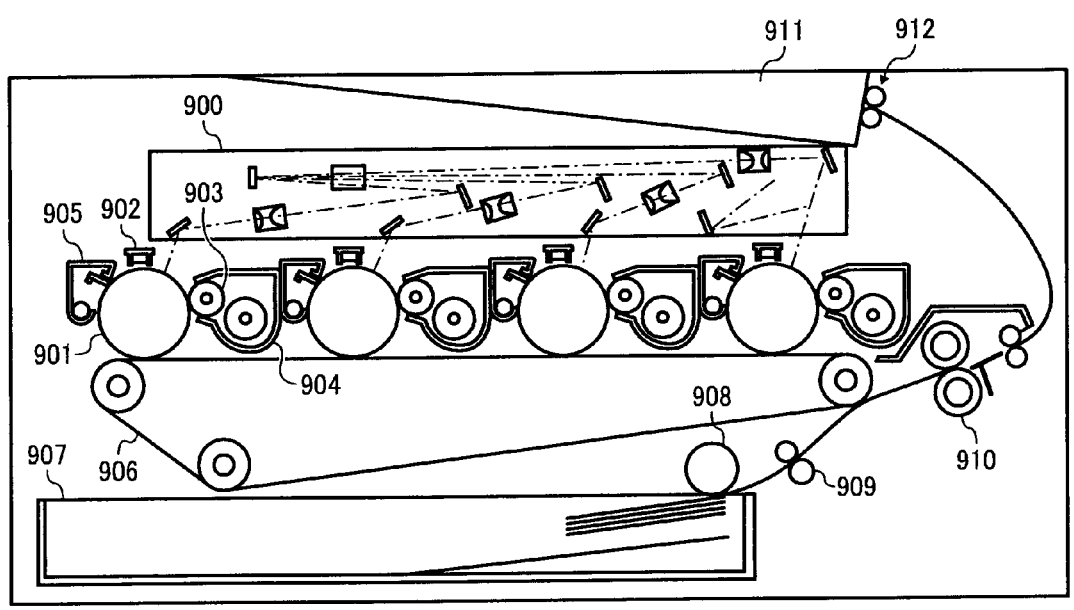
FIG. 47 shows an example of an image formation apparatus incorporating an optical scan apparatus.

FIG. 47 shows an example of an image formation apparatus incorporating an optical scan apparatus. In the drawing the image formation apparatus comprises the optical scan apparatus 900, photoconductive drums 901, electric chargers 902, develop rollers 903, toner cartridges 904, toner cases 905, a transfer belt 906, a paper feed tray 907, a paper feed roller 908, a resist roller pair 909, a fuse roller 910, a paper discharge tray, and a paper discharge roller 912.

Around each photoconductive drum 901 disposed are the electric charger 902 charging the photoconductive drum 901 at high voltage, the develop roller 903 attaching charged toner to an electrostatic latent image formed on the photoconductive drum 901 by the optical scan apparatus 900 for visualization, the toner cartridge 904 supplying toner to the develop roller 903, and the toner case in which remnant toner on the photoconductive drum 901 is peeled off and accumulated. Two-line images are formed on the photoconductive drum 1 at one cycle by a vibration mirror's reciprocative movement.

The four image formation stations correspond with yellow, magenta, cyan, and black colors, respectively and are arranged above the transfer belt 906 in a moving direction of the transfer belt 906. Toner images in yellow, magenta, cyan, black colors are transferred sequentially onto the transfer belt 906 at a timing, to superimpose the four color toner images and form a color image. Each image formation station basically has the same structure except for the color of toner.

Paper P is supplied from the paper feed tray 907 via the paper feed roller 908 and carried to the transfer belt 906 via the resist roller pair 909 in accordance with recording start timing in sub scan direction, whereby the toner image on the transfer belt 906 is transferred onto the paper P. Then, the toner image is fused by the fuse roller 910 on the paper P and discharged to the paper discharge tray 911 via the paper discharge roller 912.

As described above, according to the present invention, it is possible to provide the optical scan apparatus with the vibration mirror which can reduce the displacement of the focus position of the light beam due to the deformation of the vibration mirror caused by its own vibration.

Further, according to the present invention, it is possible to realize the image formation apparatus which forms high quality images without unevenness in density by including the optical scan apparatus which can reduce the displacement of the focus position of the light beam.

Furthermore, according to the present invention, it is possible to realize the image formation apparatus which forms high quality color images by including the optical scan apparatus which can reduce the displacement of the focus position of images in the respective colors due to a difference in the wavelengths of the light sources.

Furthermore, according to the present invention, it is possible to realize the image formation apparatus with less noise and less power consumption by use of the vibration mirror in replace of the polygon mirror, and to flexibly adopt for ambient environments and achieve resource saving.

Furthermore, according to the present invention, it is possible to reduce the manufacture costs for the optical scan apparatus and the image formation apparatus and achieve weight saving therefore by reducing the thickness of the optical housing of the optical scan apparatus owning to low vibration of the vibration mirror.

Furthermore, according to the present invention, it is possible to provide the optical scan apparatus with the vibration mirror which can cancel out the displacements of the focus positions caused by the two factors, the deformation of the vibration mirror due to its own vibration and surface precision of the static vibration mirror, and thereby make the spot sizes of the light beam even in the entire scan area.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An optical scan apparatus comprising:
   a light source emitting a light beam;
   a vibration mirror deflecting the light beam emitted from the light source to scan a scan area;
   a drive unit driving the vibration mirror; and
   an optical imaging system focusing the light beam deflected by the vibration mirror on a predetermined focus position, and having optical power to correct a displacement of the focus position which occurs due to a deformation of the vibration mirror caused by its own vibration.

2. An optical scan apparatus according to claim 1, further comprising an adjuster which adjusts, at least in a main scan direction, a position of incidence of the light beam on the vibration mirror.

3. An optical scan apparatus according to claim 2, wherein the adjuster is configured to adjust a direction in which the light beam is emitted from the light source.

4. An optical scan apparatus according to claim 1, wherein the drive unit is configured to drive the vibration mirror so that a deflection angle thereof is to be constant.

5. An optical scan apparatus according to claim 1, wherein the vibration mirror includes a torsion shaft as a support shaft; and
   the vibration mirror reciprocatively vibrates in a horizontal direction around the torsion shaft in a predetermined range of rotation angles.

6. An image formation apparatus comprising:
   an optical scan apparatus according to claim 1;
   a photoconductor on which an electrostatic latent image is formed in accordance with image information by the optical scan apparatus;
   a develop unit visualizing the electrostatic latent image formed on the photoconductor as a toner image; and
   a transfer unit fusing the toner image visualized by the develop unit on a recording medium.

7. An image formation apparatus according to claim 6, wherein
   the optical scan apparatus further comprises a correction unit which divides the scan area of a deflected light beam into a plurality of areas and corrects a position of a pixel formed by the light beam according to the image information in each divided area, to thereby correct displacement of the focus position.

8. An optical scan apparatus comprising:
   a light source emitting a light beam;
   a vibration mirror deflecting the light beam emitted from the light source to scan a scan area;
   a drive unit driving the vibration mirror; and
   an optical imaging system focusing the light beam deflected by the vibration mirror on a predetermined focus position, wherein
   the light beam is set to be incident on the vibration mirror at such a position as to correct a displacement of the focus position by canceling out a displacement due to precision of a surface of the vibration mirror and that due to a deformation of the vibration mirror caused by its own vibration.

9. An optical scan apparatus according to claim 8, wherein
the light beam is set to be incident on the vibration mirror at such a position that spot sizes of the light beam at both ends of the scan area are to be substantially the same.

10. An optical scan apparatus according to claim 8, wherein
the light beam is set to be incident on the vibration mirror at such a position that waist positions of the light beam at both ends of the scan area are to be substantially the same.

11. An optical scan apparatus according to claim 8, further comprising an adjuster which adjusts, at least in a main scan direction, a position of incidence of the light beam on the vibration mirror.

12. An optical scan apparatus according to claim 11, wherein
the adjuster is configured to adjust a direction in which the light beam is emitted from the light source.

13. An optical scan apparatus according to claim 11, wherein
the adjuster is configured to adjust the position of incidence of the light beam on the vibration mirror at a plurality of defocus positions of the light beam.

14. An optical scan apparatus according to claim 8, wherein
the drive unit is configured to drive the vibration mirror so that deflection angle thereof is to be constant.

15. An optical scan apparatus according to claim 8, wherein
the vibration mirror includes a torsion shaft as a support shaft; and
the vibration mirror reciprocatively vibrates in a horizontal direction around the torsion shaft in a predetermined range of rotation angles.

16. An image formation apparatus comprising:
an optical scan apparatus according to claim 8;
a photoconductor on which an electrostatic latent image is formed in accordance with image information by the optical scan apparatus;
a develop unit visualizing the electrostatic latent image formed on the photoconductor as a toner image; and
a transfer unit fusing the toner image visualized by the develop unit on a recording medium.

17. An image formation apparatus according to claim 16, wherein
the optical scan apparatus further comprises a correction unit which divides the scan area of a deflected light beam into a plurality of areas and corrects a position of a pixel formed by the light beam according to the image information in each divided area, to thereby correct displacement of the focus position.

* * * * *